United States Patent
Shum et al.

(10) Patent No.: US 6,476,805 B1
(45) Date of Patent: Nov. 5, 2002

(54) TECHNIQUES FOR SPATIAL DISPLACEMENT ESTIMATION AND MULTI-RESOLUTION OPERATIONS ON LIGHT FIELDS

(75) Inventors: Heung-Yeung Shum, Beijing (CN); Shing-Chow Chan, NT (HK)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/471,678

(22) Filed: Dec. 23, 1999

(51) Int. Cl.$^7$ .............................................. G06T 17/00
(52) U.S. Cl. .......................................... 345/420; 345/426
(58) Field of Search ................................. 345/418, 419, 345/420, 421, 422, 423, 424, 426

(56) References Cited

U.S. PATENT DOCUMENTS

| | | |
|---|---|---|
| 5,063,444 A | 11/1991 | Knauer et al. |
| 5,148,272 A | 9/1992 | Acampora et al. |
| 5,196,933 A | 3/1993 | Henot |
| 5,448,297 A | 9/1995 | Alattar et al. |
| 5,477,272 A | 12/1995 | Zhang et al. |
| 5,594,504 A | 1/1997 | Ebrahimi |
| 5,734,737 A | 3/1998 | Chang et al. |
| 5,926,791 A | 7/1999 | Ogata et al. |
| 5,946,043 A | 8/1999 | Lee et al. |
| 6,009,188 A | 12/1999 | Cohen et al. |
| 6,023,523 A | 2/2000 | Cohen et al. |
| 6,028,955 A | 2/2000 | Cohen et al. |
| 6,097,394 A | 8/2000 | Levoy et al. |

OTHER PUBLICATIONS

Wei, Li–Yi, *Light Field Compression Using Wavelet Transform and Vector Quantization*, 9 pp. [Downloaded from the World Wide Web on Sep. 26, 2001.]

Gray, R. et al., "Image Compression and Tree–Structured Vector Quantization," *Image and Text Compression*, Chapter 1, pp. 3–34 (1992).

Howard, P. et al., "Practical Implementations of Arithmetic Coding," *Image and Text Compression*, Chapter 4, pp. 85–112 (1992).

"Advanced Streaming Format (ASF) Specification," Public Specification Version 1.0, pp. 1–56 (Feb. 26, 1998).

Karlsson, G. et al., "Subband Coding of Video for Packet Networks," *Optical Engineering*, vol. 27, No. 7, pp. 574–586 (Jul. 1988).

(List continued on next page.)

*Primary Examiner*—Cliff N. Vo
(74) *Attorney, Agent, or Firm*—Klarquist Sparkman, LLP

(57) ABSTRACT

Selective quality light field operations efficiently manipulate a multi-resolution representation of a light field. These operations include intra-image and inter-image decomposition and compression of a light field to a multi-resolution representation. These operations also include intra-image and inter-image decompression and reconstruction of a light field at selective quality. These selective quality operations also apply to storage, rendering, and transmission. Various techniques improve spatial displacement estimation of a prediction light field image from a reference light field image. These techniques includes constraining the placement and size of a search window based upon a geometrical relationship between prediction and reference light field images, hierarchical spatial displacement estimation, edge extension of a reference light field image, differential coding of displacement vectors, and multi-predictor spatial displacement estimation. Configuring reference and prediction light field images in view of geometrical relationships between light field images also improves spatial displacement estimation.

92 Claims, 45 Drawing Sheets

OTHER PUBLICATIONS

Darragh, J. et al., "Fixed Distortion Subband Coding of Images for Packet–Switched Networks," IEEE J. on Selected Areas in Communications, vol. 7, No. 5, pp. 789–800 (Jun. 1989).

Le Gall, D., "MPEG: A Video Compression Standard for Multimedia Applications," Communications of the ACM, vol. 34, No. 4, pp. 46–58 (Apr. 1991).

Plompen, R., et al., "Motion Video Coding in CCITT SG XV—The Video Source Coding," Reprinted from IEEE Global Telecommunication Conf., vol. 2, pp. 113–120 (Nov./Dec. 1988).

Woods, J., et al., "Subband Coding of Images," Reprinted from IEEE Trans. Acoust., Speech, Signal Processing, vol. ASSP–34, pp. 198–208 (Oct. 1986).

"About Wavelet Technology and Video Compression," IVC Technical Bulletin No. 0014a, pp. 1–5 (Sep. 17, 1997).

Shensa, M., "The Discrete Wavelet Transform: Wedding the A Trous and Mallat Algorithms," IEEE Transactions on Signal Processing, vol. 40, No. 10, pp. 2464–2482 (Oct. 1992).

House, D., "Overview of Three–Dimensional Computer Graphics," *The Computer Science and Engineering Handbook*, Chapter 54, pp. 1193–1211 (1997).

Meng, T. et al., "Portable Video–On–Demand in Wireless Communication," Proceedings of the IEEE, vol. 83, No. 4, pp. 659–680 (Apr. 1995).

Calderbank, A. et al. "Wavelet Transforms That Map Integers to Integers," Applied and Computational Harmonic Analysis, vol. 5, pp. 332–369 (1998).

Watson, A., et al., "Visibility of Wavelet Quantization Noise," IEEE Transactions on Image Processing, vol. 6, No. 8, pp. 1164–1175 (Aug. 1997).

Shapiro, J., "Embedded Image Coding Using Zerotrees of Wavelet Coefficients," IEEE Transactions on Signal Processing, vol. 41, No. 12, pp. 3445–3462 (Dec. 1993).

Levoy, M. et al., "Light Field Rendering," Computer Graphics Proceedings, Annual Conference Series, pp. 31–42 (1996).

Kirk, R., "A 5 Minute Course in Wavelet Transforms," 3pp.

Gortler, S. et al., "The Lumigraph," Computer Graphics Proceedings, Annual Conference Series, pp. 43–54 (1996).

"MPEG–4 Standard," International Organisation for Standardisation, ISO/IEC JTC1/SC29/WG11, Coding of Moving Pictures and Audio, N2202, Information Technology—Coding of Audio–Visual Objects: Visual, ISO/IEC 14496–2, Committee Draft, Tokyo, 326 pp. (May 28, 1998).

"ITU–T Recommendation H.262," Information Technology—Generic Coding of Moving Pictures and Associated Audio Information: Video, 201 pp. (07/95).

"ITU–T Recommendation H.263," Series H: Audiovisual and Multimedia Systems, Infrastructure of Audiovisual Services—Coding of Moving Video, Video Coding for Low Bit Rate Communication, 155 pp. (02/98).

Cosman, P. et al., "Vector Quantization of Image Subbands: A Survey," pp. 1–43 (Jun. 20, 1995).

Solari, S., "Video Compression Techniques: Vector Quantization," *Digital Video and Audio Compression*, Chapter 6, pp. 141–162 (1997).

Solari, S., "Subband Coding," *Digital Video and Audio Compression* Chapter 7, pp. 163–185 (1997).

Hamming, R., "Some Classical Applications," *Digital Filters*, Chapter 3, pp. 32–63 (1983).

Hamming, R., "Design of Nonrecursive Filters," *Digital Filters*, Chapter 6, pp. 109–133 (1983).

FIGURE 25
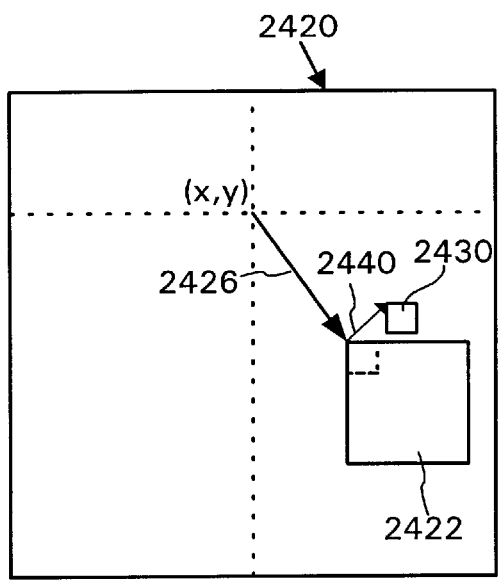
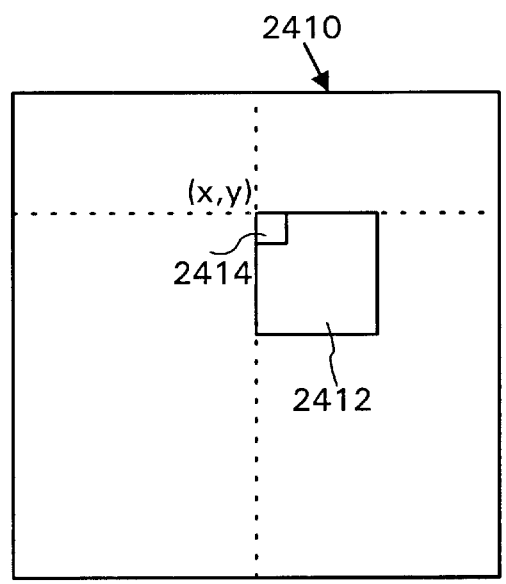

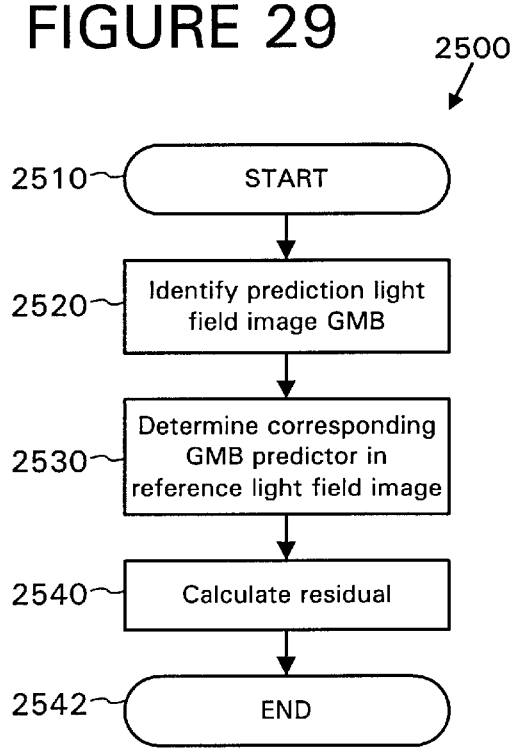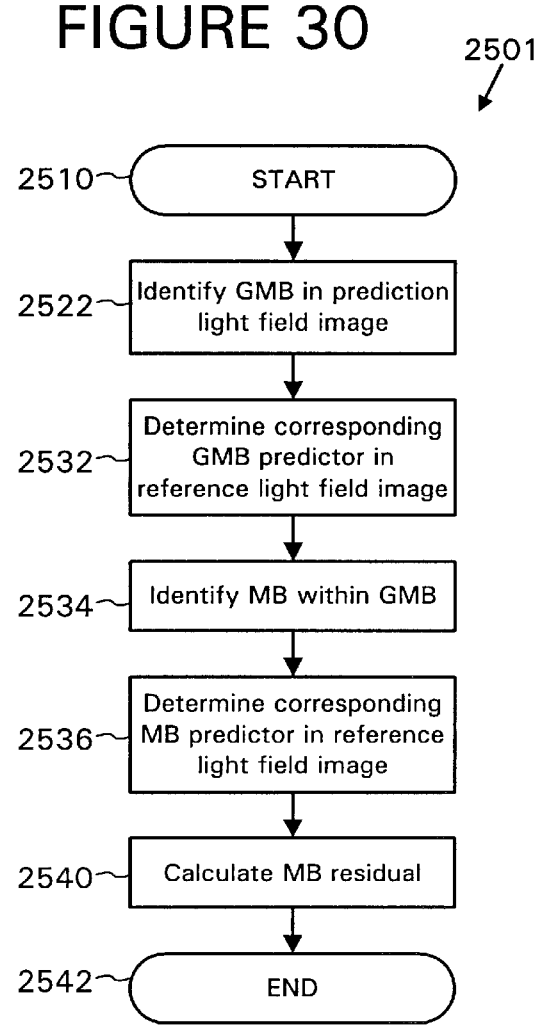

| 2631 Reference Light Field Image | 2640 Prediction Light Field Image | 2641 Prediction Light Field Image | 2642 Prediction Light Field Image | 2643 Prediction Light Field Image | 2632 Reference Light Field Image |
|---|---|---|---|---|---|
| 2644 Prediction Light Field Image | 2645 Prediction Light Field Image | 2646 Prediction Light Field Image | 2647 Prediction Light Field Image | 2648 Prediction Light Field Image | 2649 Prediction Light Field Image |
| 2633 Reference Light Field Image | 2650 Prediction Light Field Image | 2651 Prediction Light Field Image | 2652 Prediction Light Field Image | 2653 Prediction Light Field Image | 2634 Reference Light Field Image |

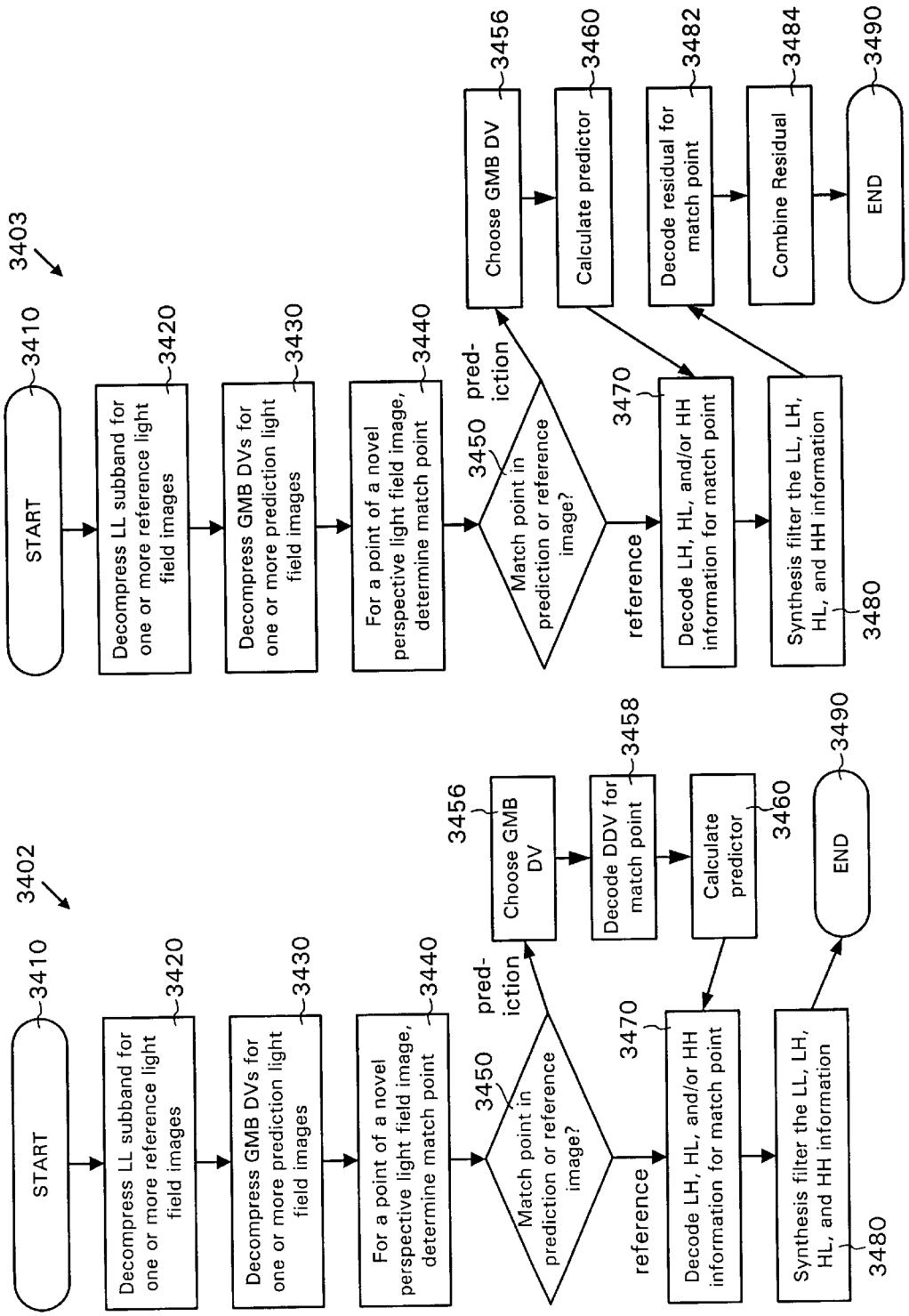

TECHNIQUES FOR SPATIAL DISPLACEMENT ESTIMATION AND MULTI-RESOLUTION OPERATIONS ON LIGHT FIELDS

TECHNICAL FIELD

The present invention pertains to efficient compression, decompression, rendering, and other operations for light fields. The present invention includes techniques for spatial displacement estimation between light field images, as well as techniques for multi-resolution light field operations.

BACKGROUND OF THE INVENTION

A two-dimensional view of an object or static scene taken from a single perspective lacks certain information about the object or static scene as seen from other perspectives. A single view may lack information about occluded portions of the object or static scene. Even for visible portions of the object or static scene, the single view may lack information about characteristics, such as light intensity values, that change when the perspective of the view changes. To enlarge the set of information about an object or static scene, views can depict the object or static scene from multiple perspectives. The multiple perspective views can include information about parts of the object or static scene that are occluded in a single view. The multiple perspective views can include information about characteristics of the object or static scene that change when perspective changes. Without knowledge of the spatial relationships between multiple perspective views, however, it is difficult to relate one perspective view to another or interpolate between views to create a novel view.

A light field models the light characteristics of an object or static scene, for example, by capturing light intensity and color values along a surface around a static scene. To map a light field to a computational framework requires a discrete representation. FIGS. 1 and 2 depict a discretized light field 10. Light field 10 includes a set of spatially-related light field images of an object 20. FIG. 1 shows expanded views of light field images 12 and 14. A light field image comprises a two-dimensional arrangement (s,t) of data values such as values from a color space. Light rays from the object 20 that pass through a light field image (s,t) also pass through a focal point 32 in the (u,v) plane. A (s,t,u,v) grid point is indexed with (i,j,p,q). Capture and generation of light fields, different parameterizations of light fields, and light field image rendering, as well as other aspects of light fields, are described in Gortler et al., "The Lumigraph," Computer Graphics Proceedings, Annual Conference Series, 1996, pp. 43–54 ["the Gortler reference"] and Levoy et al., "Light Field Rendering," Computer Graphics Proceedings, Annual Conference Series, 1996, pp. 31–42 ["the Levoy reference"].

Storage and transmission of light fields present difficulties due to the amount of digital information in a typical light field. An illustrative light field consists of 16×16 focal points in the focal plane (u,v). If each light field image has a resolution of 256×256 and stores 24-bit RGB values, the total amount of storage is: 16×16×256×256×3 bytes=48 Mbytes.

Within a light field, light field images typically exhibit similarities if they are taken at adjacent locations. Therefore, there is often spatial redundancy in the light field images. Storage and transmission of the light field images is made more efficient by removing such redundancy.

In addition to the considerable storage and transmission requirements for a light field, manipulation of light field images presents considerable memory and processing requirements. Light field rendering is the process of creating a view of an object or static scene based upon a light field by interpolating from known light field image values. During light field rendering, parts of selected light field images are retrieved to construct a view from a novel perspective. Depending on the perspective of the novel view being rendered, different light field images are retrieved. Because rendering typically uses different parts of different light field images according to a complex pattern of access, random access to parts of light field images facilitates rendering. Unfortunately, loading multiple light field images into random access memory (to facilitate random access to dispersed light field samples) consumes large amounts of memory given the size of a typical light field image. Moreover, even after light field images are loaded into memory, light field operations are computationally complex, especially when decompression of the light field information is required. These high memory and processing requirements hinder real time rendering, especially for serialized rendering operations.

The complexity of rendering operations can be reduced at a cost to quality. Some quality loss may be acceptable. During periods of rapid motion between perspective views, the human eye does not perceive detail well. Other quality loss may be necessary to support real time rendering. Techniques for rendering at fixed, full resolution fail to gracefully degrade quality where efficient and acceptable, or where necessary, for real time rendering.

In view of the need for efficient storage, transmission, and manipulation of light field images, techniques are needed for compression of light fields in a way that supports rapid access to light field images at selective resolution.

Light Field Compression

To compress a light field, individual light field images can be independently compressed as still images using an intra-image coding technique. An intra-image coding technique typically uses a cascade of lossy and lossless compression techniques to reduce spatial redundancy within an image. For example, an image is transform coded into a frequency domain. The transform coefficients are then quantized and losslessly compressed. Intra-image coding techniques can yield fair compression ratios, but fail to fully exploit inter-image spatial redundancy. Moreover, intra-image coding typically yields variable bit rate output and does not facilitate efficient, rapid access to particular portions within compressed images.

The Levoy reference describes a two-stage process of vector quantization and entropy coding to reduce redundancy within a light field. During vector quantization, a light field is split into source vectors from two-dimensional light field images or four-dimensional light field portions. Source vectors are matched to a smaller number of reproduction vectors from a codebook. After vector quantization, the codebook and codebook indices are entropy coded by Lempel-Ziv coding. In decompression, the entire light field (codebook and codebook indices) is Liv-Zempel decoded, a time-consuming operation. The output (codebook and codebook indices) is loaded into random access memory. Vector dequantization occurs for light field image or light field portions as needed. The Levoy reference does not involve compression of light field images to multiple levels of resolution or describe a way to rapidly access portions of light field images at selective levels of resolution. Moreover, the compression ratio of vector quantization without entropy coding is at most 24:1. Nonetheless, the Levoy reference uses vector quantization plus entropy coding rather than predictive coding, which is described as too complicated for rapid access to light field samples.

The Gortler reference describes applying JPEG compression to selected two-dimensional light field images of a light field. The techniques described in the Gortler reference do not facilitate efficient, rapid access at selective levels of resolution to particular portions of a light field image. The Gortler reference notes the potential for compression between light field images, but lacks detail concerning estimation, compression, decompression, and reconstruction techniques for light fields.

SUMMARY OF THE INVENTION

The present invention pertains to efficient compression, decompression, rendering, and other operations for light fields. The present invention includes techniques for spatial displacement estimation between light field images, as well as techniques for multi-resolution light field operations.

According to a first aspect of the present invention, a multi-resolution representation of a light field includes plural layers. One layer is a low granularity component layer and one or more other layers are higher granularity component layers. The higher granularity component layers represent less significant information about the light field than the low granularity component layer. A selective granularity operation uses the multi-resolution representation of the light field.

One type of selective granularity operation involves separation of a light field image into plural frequency component layers. For this type of operation, granularity of the multi-resolution representation corresponds to spatial frequency. For example, bandpass filters separate a light field image into n frequency component layers. The frequency component layers are then sub-sampled by a factor of n. The bandpass filters can frequency decompose the light field image in multiple directions and to a desired level of precision. The results of frequency decomposition can then be compressed.

Another type of selective granularity operation involves spatial displacement estimation of a prediction light field image from one or more reference light field images. For this type of operation, granularity of the multi-resolution representation corresponds to the degree of spatial displacement estimation refinement. At a top level, rough spatial displacement estimates are made for groups of pieces of a prediction light field image. This rough spatial displacement estimation can be refined by residual values, by spatial displacement estimation for pieces within a group of pieces, or by selection by pieces within a group of pieces of suitable rough displacement estimates.

A third type of selective granularity operation, similar to the first type of operation, involves decompression and synthesis of frequency component layers into a light field image. Decompression of higher frequency component layer information can be conditionally bypassed if no such information exists or to compensate for a processor, memory, transmission, or other system constraint.

A fourth type of selective granularity operation, similar to the second and third types of operation, involves decompression and combination of spatial displacement estimation information. Decompression of this information can be conditionally bypassed if no such information exists or to compensate for a processor, memory, transmission, or other system constraint.

These various types of operations can be combined according to the present invention.

According to a second aspect of the present invention, a data structure stores a multi-resolution representation of a light field. The data structure includes a base field that stores low granularity information and an enhancement field that stores higher granularity information. In one use, information in the base field is decompressed and then information in the enhancement field is selectively accessed and decompressed. An array of flag values supports conditional bypassing of the selective access and decompression of enhancement information.

According to third aspect of the present invention, a transmitter transmits low granularity information for prediction and reference light field images. The transmitter then selectively transmits enhancement information for the prediction and reference light field images.

According to a fourth aspect of the present invention, a section of a prediction light field image is compressed by estimating spatial displacement from one or more reference light field images. Constraining placement and size of a search window in a reference light field image, based upon a geometrical relationship between the prediction and reference light field images, improves performance. Various other techniques also improve performance of spatial displacement estimation. These techniques include edge extension of a reference light field image, differential coding of displacement vectors, and multi-predictor spatial displacement estimation. In addition to compression by spatial displacement estimation, this aspect of the present invention also includes decompression.

According to a fifth aspect of the present invention, a configuration of reference and prediction light field images reflects the geometrical relationships between light field images. For example, a 5×5 configuration of light field images includes reference light field images at the corners and prediction light field images at other locations.

In addition to applying to light fields, the present invention applies to other types of spatially-related views of an object or static scene.

Additional features and advantages of the invention will be made apparent from the following detailed description of an illustrative embodiment that proceeds with reference to the accompanying drawings.

BRIEF DESCRIPTION OF THE DRAWINGS

FIG. 25 is a block diagram showing a displacement difference vector for a prediction light field image macroblock of a group of macroblocks.

FIGS. 29 and 30 are flowcharts showing techniques for calculating residual values.

FIGS. 35 and 36 are block diagrams showing configurations of reference and prediction light field images.

FIG. 48 is a flowchart showing a technique for selective decompression of enhancement information for a match point of an intra-coded or inter-coded light field image compressed with hierarchical displacement estimation.

FIG. 49 is a flowchart showing a technique for selective decompression of enhancement information for a match point of an intra-coded or inter-coded light field image with a residual.

DETAILED DESCRIPTION OF AN ILLUSTRATIVE EMBODIMENT

The illustrative embodiment of the present invention is directed to efficient compression, decompression, rendering, and other manipulation of light field images. To provide proper context for the illustrative embodiment, the following description includes details about data, data structures, operations, and other software and hardware components used at various stages of the illustrative embodiment or used in conjunction with the illustrative embodiment.

The section entitled "Exemplary Computer System" describes a suitable computing environment for the illustrative embodiment. The section entitled "Light Fields" describes light fields and operations such as light field rendering. This section also treats the applicability of the present invention to other types of data.

The section entitled "Exemplary Data Structures" describes data structures and techniques for manipulating light field image data using variable-size data objects ["VSDOs"].

The section entitled "Reducing Intra-Image Redundancy of a Reference Light Field Image through Subband Coding" describes techniques for subband coding a reference light field image into multiple frequency component subbands to facilitate selective resolution operations. This section also describes techniques for subsequent compression of subbands.

The section entitled "Reducing Inter-Image Spatial Redundancy Through Spatial Displacement Estimation" describes techniques for compressing representation of prediction light field images through spatial displacement estimation and techniques for organizing light field images for spatial displacement estimation.

The section entitled "Accessing and Decompressing Light Field Information" describes techniques for access and decompression of reference and prediction light field image information and techniques for selective access and decompression of enhancement information for light fields.

I. Exemplary Computer System

Figure 3:
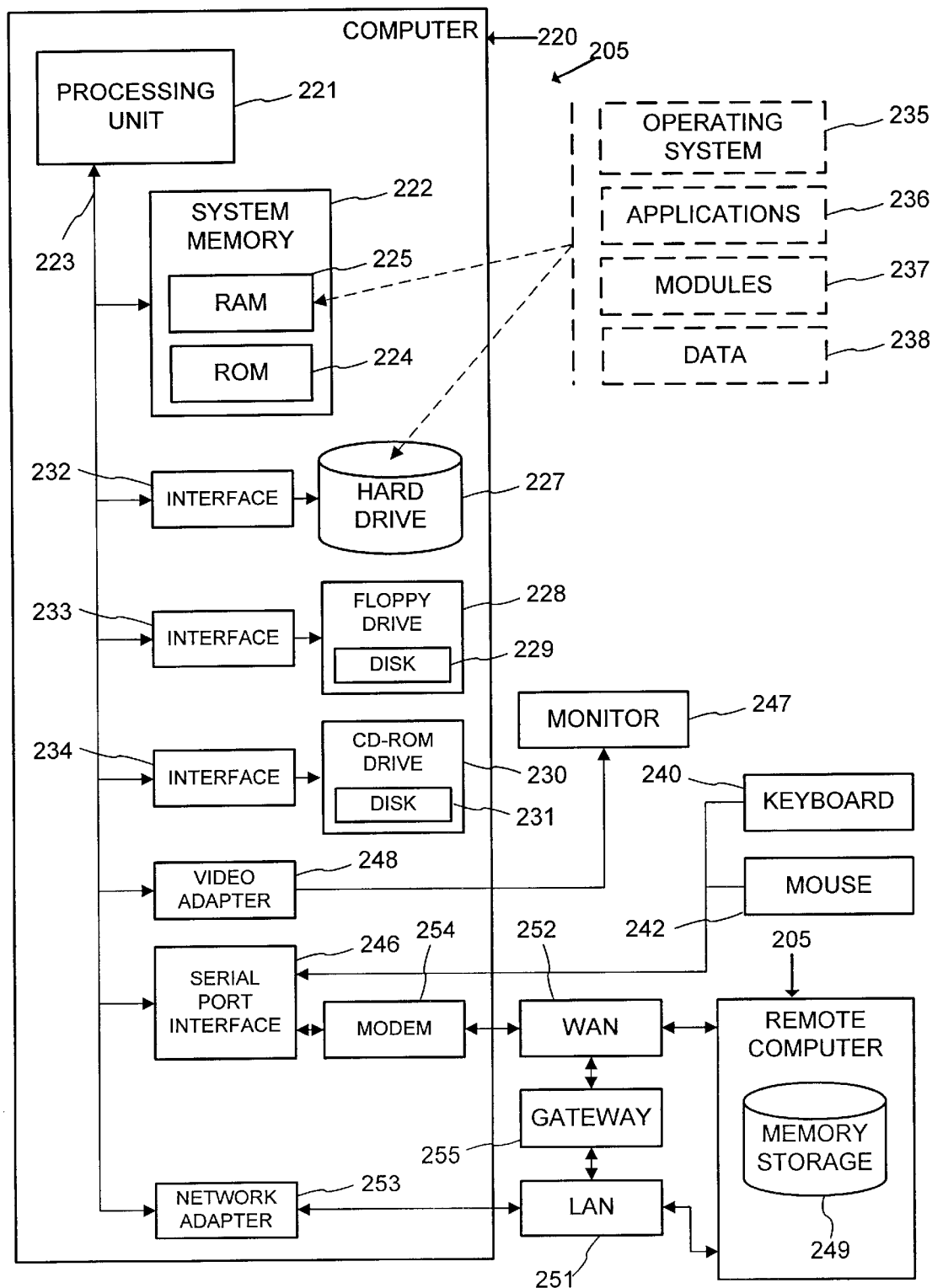
FIG. 3 is a block diagram of a computer system that can be used to implement the present invention.

FIG. 3 and the following discussion are intended to provide a brief, general description of a suitable computing environment in which the illustrative embodiment can be implemented. While the illustrative embodiment is at times described in the general context of computer-executable instructions that run on computers, those skilled in the art will recognize that the illustrative embodiment can be implemented as a combination of program modules, or in combination with other program modules. Generally, program modules include routines, programs, components, data structures, etc. that perform particular tasks or implement particular abstract data types. The illustrative embodiment can be implemented as a distributed application, one including program modules located on different computers in a distributed computing environment. The illustrative embodiment can be implemented as one or more application specific integrated circuits or as an improvement upon existing integrated circuits. Moreover, the illustrative embodiment can be implemented as a combination of the above software and hardware implementations.

FIG. 3 illustrates an example of a computer system 205 that can serve as an operating environment for the illustrative embodiment. The computer system 205 can be any of several types of computer system configurations, including personal computers, hand-held devices, multiprocessor systems, microprocessor-based or programmable consumer electronics, minicomputers, mainframe computers, and the like.

With reference to FIG. 3, an exemplary computer system for implementing the illustrative embodiment includes a computer 220 (such as a personal computer, laptop, palmtop, set-top, server, mainframe, and other varieties of computer), including a processing unit 221, a system memory 222, and a system bus 223 that couples various system components including the system memory to the processing unit 221. The processing unit can be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM; and Motorola. Dual microprocessors and other multi-processor architectures also can be used as the processing unit 221.

The system bus can be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 224 and random access memory (RAM) 225. A basic input/output system (BIOS), containing the basic routines that help to transfer information between elements within the computer 220, such as during start-up, is stored in ROM 224.

The computer 220 further includes a hard disk drive 227, a magnetic disk drive 228, e.g., to read from or write to a removable disk 229, and an optical disk drive 230, e.g., for reading a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the computer 220. Although the description of computer-readable media above refers to a hard disk, a removable magnetic disk and a CD, it should be appreciated by those. skilled in the art that other types of media which are readable by a computer, such as magnetic cassettes, flash memory cards, digital video disks, Bernoulli cartridges, and the like, can also be used in the exemplary operating environment.

A number of program modules can be stored in the drives and RAM 225, including an operating system 235, one or more application programs 236, other program modules 237, and program data 238.

A user can enter commands and information into the computer 220 20 through a keyboard 240 and pointing device, such as a mouse 242. Other input devices (not shown) can include a microphone, joystick, game pad, satellite dish, scanner, or the like. These and other input devices are often connected to the processing unit 221 through a serial port interface 246 that is coupled to the system bus, but can be connected by other interfaces, such as a parallel port, game port or a universal serial bus (USB). A monitor 247 or other type of display device is also connected to the system bus 223 via an interface, such as a video adapter 248. To improve performance for multimedia, computers can include other multimedia adapters (not shown), such as a sound card or other multimedia card. In addition to the monitor, computers typically include other peripheral output devices (not shown), such as speakers and printers.

The computer 220 can operate in a networked environment using logical connections to one or more other computer systems 205. The other computer systems 205 can be clients, servers, routers, peer devices or other common network nodes, and typically include many or all of the elements described relative to the computer 220, although only a memory storage device 249 has been illustrated in FIG. 3. The logical connections depicted in FIG. 3 include a local area network (LAN) 251 and a wide area network (WAN) 252. Such networking environments are commonplace in offices, enterprise-wide computer networks, intranets and the Internet. Other types of connections (not shown) include satellite, infrared, and radio frequency connections, broadcast and cable TV connections, and other packet and circuit-switched connections.

When used in a LAN networking environment, the computer 220 is connected to the local network 251 through a network interface or adapter 253. When used in a WAN networking environment, the computer 220 typically includes a modem 254 or other means for establishing communications (e.g., via the LAN 251 and a gateway or proxy server 255) over the wide area network 252, such as the Internet. The modem 254, which can be internal or external, is connected to the system bus 223 via the serial port interface 246. In a networked environment, program modules depicted relative to the computer 220, or portions thereof, can be stored in the remote memory storage device. It will be appreciated that the network connections shown are exemplary and other means of establishing a communications link between the computer systems 205 (including an Ethernet card, ISDN terminal adapter, ADSL modem, 10BaseT adapter, 100BaseT adapter, ATM adapter, or the like) can be used.

In accordance with the practices of persons skilled in the art of computer programming, the illustrative embodiment is described below with reference to acts and symbolic representations of operations that are performed by the computer 220, unless indicated otherwise. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations where data bits are maintained are physical locations that have particular electrical, magnetic, or optical properties corresponding to the data bits.

II. Light Fields

The illustrative embodiment relates to efficient compression, decompression, rendering, and other manipulation of light field images. A light field models the light leaving a bounded object or entering a bounded region of space. For an object or static scene, light intensity and color values are captured along a surface that encloses the object or static scene. At an arbitrary point in space, one can determine light intensity and color values for light rays emanating from the object or static scene by tracing the light rays backwards to the enclosing surface. Alternatively, an "outward-looking" light field captures the light rays entering a bounded empty convex region of space. At an arbitrary point inside the region, light rays can be traced back to intersections on the bounding surface. A light field can be parameterized using two concentric surfaces such as two concentric cubes enclosing an object. Without loss of generality, the following description considers one plane of an inner cubical surface and a corresponding outer plane, such as those depicted in FIGS. 1 and 2.

Figure 1:
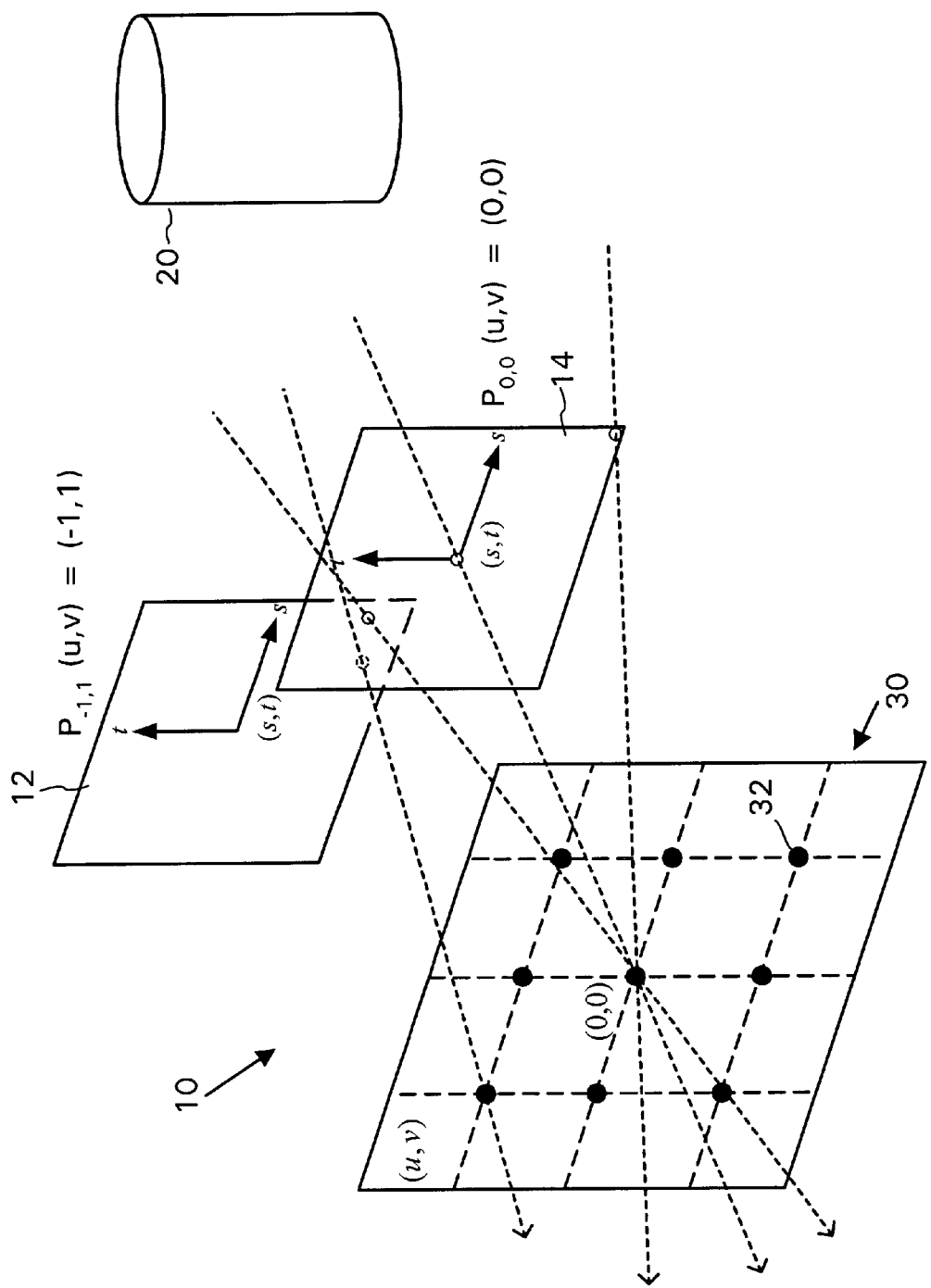
FIG. 1 is a diagram showing light field images of an object according to prior art.
Figure 2:
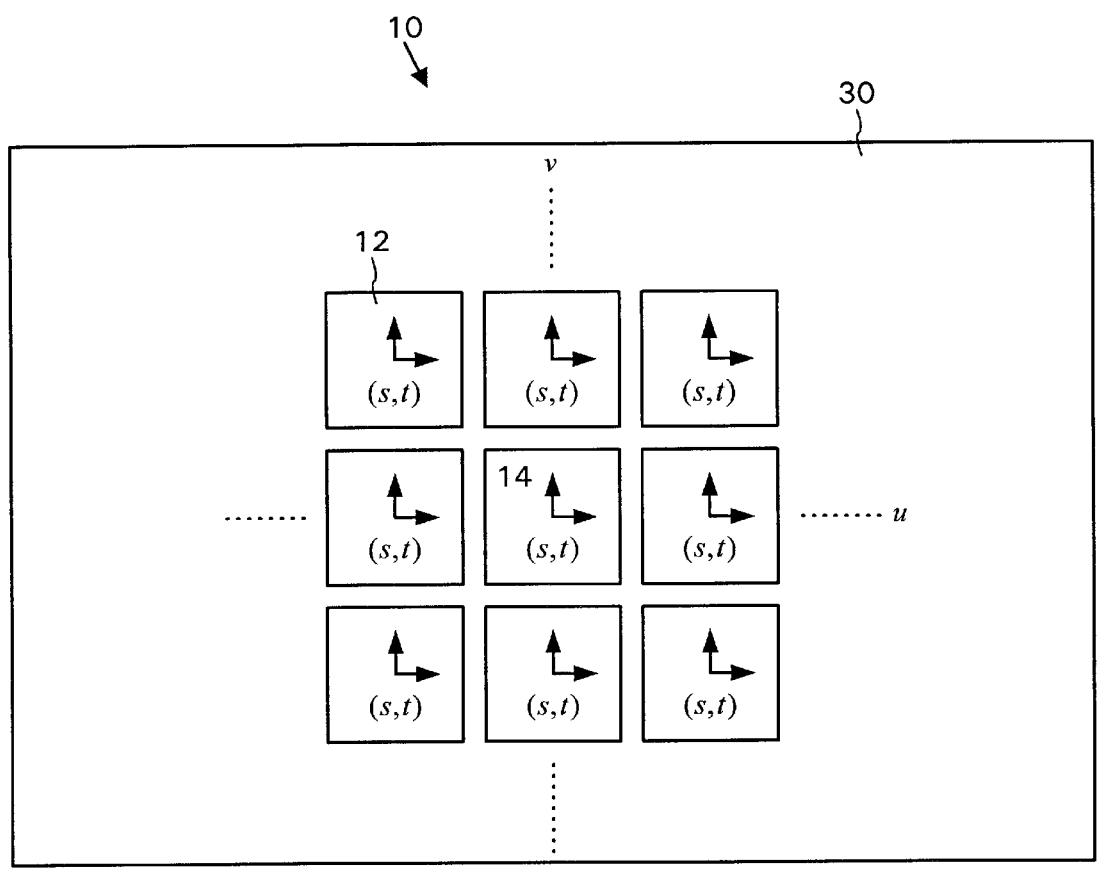
FIG. 2 is a block diagram showing a two-dimensional array of light field images according to prior art.

With reference to FIGS. 1 and 2, light field 10 includes a set of spatially-related light field images of an object 20. A light field image comprises a two-dimensional arrangement (s,t) of data values such as values from a color space (e.g., RGB, YUV, YIQ, or gray scale). An (s,t) grid point is indexed with (i,j). Light rays from the object 20 that pass through a light field image (s,t) also pass through a point in a (u,v) plane such as a focal point 32 on a two-dimensional (u,v) plane 30. A (u,v) grid point is indexed with (p,q). In FIG. 1, light rays from light field image 12 pass through focal point $P_{-1,1}$, while light rays from light field image 14 pass through focal point $P_{0,0}$. A (s,t,u,v) grid point is indexed with (i,j,p,q). While nine focal points 32 are depicted in FIGS. 1 and 2, alternatively, the (u,v) plane includes more or less focal points. Moreover, alternatively, an arbitrarily shaped plane, loop, or enclosing surface includes points for a light field model of an object or static scene.

A light field is generated by capturing light field images from points at multiple perspectives around an object or static scene. The light field images can be captured at the same instant or at different times, for example, by a camera attached to a gantry moving in a fixed pattern.

While the images of a light field are spatially related, temporal relationships between light field images are not fixed. The images can be captured simultaneously. For example, separate cameras in a parallel array can be used to capture images in real time from vantage points around an object or scene. Alternatively, different images can be taken at different times. If the light field portrays a real-world object or static scene, a camera on a robotic arm or sliding track can generate the images from various pre-defined or arbitrary positions. Alternatively, a hand-held camera generates the images. If the light field portrays a synthetic object, images of the synthetic object from different vantage points can be iteratively generated. A light field can be used in conjunction with another light field. Different light fields can be temporally-related. Various aspects of light fields are described in Gortler et al., "The Lumigraph," Computer Graphics Proceedings, Annual Conference Series, 1996, pp. 43–54 ["the Gortler reference"] and Levoy et al., "Light Field Rendering," Computer Graphics Proceedings, Annual Conference Series, 1996, pp. 31–42 ["the Levoy reference"].

A light field can be used in conjunction with a geometric model such as a three-dimensional geometric model of an object or static scene. The Gortler reference describes one technique for using geometric information derived from a set of light field images to create a geometric model. The geometric model is then used to refine a "Lumigraph" function by depth correction of basis functions for the Lumigraph function. As is known in the art, three-dimensional geometric models include polygon meshes, wireframe representations, parametric surfaces, and implicit surfaces.

Aside from light fields, many other areas in computer graphics and computer vision involve representation of light. These areas include light source/shadow maps, real and virtual environment maps, radiance maps, and ray tracing procedures. As noted, a light field is a set of spatially-related images of an object or static scene. Generally, a set of spatially-related views of an object or static scene is a group of two-dimensional planar projections of the object or static scene. Other types of spatially-related views of an object or static scene include a set of texture maps. Five-dimensional light fields include an additional spatial dimension towards/away from the object or static scene. In alternative embodiments, the present invention applies to one of the types of information described in this paragraph.

Macroblock Organization

Figure 4:
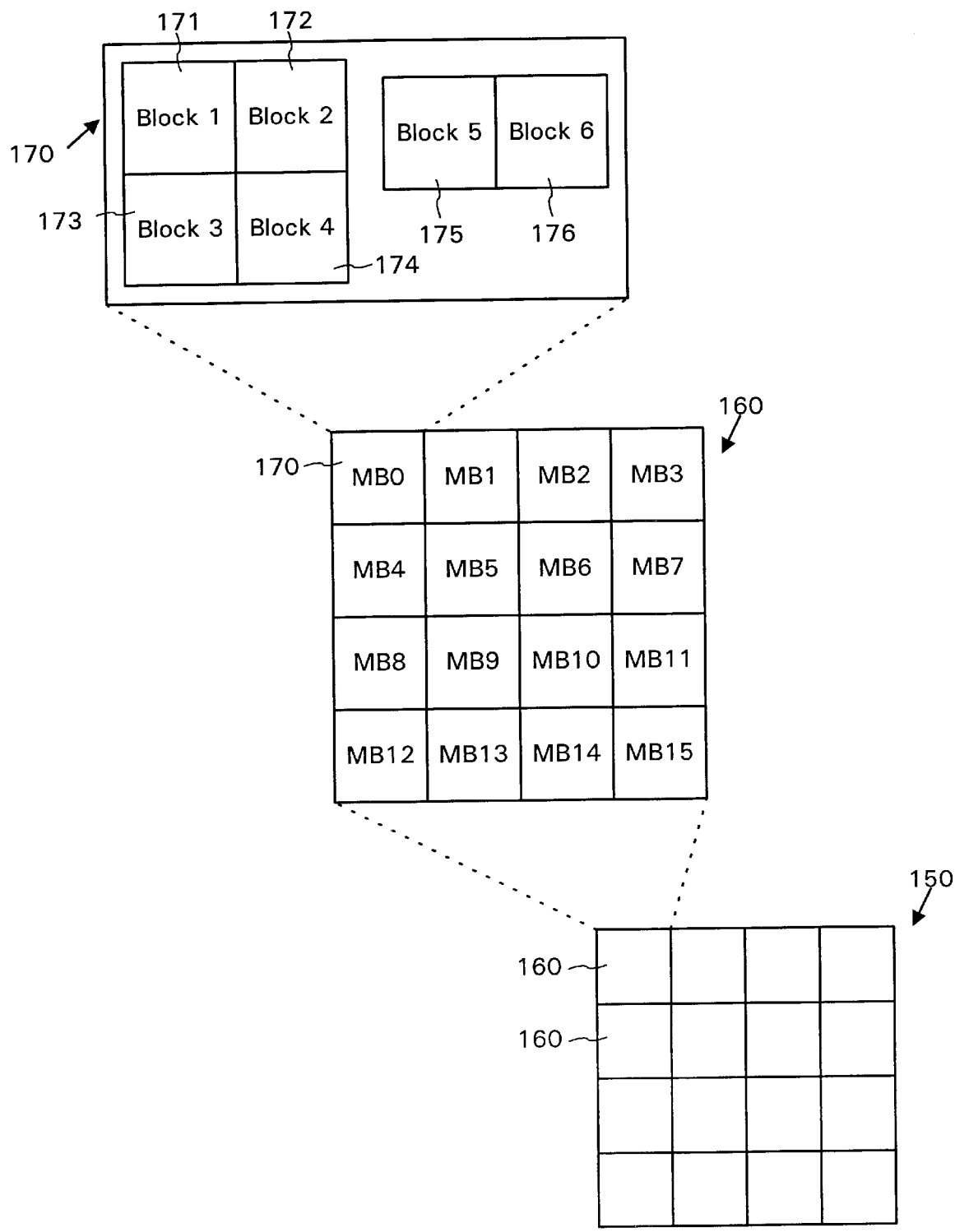
FIG. 4 is a block diagram showing a segmented light field image, a group of macroblocks, and a macroblock of light field image information.

By default in the illustrative embodiment, a light field image is organized by groups of macroblocks ["GMBs"]. FIG. 4 shows a light field image 150 and an expanded view of a GMB. The light field image 150 includes 16 GMBs 160. As shown in FIG. 4, a GMB 160 includes 16 macroblocks ["MBs"] 170. MB 170 in FIG. 4 is a 4:2:0 MB of a light field image. Each MB includes four luminance (Y) blocks 171–174 and two chrominance blocks (U, V) 175–176. The luminance blocks 171–174 are 8×8 blocks of light intensity values for a MB. The chrominance blocks 175–176 are 8×8 blocks of color offset values for the MB. With this configuration of blocks, a MB has a 16×16 luminance resolution and a 8×8 chrominance resolution. In general, a GMB is an ($N_{GMB} \times N_{GMB}$) array of non-overlapping MBs, where $N_{GMB}$ is a resolution in pixels. In FIG. 4, $N_{GMB}$ is 64, so the GMB

160 is a 4×4 array of 16×16 MBs. As is known in the art, other light field image sizes, other light field image organization sections, other resolutions of GMB and MB, other configurations of blocks within a MB (e.g., 4:2:2), and pixel values in other color spaces are possible.

A MB includes luminance and chrominance components. For coding operations involving a MB, the luminance component is often treated separately from the chrominance component. In general, the operations described with reference to whole, or composite MBs, can be carried out only for certain MB components, and vice versa.

Storage and Transmission of Light Fields

Light fields includes large amounts of information. An illustrative light field includes 16×16 points in the (u,v) plane. If each light field image has a resolution of 256×256 in the 24-bit YUV color space as in FIG. 4, the total amount of storage is:

16×16×(256×256+(2×128×128))×1 byte=24 Mbytes.

Within a light field, light field images typically exhibit spatial similarities if they are taken at adjacent locations. Therefore, there is often a significant amount of redundancy in the light field images. Storage and transmission of the light field images is made more efficient by removing such redundancy, as described below.

Light Field Rendering

Figure 5:
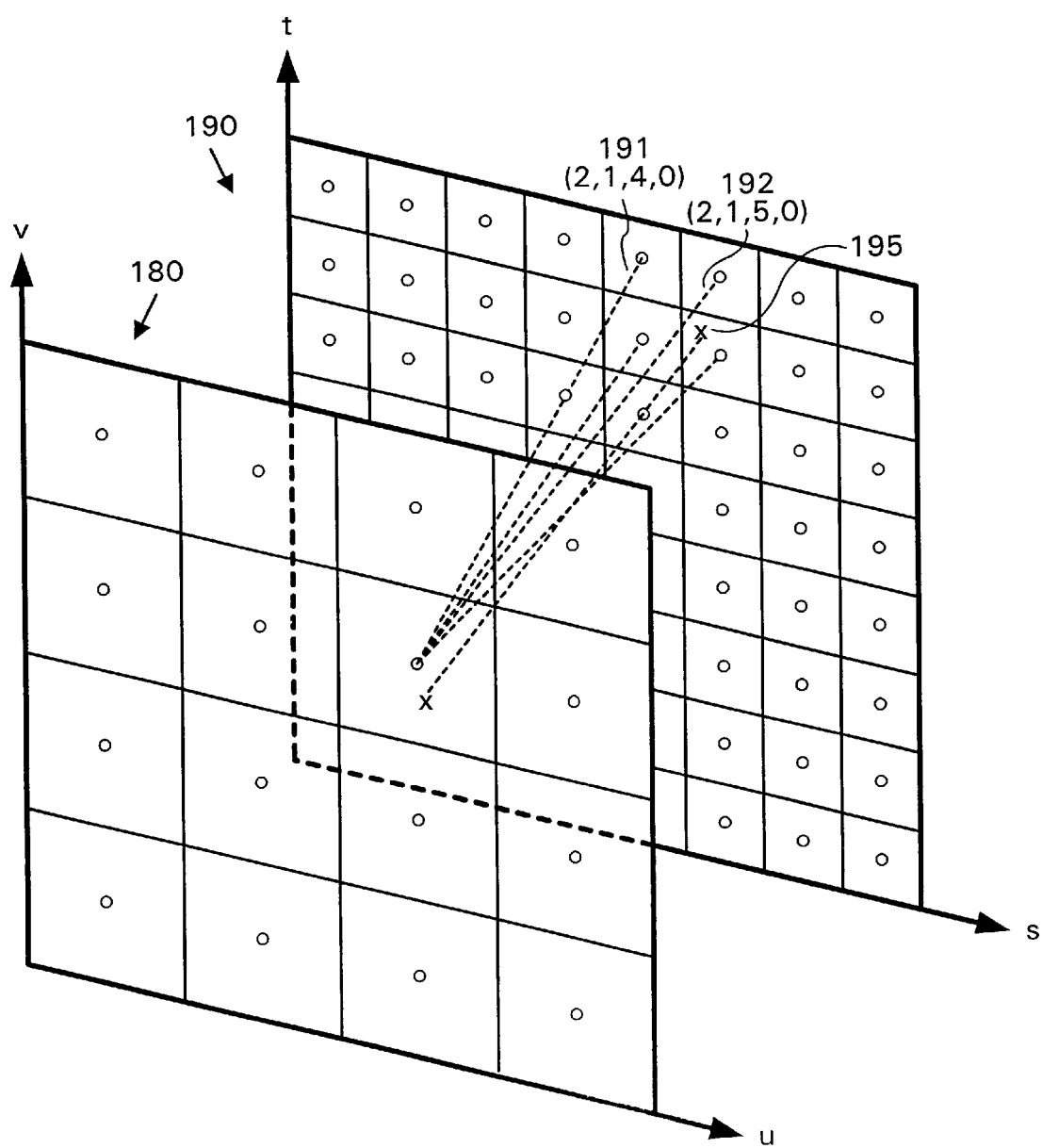
FIG. 5 is a diagram showing an intersection point on a discretized light field for a novel perspective light field image pixel during a rendering operation.

FIG. 5 shows an intersection point for a novel perspective light field image pixel on a discretized light field image for a rendering operation. A discretized light field image in a plane (s,t) 190 represents light rays that go through a focal point in the focal plane (u,v) 180. In FIG. 5, the (u,v) plane includes 16 focal points and the light field image plane (s,t) includes 64 points, but, in general, these planes can include more or less points. A light ray for the discretized light field image has four coordinates (i,j,p,q) that correspond to intercept points in the (s,t) and (u,v) planes. Light rays 191 and 192 pass through points (2,1,4,0) and (2,1,5,0), respectively.

Rendering involves estimating values for locations on a continuous light field based upon values in the discretized light field. To render a light field image at a novel perspective, pixels of the novel perspective light field image are created pixel by pixel, light ray by light ray, based upon a light field. After establishing the perspective of the novel perspective light field image, light rays are traced from a novel perspective light field image to intersect the (u,v) and (s,t) planes of the light field. With reference to FIG. 5, a light ray for a novel perspective light field image pixel is traced back to the light field. The light ray intersects the light field in the (s,t) and (u,v) planes at a four coordinate intersection point 195. Based upon the intersection point, a pixel value is determined using basis functions for the light field and values for one or more grid points (i,j,p,q) for light rays that come close to matching the traced light ray. A basis function associates a range of locations in a continuous light field with one or more discretized light field 4-D grid points. For a constant basis function, the novel perspective light field image pixel is given the value of the grid point (i,j,p,q) in the light field that is closest to the intersection point for the traced light ray. For a quadrilinear basis function, the novel perspective light field image pixel is given a value based on weighted interpolation of values of grid points (i,j,p,q) closest in multiple directions (e.g., 16 directions for a 4-dimensional hypercube) to the intersection of the traced light ray. For other basis functions, other techniques are used to weight grid point (i,j,p,q) values to yield a novel perspective light field image pixel value.

Rendering imposes considerable memory and processing requirements on a computer system due to the size of light field images, the complexity of the rendering operation, and the complexity of decoding compressed light fields. Serialized rendering operations, which give a viewer the impression of scrolling around an object or static scene, exacerbate these system requirements. Rendering requires manipulation of numerous light field images. During rendering, parts of selected light field images are retrieved and used to construct a view from a novel perspective. Depending on the perspective of the novel view being rendered, selected parts of selected light field images are processed. Techniques for efficiently accessing and decompressing selected parts of selected light field images are described below.

The complexity of certain rendering operations can be reduced without excessively degrading the subjective quality of the rendered views, for example, by exploiting perceptual weaknesses of the human visual system during periods of rapid movement. Thus, for rapid serial rendering operations, low-resolution versions of perspective views provide sufficient quality and at the same time reduce processing and memory requirements. Other quality loss may be necessary to support real time rendering due to a memory, processor, transmission, or other limitation on the computer system. Techniques for compression of light fields to facilitate efficient selective resolution access, decompression, and rendering are described below. For a light field separated into base layer information and enhancement layer information, depending on the current memory, processing, transmission, or other system capabilities, the quality of rendered views can be selectively degraded or enhanced.

Reference and Prediction Light Field Images

Figure 6:
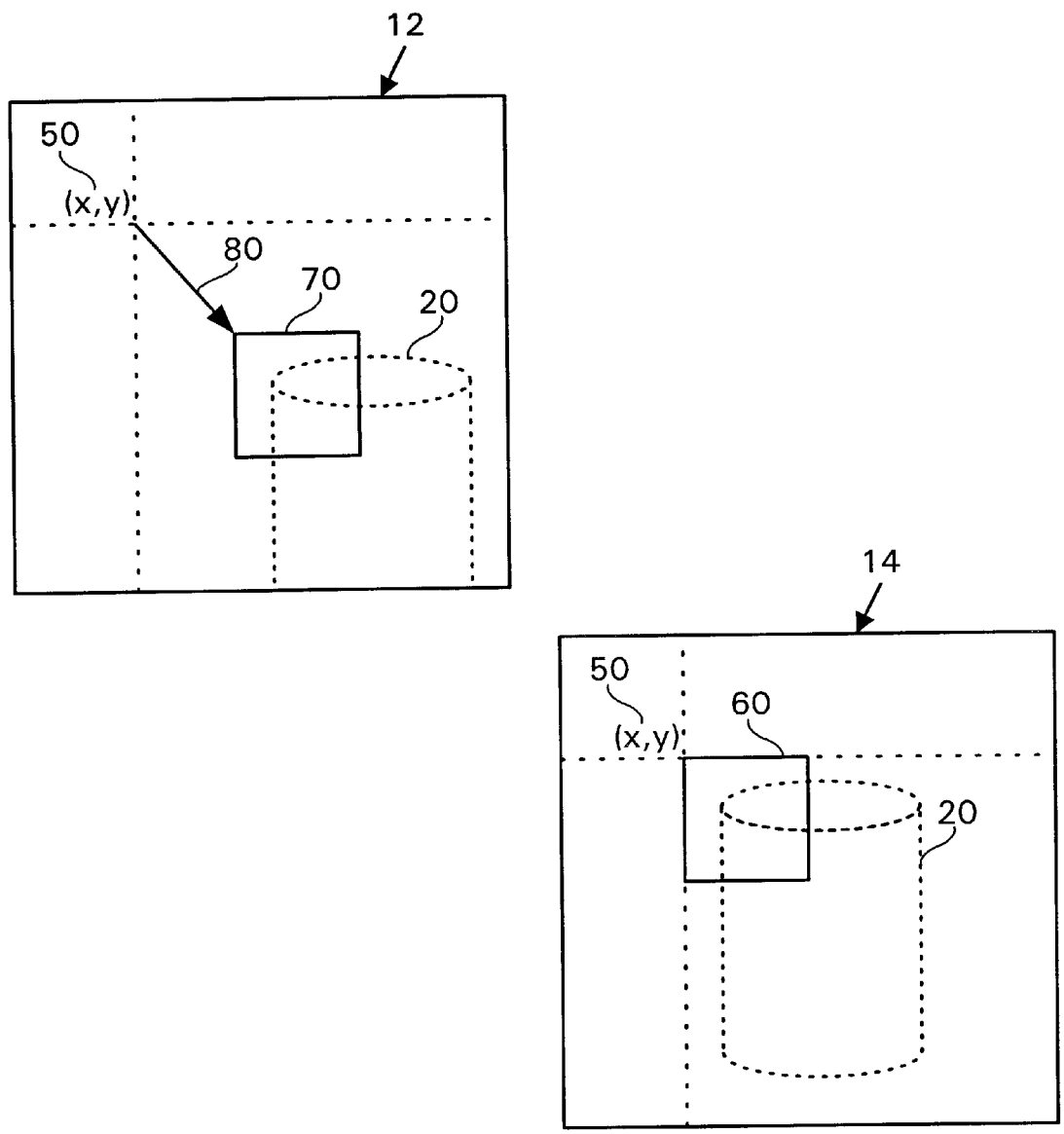
FIG. 6 is a block diagram showing estimation of spatial displacement from a reference light field image for a section of a prediction light field image.

Images from neighboring vantage points around an object or static scene often overlap to some extent, which creates inter-image spatial redundancy. For example, light field images 12 and 14 in FIG. 1 may exhibit spatial redundancy. Inter-image spatial redundancy can be reduced by estimating spatial displacement of a "prediction" light field image from one or more "reference" light field images. This also compresses representation of the prediction light field images, as described below. A reference light field image itself is compressed without reference to other light field images, as described below. FIG. 6 shows a spatial displacement estimate from a reference light field image 12 for a section of a prediction light field image 14.

III. Exemplary Data Structures

Compression of light field information often produces a variable bit-rate output. One convenient representation of this variable bit-rate output uses variable-size data objects ["VSDOs"]. Storing light field image information with VSDOs, as opposed to equal-size data objects, reduces storage and transmission requirements for the light field information. As a tradeoff, however, access to VSDOs within a data structure is typically more complicated than access to equal-size data objects. A data structure that stores VSDOs and also allows for selective and efficient access to VSDOs is described in Chan et al., "Data Structure For Efficient Access To Variable-Size Data Objects," a U.S. patent application filed concurrently herewith, and herein incorporated by reference. Using a data structure with VSDOs described in the Chan et al. application allows for selective and efficient access to particular light field information, and allows for efficient light field operations at selective levels of refinement.

A composite data structure includes a base field and an enhancement field. The enhancement field is implemented with a data structure with VSDOs, such as one of those described in the above-referenced application.

In accordance with the illustrative embodiment, the composite data structure stores information for a light field image. The base field stores data that is regularly accessed when a particular light field image is considered. The enhancement field stores data that is selectively and variably accessed. Thus, compressed light field image information in the base field can be unconditionally decompressed while compressed light field image information in the enhancement field is selectively and conditionally decompressed. By storing data that is regularly accessed apart from data that is selectively and variably accessed, overall access speed and efficiency are improved. To further improve access speed and efficiency, the composite data structure can include flag values that indicate the presence or absence of enhancement field information.

IV. Reducing Intra-Image Redundancy of a Reference Light Field Image through Subband Coding According to this aspect of the illustrative embodiment, a reference light field image is subband coded into multiple subbands. A subband includes graphical information of the original light field image within a specified frequency range. In general, a light field image can be separated into an arbitrary number of subbands.

Separating a light field image into multiple subbands facilitates selective resolution operations. Low frequency subbands can be compressed differently, stored differently, or accessed differently than higher resolution, lower significance subbands. Low frequency subbands for light field images contribute low resolution components to rendered perspective views. On the other hand, higher frequency subbands contribute higher resolution components to rendered perspective views. During rapid rendering, a rendering unit can access only the low frequency subbands to simplify processing by sacrificing high resolution detail. During less rapid rendering, the rendering unit can provide the supplementary detail from higher resolution subbands. When memory, processing, transmission, or other capabilities of a computer system are temporarily or permanently limited, a rendering unit can sacrifice higher resolution detail as necessary. In addition, compared to traditional block-based compression techniques, filtering of full light field images eliminates blocking artifacts and offers more graceful light field image quality degradation.

Subband coding involves filtering an input signal such as a light field image. After filtering, the resulting filtered information is sub-sampled to remove redundancy while reducing spatial resolution. Subbands can be compressed and stored in data structure with VSDOs.

To simplify presentation of the principles and techniques of intraframe coding, various actions are described below as performed by a compression unit or decompression unit. For example, these units can be implemented as hardware or software codecs. In general, the compression unit and decompression unit can be any functional operator or combination of functional operators in a computer system, and are not limited to any particular software or hardware implementation.

Digital Filters, Filter Banks, and Subband Coding In General
Digital Filters

A digital filter performs an operation upon a digital information signal such as separating various frequencies of the digital information signal. A band-pass filter is a digital filter that allows certain frequencies of an input signal to pass through with slight or no distortion and attenuates other frequencies. A lowpass filter attenuates high frequency components and passes low frequency components. A highpass filter attenuates low frequency components and passes high frequency components. Band-pass filters can be designed to attenuate or pass an arbitrary, specified frequency range.

In the context of graphical information, frequency typically relates to effective spatial resolution. A low-resolution version of a light field image can be reconstructed from a low frequency subband. The design and function of digital filters are well known in the art. Additional detail about digital filters can be found, as necessary, in R. W. Hammond, *Digital Filters*, Prentice Hall, $2^{nd}$ edition, 1983 or Stephen Solari, *Digital Video and Audio Compression*, McGraw-Hill, 1997. Additional detail about the design and function of digital filter banks can be found, as necessary, in P. P. Vaidyanathan, *Multirate Systems and Filter Banks*, Prentice Hall, Englewood Cliffs, 1993.

Filter Banks and Subband Coding

Figure 7:
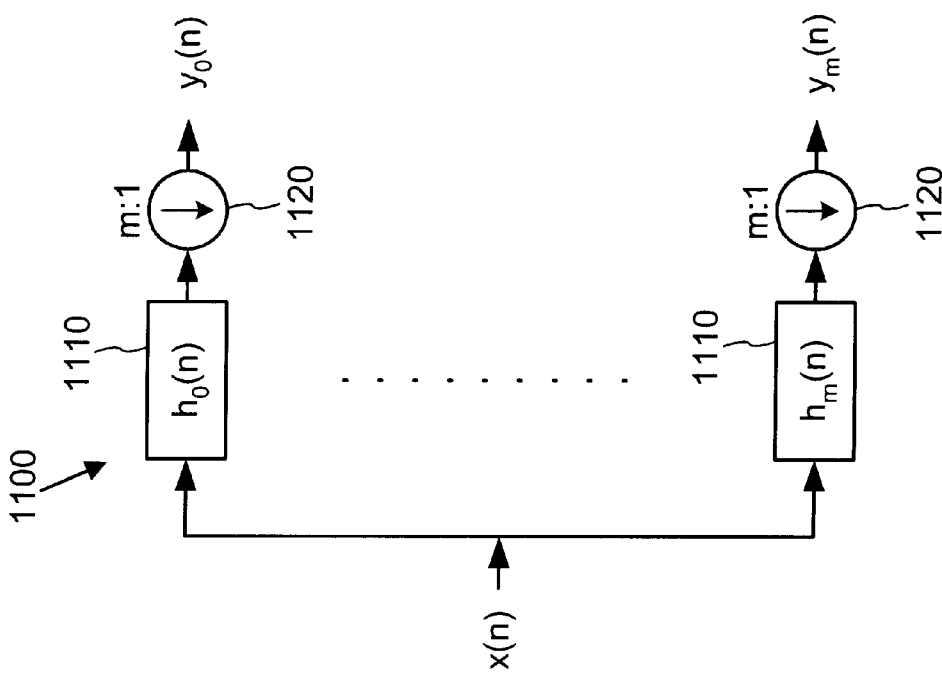
FIG. 7 is a block diagram showing an analysis filter bank of m digital filters followed by a set of m decimators.

An analysis filter bank, ["filter bank"], is an arrangement of m digital filters that separates an input signal x(n) into m output signals $y_1(n)$ $y_2(n)$, . . . , $y_m(n)$. FIG. 7 shows a filter bank 1100 of m digital filters 1110 that separate the input signal x(n) into m output signals $y_1(n)$, $y_2(n)$ . . . , $y_m(n)$.

Each of the digital filters 1110 filters the input signal x(n) according to an impulse response function $h_1(n)$, $h_2(n)$, . . . $h_m(n)$. In FIG. 7, the digital filters 1110 can be implemented, for example, by (9-7) biorthogonal wavelet filter banks. The wavelet filter banks can be implemented with simple hardware, provide reduced blocking artifacts, and allow graceful image degradation.

After the decimators 1120, the output signals $y_1(n)$, $y_2(n)$ . . . , $y_m(n)$ have equal numbers of samples as the original input signal x(n).

Taking as input a light field image with pixels x lines samples, filtering by m filters produces m frequency component versions of the original light field image, each version having pixels x lines samples. Within any one of the frequency component versions, however, redundancy can be eliminated by a factor of m without losing meaningful information. FIG. 7 shows m m:1 decimators 1120 following the m digital filters 1110. The m:1 decimators 1120 subsample the output signals from the digital filters 1110. After m:1 decimation, the sum of the samples in the m output signals $y_1(n)$, $y_2(n)$ . . . , $y_m(n)$ equals the number of samples in the original input signal x(n). While the number of samples is the same, however, the varying significance of the different output signals $y_1(n)$ $y_2(n)$ . . . , $y_m(n)$ facilitates selective resolution operations.

Subband coding filters an input signal to isolate in separate subbands the components of the input signal for specified frequency ranges. After filtering with highpass and lowpass filters, for example, the input signal x(n) is split into two subbands $x_1(n)$ and $x_2(n)$. As expected, the lower frequency subband $x_1(n)$ includes a larger proportion of the energy of the original light field image than the higher frequency subband $x_2(n)$. Decimation by a factor of 2 makes the total number of samples in the subbands identical to number in the original information signal. To reconstruct the original input signal x(n), 1:2 interpolation restores the original scaling of the frequency axis and removes the parts of the spectra that were added during decimation. The original signal is reconstructed by adding both subbands.

Figure 8:
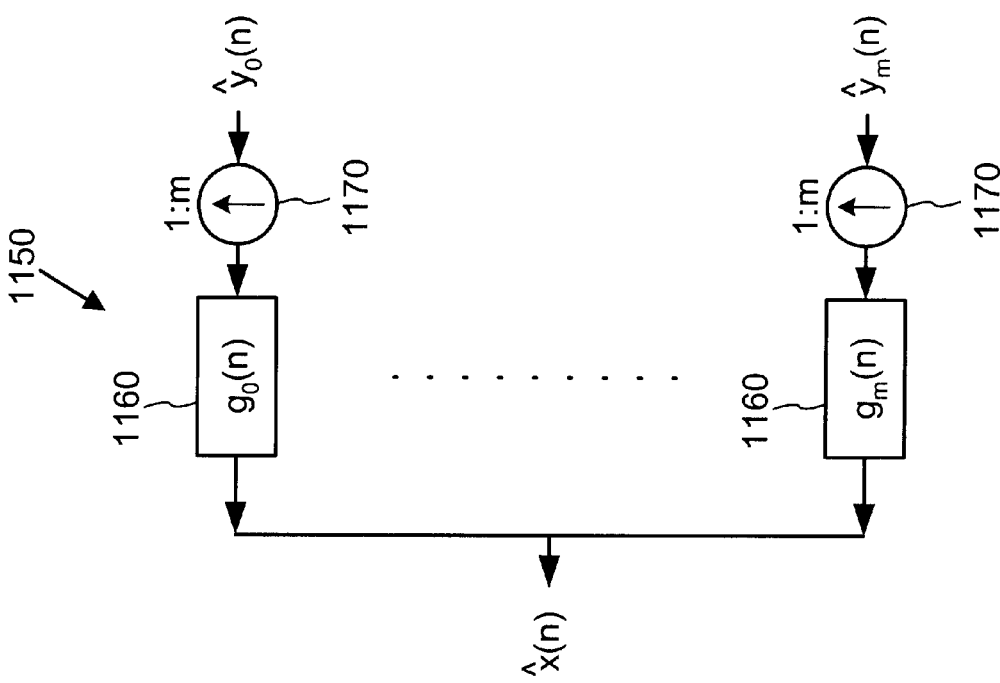
FIG. 8 is a block diagram showing a synthesis filter bank of m digital filters followed by a set of m decimators.

FIG. 8 shows a synthesis filter bank 1150. The synthesis filter bank 1150 performs the inverse of the operations performed by the analysis filter bank 1100. The synthesis filter bank 1150 is an arrangement of m digital synthesis filters 1160. The synthesis filter bank 1150 reconstructs a signal $\hat{x}(n)$ approximating the original input signal $x(n)$ using input signals $\hat{y}_0(n), \hat{y}_1(n), \ldots \hat{y}_m(n)$. The signals $\hat{y}_0(n), \hat{y}_1(n), \ldots \hat{y}_m(n)$ are designated differently from signals $y_1(n), y_2(n) \ldots, y_m(n)$ of FIG. 7 to signify the effects of lossy compression and possible distortion due to transmission error. The synthesis filter bank 1150 works with m 1:m interpolators 1170 that restore the reduced sampling rate introduced by the m m:1 decimators 1120. Each of the digital synthesis filters 1160 performs filtering $g(n)$ on an input signal $\hat{y}(n)$. In FIG. 8, each of the digital synthesis filters performs filtering with impulse response function $g_0(n), g_1(n), \ldots g_m(n)$. The original signal is reconstructed by adding the restored subbands. Subband coding of images is described in John W. Woods, "Subband Coding of Images," IEEE Trans. Acoust. Speech, Signal Processing, vol. ASSP-34, pp. 1278–88, October 1986.

Filter Banks and Subband Coding in the Illustrative Embodiment

By default, a compression unit includes at least one analysis filter bank with a highpass filter and a lowpass filter. Thus, the filters produce two subbands with equal numbers of samples. By default, subband filters produce simple integer coefficients as output by using integer filter banks such as those with a (9-7) symmetric biorthogonal integer wavelet transform or a B-spline integer wavelet transform. The highpass and lowpass filters are followed by 2:1 decimators which sub-sample the output of the filters. In alternative embodiments, filter banks produce real subband coefficients or use a different number of filters subband code a light field image.

The compression unit can include cascaded filter banks to increase subband precision and improve performance. To cascade, the compression unit feeds the output of one filter bank into one or more other filter banks. The result depends on which output signals are input into the additional filter banks. Additional filter banks can cascade behind a first filter bank in a symmetric manner to improve the performance of a first filter bank. Alternatively, additional filter banks can cascade behind a first filter bank in an asymmetric manner.

To subband code a light field image in multiple dimensions, a compression unit subband codes successively read out lines of the image to exploit horizontally-oriented statistical dependencies. To exploit vertically-oriented statistical dependencies, the compression unit subband codes the successively read out columns of the resulting signal. Where an input signal has statistical dependencies in multiple dimensions, subband coding with cascaded filter banks can exploit those dependencies.

To increase the performance or frequency resolution (frequency precision) of one or more output signals of a first filter bank, the compression unit can apply additional filter banks to those one or more output signals. Thus, when the low frequency range of a light field image has relatively high energy, the compression unit can efficiently decompose or filter the low frequency range into higher frequency resolution or precision subbands by asymmetrically cascading filter banks.

A multi-dimensional filter bank can be separable or non-separable. In a separable filter bank, a signal is separated or decomposed to a specified degree of frequency resolution or precision in a first dimension, then separated to a specified degree of precision in a second dimension, etc. For example, a signal is first filtered or separated horizontally, then filtered or separated vertically. In a non-separable filter bank, a signal is filtered or separated using a set of multi-dimensional filters in one or more dimensions simultaneously.

Figure 9:
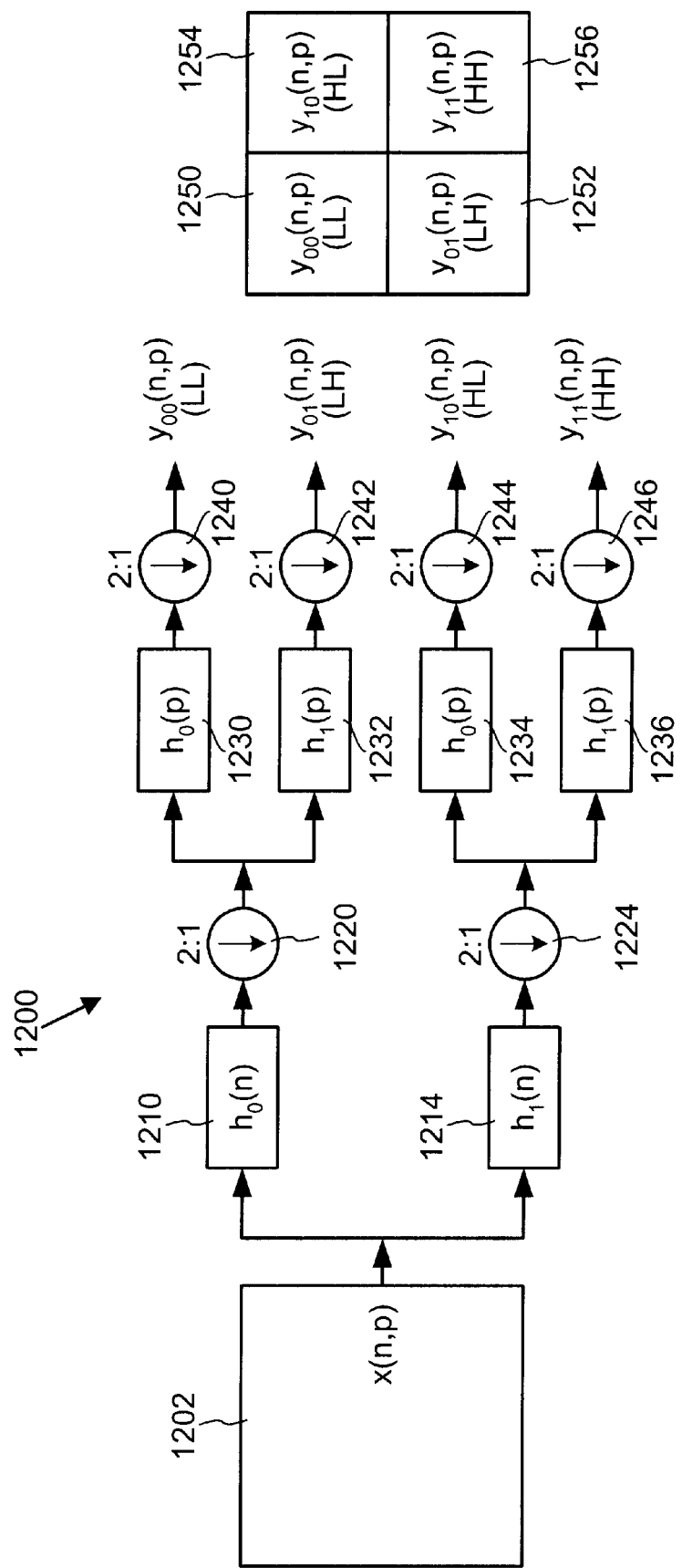
FIG. 9 is a block diagram showing a two-dimensional analysis filter bank.

FIG. 9 shows a two-dimensional cascade 1200 of filter banks that symmetrically subband codes a light field image 1202. The compression unit first filters light field image 1202 $x(n,p)$ in the horizontal direction by a filter bank with lowpass/highpass filters 1210, 1214. The lowpass filter filters according to an impulse response function $h_0(\ )$, while the highpass filter filters according to an impulse response function $h_1(\ )$. The compression unit sub-samples the two intermediate output signals with 2:1 decimators 1220 and 1224, respectively. Next, the compression unit filters the two intermediate output signals in the vertical direction by filter banks with lowpass/highpass filters 1230, 1232, 1234 and 1236. The compression unit then sub-samples the four intermediate output signals from vertical filtering with 2:1 decimators 1240, 1242, 1244, and 1246. The output signal $y_{00}(n,p)$ 1250 is the output of the horizontal and vertical lowpass filtering ("low/low,""LL"). The LL band includes more significant information than the other subbands. The output signal $y_{01}(n,p)$ 1252 is the output of the horizontal lowpass and vertical highpass filtering ("low/high,""LH"). The output signal $y_{10}(n,p)$ 1254 is the output of the horizontal highpass and vertical lowpass filtering ("high/low,""HL"). The output signal $y_{11}(n,p)$ 1256 is the output of the horizontal and vertical highpass filtering ("high/high,""HH"). Following subband coding, the compression unit can compress the subbands, as described below.

Figure 10:
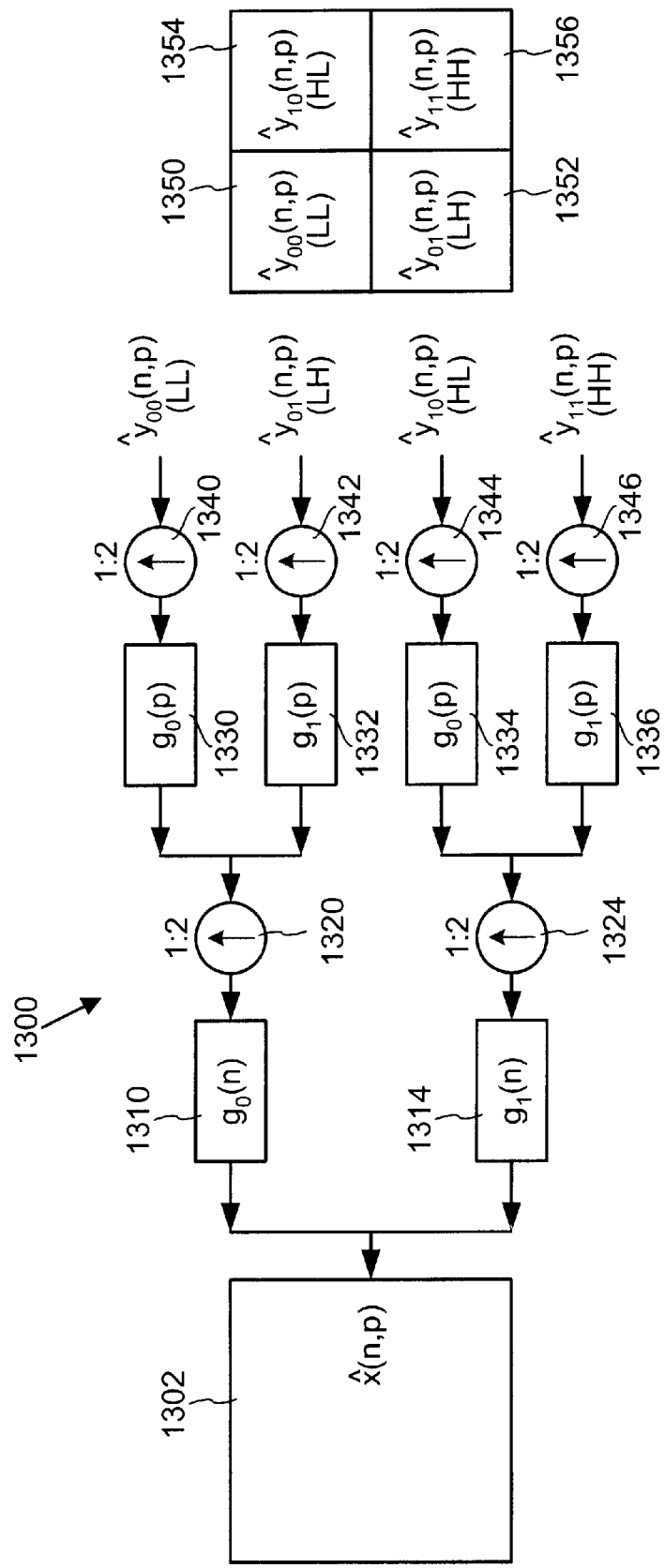
FIG. 10 is a block diagram showing a two-dimensional synthesis filter bank.

FIG. 10 shows a synthesis filter bank 1300 used to reconstruct a version 1302 $\hat{x}(n,p)$ of the original light field image 1202 $x(n,p)$ from the output signals of the analysis filter bank 1200. 1:2 interpolators 1340, 1342, 1344, 1346 upsample the decompressed signals $\hat{y}_{00}(n,p)$, $\hat{y}_{01}(n,p)$, $\hat{y}_{10}(n,p)$, $\hat{y}_{11}(n,p)$. A synthesis filter bank with synthesis filters 1330 and 1332 restores vertical statistical dependencies between $\hat{y}_{00}(n,p)$ and $\hat{y}_{01}(n,p)$. Synthesis filters 1330 and 1332 utilize impulse response functions $g_o(\ )$ and $g_1(\ )$, respectively. A synthesis filter bank with synthesis filters 1334 and 1336 restores vertical statistical dependencies between $\hat{y}_{10}(n,p)$ and $\hat{y}_{11}(n,p)$. The intermediate output signals are fed into 1:2 interpolators 1320 and 1324. Finally, a synthesis filter bank with synthesis filters 1310 and 1314 restores horizontal statistical dependencies between the output signals of the 1:2 interpolators 1320 and 1324 to restore a version 1302 $\hat{x}(n,p)$ of the original light field image 1202 $x(n,p)$.

Figure 11:
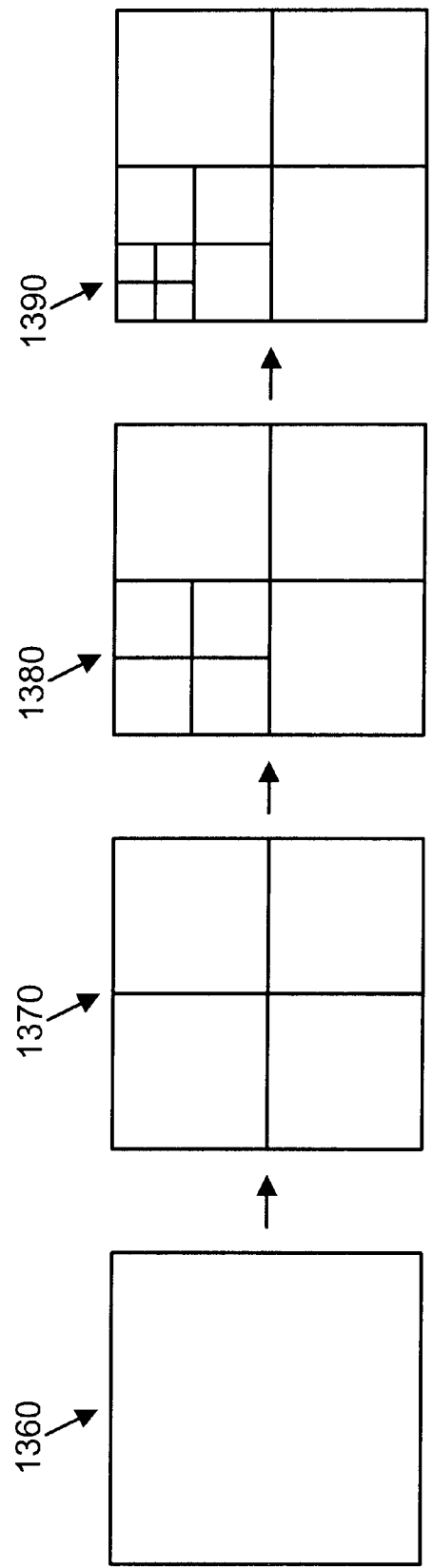
FIG. 11 is a block diagram showing two-dimensional subband coding with cascading to a depth of three levels for the lowest frequency ranges.

FIG. 11 shows a light field image 1360 subband coded by a cascade of two-dimensional filter banks to frequency decompose the low frequency ranges of a light field image 1360 to a higher degree of frequency resolution or precision. A compression unit subband codes a light field image 1360 with a first two-dimensional filter bank, producing signal 1370 with LL, LH, HL, and HH bands. The compression unit further frequency decomposes the LL band of light field image signal 1370 with a filter bank to produce a light field image signal 1380 with two depth levels of frequency decomposition precision for the LL subband. Finally, the compression unit frequency decomposes the lowest frequency range component of the light field image signal 1380 with a two-dimensional filter bank to produce light field image signal 1390. The efficiency of this technique relates to the frequency spectrum characteristics of light field image signal 1390. The smallest, highest precision subbands correspond to the highest energy portions of the original light field image 1360. In alternative embodiments, a compression unit decomposes a light field image to a different level of frequency decomposition or in different dimensions.

In general, subband coefficients are real numbers. Thus, the storage requirements of an intermediate decoded light field image are considerable. According to the illustrated embodiment, however, by default the compression unit subband codes a light field image using filter banks with integer outputs. The resulting subband coefficients are integers with much smaller word length than corresponding real numbers, which reduces the storage requirements for the subbands and decreases the arithmetic complexity of decoding operations. In alternative embodiments, a compression subband codes a light field image using filter banks producing real number subband coefficients. The real number subband coefficients can then be truncated or quantized to reduce storage and processing requirements.

Subsequent Compression of Subbands

Following subband coding, the total storage requirements for the subbands are comparable to the storage requirements for the original light field image. After subband coding, however, the light field information is more easily compressed efficiently. The highest energy components of the original light field image are in the low frequency subbands. The compression unit compresses lower frequency subbands so as to largely preserve the quality of the information stored in the lower frequency subbands, as described below. The compression unit transform codes, quantizes, and entropy codes higher frequency subbands. In alternative embodiments, the compression unit applies different compression techniques to compress the subbands.

Coding of the Top-Level LL Subband

As shown in FIG. 11, after a first level of frequency decomposition, the compression unit can perform additional frequency decomposition on the LL subband using analysis filter banks. Additional frequency decomposition, also shown in FIG. 12, produces a multi-resolution representation of the LL subband. FIG. 14 shows a compression scheme 1400 used to compress a frequency decomposed LL subband. The compression unit forms wavelet blocks from the multi-resolution representation of the LL subband, as shown in FIG. 13. The compression unit then compresses the wavelet blocks by zero-tree coding using successive approximation quantization and arithmetic coding. In alternative embodiments, the compression unit uses other compression techniques to reduce representation of the lower frequency subbands.

Figure 12:
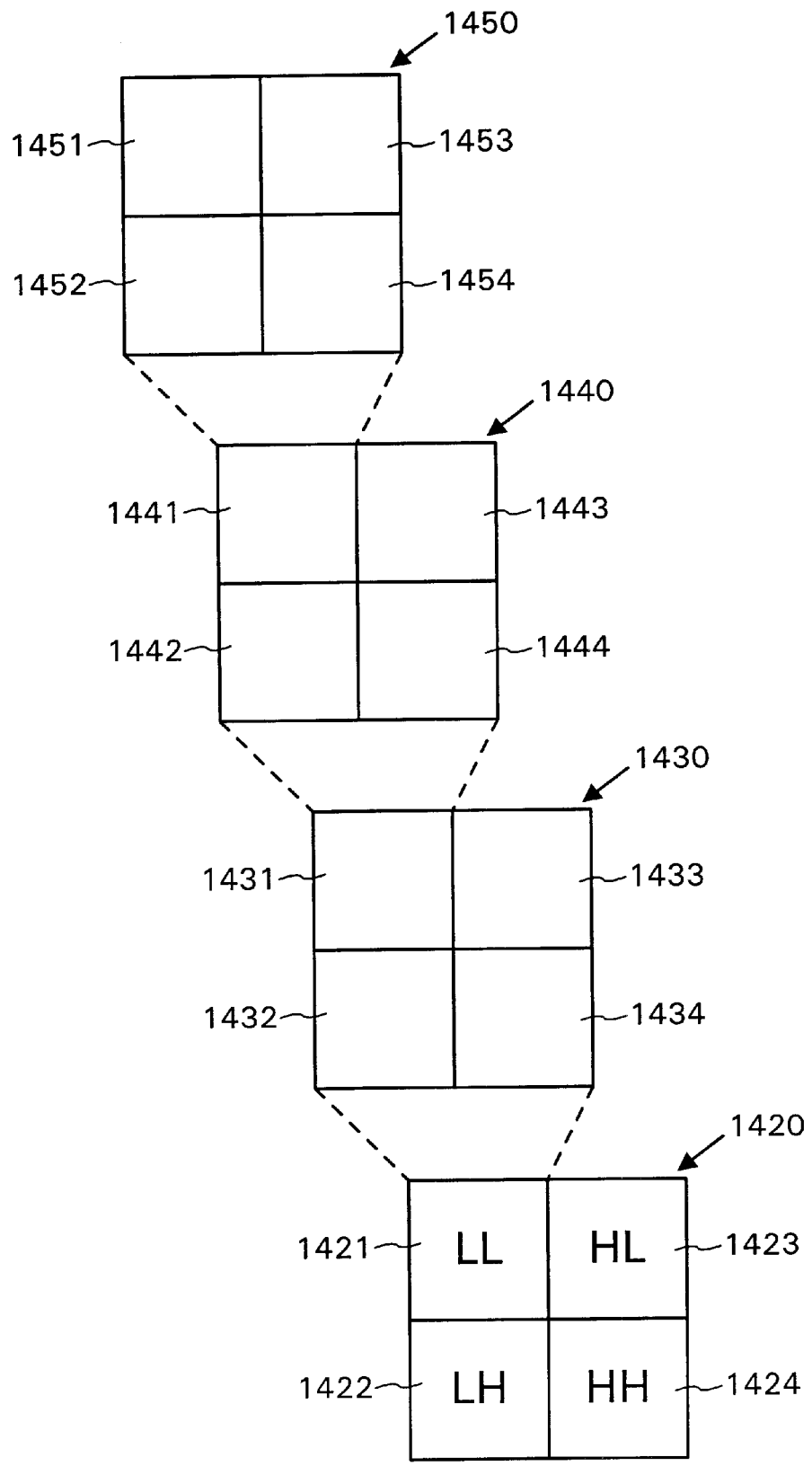
FIG. 12 is a block diagram showing frequency decomposition of the LL subband of a light field image to three additional levels of frequency decomposition.
Figure 13:
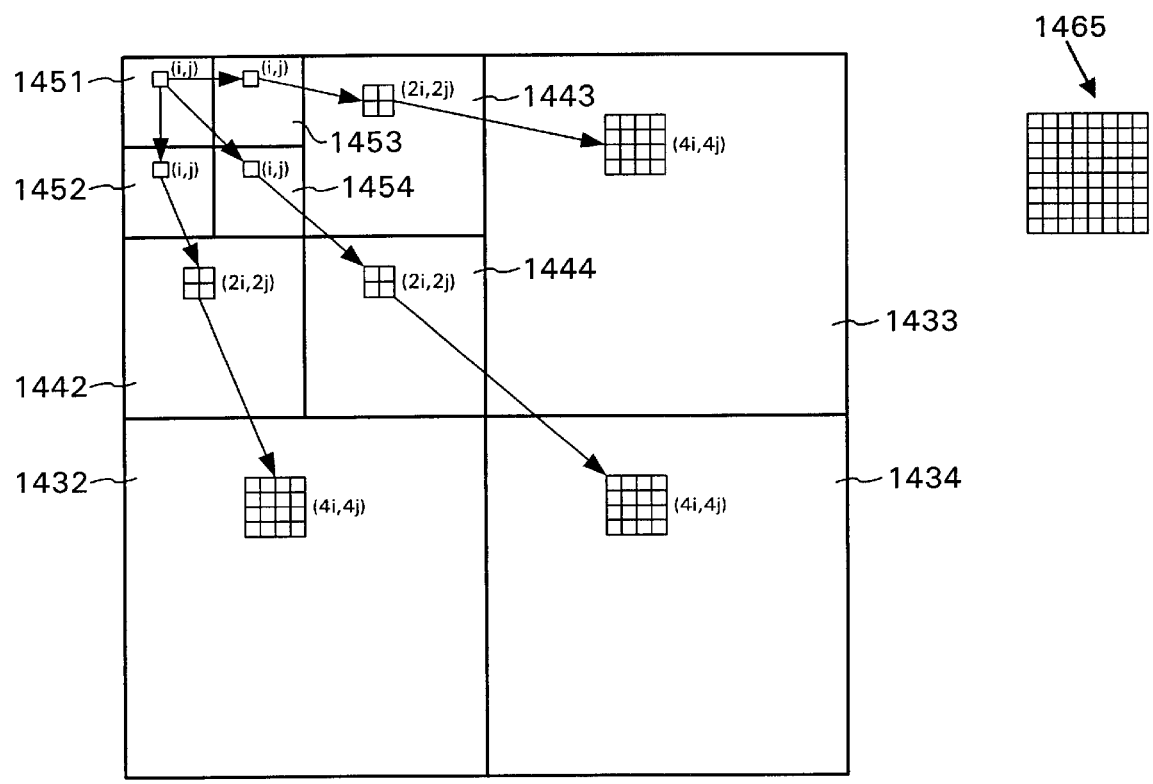
FIG. 13 is a block diagram showing a wavelet block formed from a multi-resolution representation of a LL subband at three levels of frequency decomposition.
Figure 14:
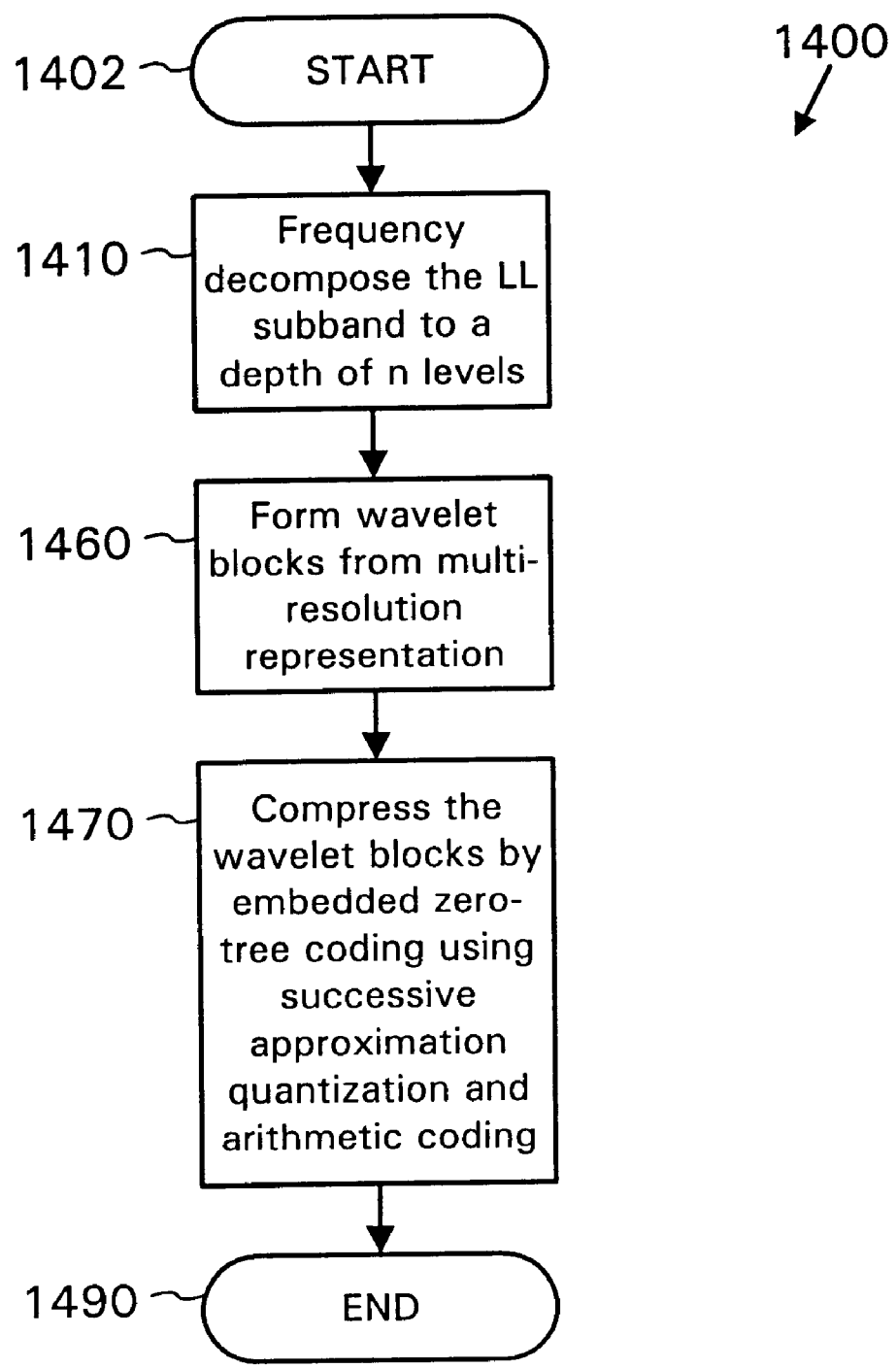
FIG. 14 is a flowchart showing a technique for compression of lower frequency subbands.

With reference to FIGS. 12, 13, and 14, after a first level of filtering, the compression unit performs (act 1410) additional frequency decomposition on the LL subband of a light field image using cascaded analysis filter banks. The compression unit decomposes the LL band to a depth of n levels. In FIGS. 12 and 13, n is 3. Generally, the number n of levels of decomposition can vary according to the nature of the light field image to be encoded. Increasing the number of levels of frequency decomposition allows finer separation of frequency components. For light field images, the compression unit commonly uses three to six levels of frequency decomposition.

FIG. 12 shows frequency decomposition of a LL subband 1421 of a light field image 1420 into a multi-resolution representation. The resolution of the original light field image 1420 is 256×256 and the resolution of the LL subband 1421 (level 0) is 128×128. The compression unit decomposes the LL subband 1421 to a first level 1430 of frequency decomposition using analysis filter banks and decimators. The first level 1430 includes 64×64 subbands 1431, 1432, 1433, and 1434. Next, the compression unit decomposes the lowest frequency subband 1431 to a second level 1440 of frequency decomposition that includes 32×32 subbands 1441, 1442, 1443, and 1444. Finally, the compression unit decomposes the low frequency subband 1441 of the second level 1440 to a third level 1450 of frequency decomposition that includes 16×16 subbands 1451, 1452, 1453, and 1454.

As shown in FIG. 13, following frequency decomposition (act 1410), the frequency decomposed subbands comprise a multi-resolution representation of the LL subband of the reference light field image. The compression unit forms (act 1460) wavelet blocks from related pixels in the multi-resolution representation as follows. For a pixel (i,j) in the low frequency subband 1451 of the third level 1450, corresponding pixels (i,j) are found in the other subbands 1452, 1453, 1454 of the same level. These pixels (i,j) relate to 2×2 blocks of pixels in the next higher level of frequency decomposition. In FIG. 13, the 2×2 blocks are indicated at locations (2i, 2j) in the second level subbands 1442, 1443, 1444. In turn, these pixels relate to 4×4 blocks of pixels at locations (4i,4j) in the first level subbands 1432, 1433, 1434. According to these relationships, the compression unit forms wavelet blocks. In FIG. 13, in the wavelet block 1465, the upper leftmost pixel is the pixel (i,j) from the lowest frequency subband 1451, and the 4×4 lower rightmost pixels are the 4×4 pixel block at (4i,4j) in the subband 1434. A wavelet block includes multi-resolution information for a location (i,j) in the lowest level of frequency decomposition. In alternative embodiments, the compression unit forms wavelet blocks according to other patterns of frequency decomposition.

After forming (act 1460) a wavelet block, the compression unit codes (act 1470) the wavelet block by embedded zero-tree coding using successive approximation quantization and arithmetic coding. Embedded zero-tree coding using successive approximation quantization and arithmetic coding is one efficient way to compress wavelet blocks. In other alternative embodiments, the compression unit codes wavelet blocks using techniques other than successive approximation quantization and arithmetic coding.

Successive approximation quantization is a type of quantization. In general, quantization is lossy compression that entails replacing a value with a substitute value. For decompression, the substitute value is used to reconstruct an approximation of the original value. The difference between the original value and the approximation of the original value shows the loss of information. Information loss increases as the quantization step-size increases. Scalar quantization involves replacing single values with substitute values. A block of transform coefficients can be quantized by the same value, or by different values. The quantization step-sizes can vary in a step-wise manner to adjust the degree of quantization. Vector quantization involves replacing multiple values with a single reproduction vector. A group of reproduction vectors used to replace values of a signal is termed a codebook. During decompression, a code index is looked up in the codebook and replaced with the appropriate reproduction vector approximation of the original vector. Adaptive quantization involves dynamically changing bit allocation of codes based upon the content of the signal being quantized. Successive approximation quantization involves replacing a value or vector of values with an initial, short code index, then incrementally adding length to the short code index as approximation is refined in reproduction vectors. Additional information on quantization can be found in R. M. Gray, "Vector Quantization," IEEE Acoust. Speech Signal Process. Mag., vol. 1(2), pp. 4–29, 1984 and Stephen Solari, "Digital Video and Audio Compression," Chapter 6, "Video Compression Techniques: Vector Quantization," 1997.

Arithmetic coding is a type of entropy coding. In general, entropy coding is lossless compression that entails replacing infrequent values with long codewords and frequent values with short codewords. Codewords are designed so that average codeword size is as small as possible. In arithmetic coding, symbols for the values being encoded are ordered along a probability line from 0 to 1. Each symbol is assigned a sub-interval along the probability line and a codeword that references the sub-interval. In adaptive coding, a coder adapts to changes in the statistical qualities of an input signal. An arithmetic coding algorithm can be made adaptive by dynamically estimating probabilities and changing sub-interval assignments as it codes. Other types of entropy coding techniques include run-length coding, Huffman coding, adaptive Huffman coding, and Lempel-Ziv coding. Additional information on entropy coding can be found in Gray et al., "Image Compression and Tree-Structured Vector Quantization," Image and Text Compression, Kluwer Academic Publishers, pp. 3–34, 1992.

Embedded zero-tree coding using successive approximation quantization and arithmetic coding is an efficient method for coding wavelet coefficients. Additional information on embedded zerotrees coding of wavelet coefficients can be found in J. M. Shapiro, "Embedded image coding using zerotrees of wavelet coefficients,"*IEEE Trans. Signal Proc.*, 40(10) pp. 2463–2482, Octber 1992.

Coding of the LH, HL, and HH Subbands

Figure 15:
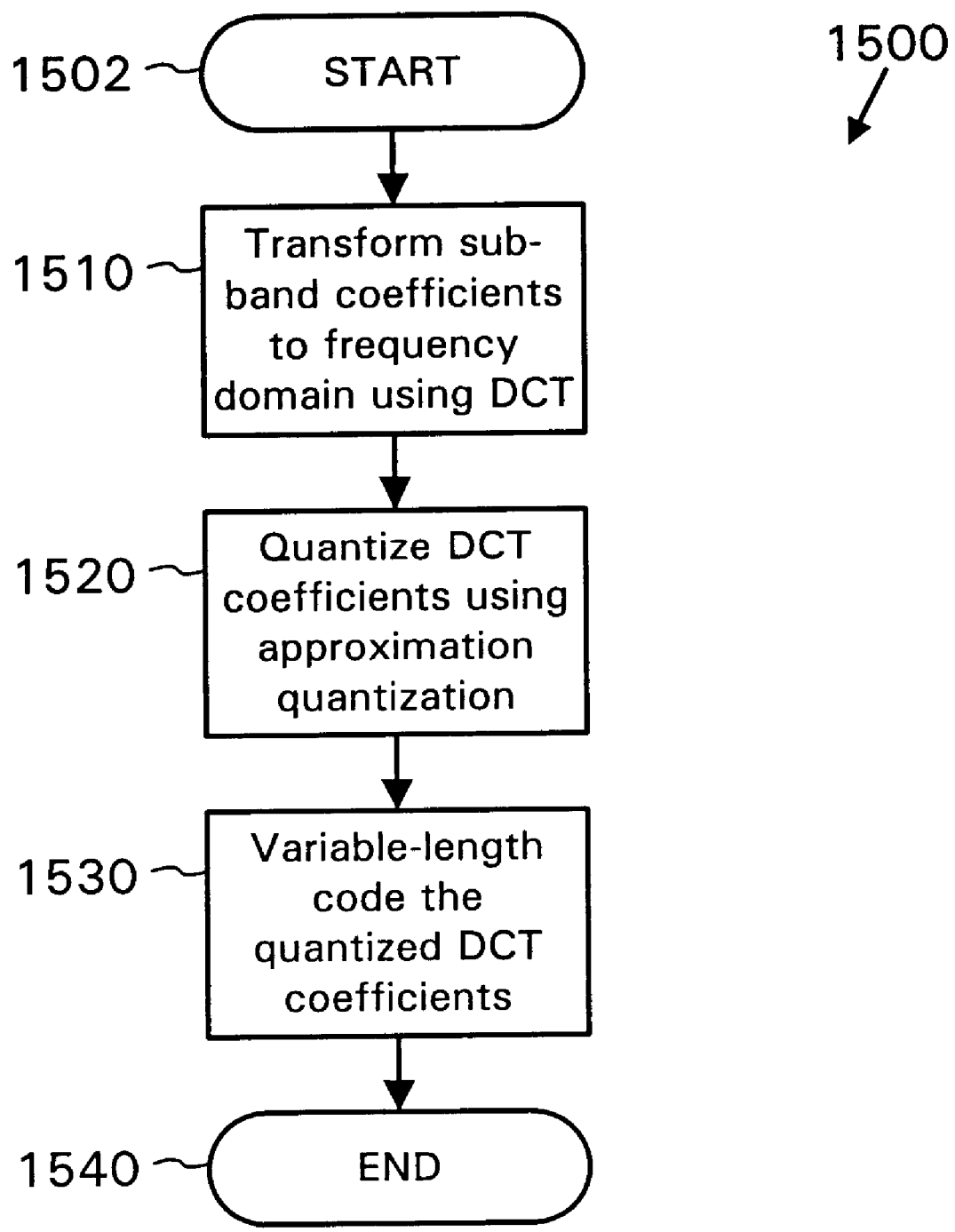
FIG. 15 is a flowchart showing a technique for lossy and lossless compression of higher frequency subbands.

FIG. 15 shows a compression scheme 1500 used to compress higher frequency subbands. In alternative embodiments, other compression techniques reduce representation of the higher frequency subbands.

After subband coding separates the LH, HL, and HH subbands, the compression unit transforms (act 1510) the subband coefficients of the LH, HL, and HH subbands into the frequency domain. The compression unit uses a block-based two-dimensional discrete cosine transform ["DCT"]. Existing DCT hardware and software typically work upon blocks of spatial domain coefficients as input. For each 8×8 block of subband coefficients, block-based DCT produces an 8×8 block of DCT coefficients. In the frequency domain, the energy for the 8×8 block of subband coefficients is concentrated in the DC and lower frequency AC coefficients. Alternatively, the compression unit uses another transform coding technique such as a Walsh Hadamard transform. After transform coding, light field image information has been converted to the frequency domain without significant loss of information or reduction in storage requirements. Nonetheless, the coefficients for the LH, HL, and HH subbands, whether in the frequency or spatial domain, are usually small and can be quantized to achieve a high compression ratio.

Following transform coding (act 1510), the compression unit quantizes (act 1520) the transform coefficients. By default, the compression unit quantizes the DCT coefficients of the LH, HL, and HH subbands for a (9-7) symmetric biorthogonal integer wavelet transform. Additional information on wavelet transforms with integer subband coefficients can be found in R. C. Calderbank, I. Daubechies, W. Sweldens and B. L. Yeo, "Wavelet Transforms that Map Integers to Integers," Applied and Computational Harmonic Analysis (ACHA), vol. 5, No. 3, pp. 3320269, 1998.

Following quantization (act 1520), the compression unit entropy codes (act 1530) the quantized transform coefficients. By default, the compression unit Huffman codes the quantized DCT coefficients of the LH, HL, and HH subbands, but other entropy coding techniques can be used.

The LH, HL, and HH subbands of a light field image include less significant information than the LL subband. Moreover, transform coding is a computationally expensive operation. Therefore, for higher frequency subbands with little significant information content, the compression unit can skip the transform coding and directly quantize the subband coefficients. As for quantization, because higher frequency subbands typically lack significant information, they can be severely quantized without adversely affecting subjective quality. Thus, when a part of the HH subband lacks significant information, the compression unit quantizes the coefficients for that part of the HH subband to zero.

Data Structure For Storing a Reference Light Field Image

Figure 16:
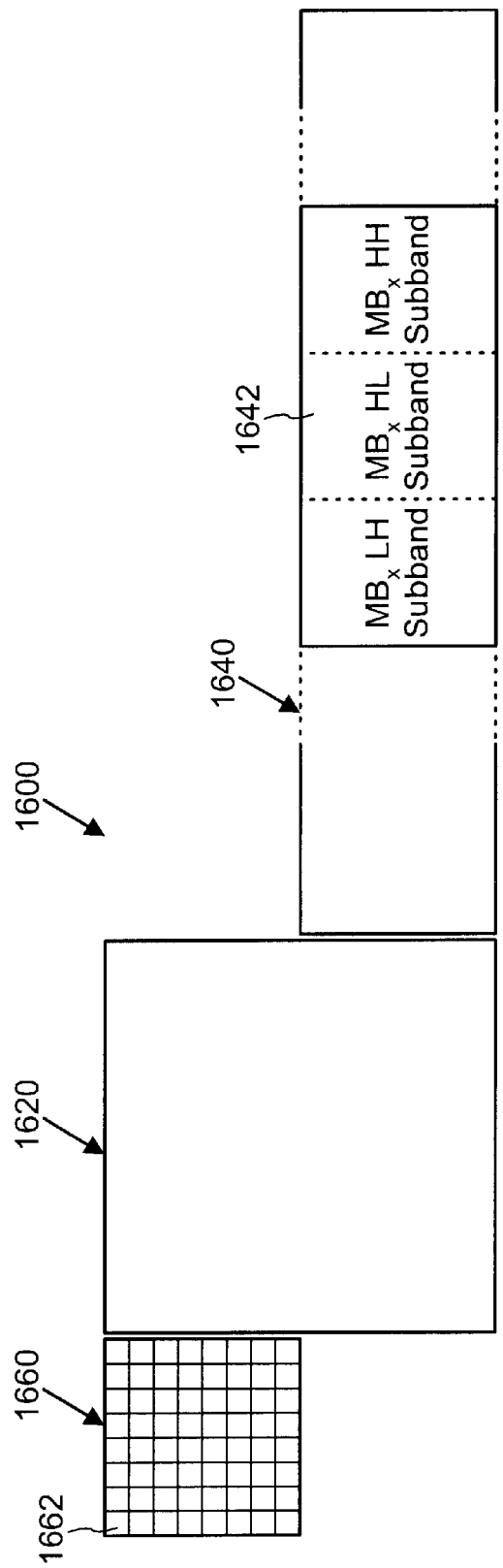
FIG. 16 is a block diagram of a data structure with a base field and an enhancement field, the data structure storing information for a reference light field image.

The compression unit can store the resulting subband information in different fields and sub-fields of a data structure 1600 such as that shown in FIG. 16. Data structure 1600 includes a base field 1620 and an enhancement field 1640. The enhancement field 1640 is implemented using a data structure with VSDOs.

The base field 1620 stores data representing the LL subband of the reference light field image. During transmission or storage of a reference light field image, the LL band is typically compressed, for example, by embedded zerotree wavelet coding. To facilitate operations that involve the reference light field image stored in data structure 1600, a decompression unit accesses and decodes the LL subband information in the base field 1620 so that they can be accessed later according to a regular pattern. For example, the decompression unit decodes the entire base field 1620 before decoding any information in the enhancement field 1640. The data structure then includes decoded LL subband information in the base field and compressed higher frequency subband information in the enhancement field.

The enhancement field 1640 stores in VSDOs compressed information for higher frequency subbands of a reference light field image, such as the LH, HL, and HH subbands. The information stored in the enhancement field 1640 is less significant than the information stored in the base field 1620. Therefore, information in the enhancement field 1640 is selectively accessed as needed during light field operations, reducing the number of unnecessary access and decoding operations.

In FIG. 16, the enhancement field 1640 includes sub-fields for storing data about individual parts of the reference light field image. Each sub-field stores data representing the higher frequency subband values for a single MB. Sub-field 1642 contiguously stores LH, HL, and HH subband information for $MB_x$. This sub-field/MB organization facilitates selective access and decoding of higher resolution information for particular MBs of the reference light field image.

For some reference light field images, the higher frequency subbands lack significant information. For this reason, for a particular MB, the enhancement field 1640 can omit information for any or all of the higher frequency subbands. For example, if the subband coefficients for a subband for a MB are zero or fall below a predetermined significance threshold (MSE, energy, etc.), the enhancement field 1640 omits information for that subband for that MB.

Compression of the higher frequency subbands can further contribute to the variable length of the enhancement field. By default, to facilitate efficient selective access to sub-fields of the enhancement field 1640, the enhancement field 1640 is implemented using a data structure with VSDOs, such as described in the above-referenced Chan et al. application.

When a decompression unit seeks information for a particular MB, the decompression unit selectively accesses and decodes the information in the sub-field corresponding to the particular MB. The speed of this operation can be further improved when the enhancement field 1640 lacks information for some MBs. When the enhancement field 1640 lacks higher frequency subband information for a particular MB, a flag value can indicate that absence. FIG. 16 shows an index 1660 of such flag values. The index 1660 of flag values indicates the presence or absences of information within the enhancement field 1640 for individual MBs. In FIG. 16, the index 1660 is 8×8, reflecting the organization of a 128×128 reference light field image subband into 16×16 macroblocks. A sub-field 1662 stores a flag value indicating the presence or absence of LH, HL, and HH subband information for a $MB_0$. By checking the flag values before attempting to access information, the decompression unit avoids unnecessary traversal of the enhancement field 1640.

Alternatively, instead of indicating the complete presence or absence of information for a particular MB, a flag value indicates the presence or absence of information for particular subbands, or indicates if the information stored in a sub-field fails a significance threshold (e.g., zero or low energy subband coefficients). The data structure 1600 can lack an array of flag values or have a different size array of flag values.

The above-described features of data structure 1600 can appear alone or in different combinations. The above-described features can be altered for differently configured reference light field images or to accommodate particular compression techniques. Moreover, although FIG. 16 depicts a data structure for storing a single reference light field image, such a data structure can be combined with other data structures of the same or different types to store multiple reference light field images, a mix of reference and prediction light field images, or a mix of reference light field images and other information.

V. Reducing Inter-image Spatial Redundancy Through Spatial Displacement Estimation According to this aspect of the illustrative embodiment, a compression unit compresses representation of a light field by reducing inter-image spatial redundancy through spatial displacement estimation.

Spatial Compression—Overview

Figure 17:
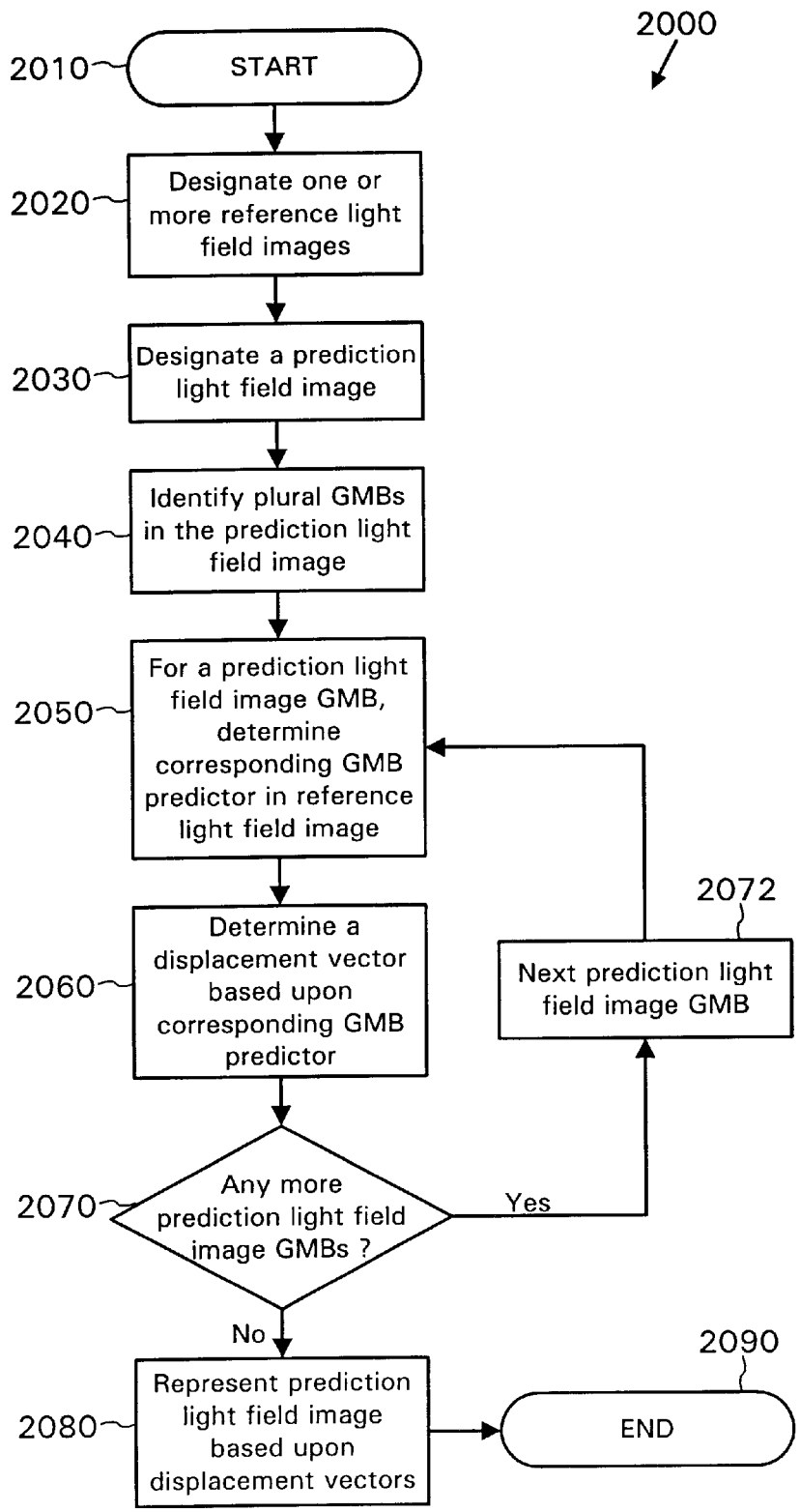
FIG. 17 is a flowchart showing a technique for estimation of spatial displacement from a reference light field image for a section of a prediction light field image.

Light field images from neighboring vantage points around an object or static scene frequently overlap to some extent, which creates inter-image spatial redundancy. Inter-image spatial redundancy can be reduced by estimating spatial displacement of a prediction light field image from one or more reference light field images. Reducing inter-image spatial redundancy significantly compresses representation of the prediction light field images. FIG. 6 shows a block diagram in which a spatial displacement estimate from a reference light field image is made for section of a prediction light field image. FIG. 17 shows a technique 2000 for estimating spatial displacement from a reference light field image for a prediction light field image section.

From a light field, a compression unit designates (act 2020) one or more of the light field images to be reference light field images. The compression unit then designates (act 2030) a light field image to be a prediction light field image. In FIG. 6, light field image 12 is a reference light field image and light field image 14 is a prediction light field image.

The compression unit identifies (act 2040) plural sections within the prediction light field image using block-based methods. Block-based methods can be implemented using certain existing software and hardware compression tools used for block-based video compression. With reference to FIG. 6, the compression unit identifies a GMB 60 in prediction light field image 14. The upper left corner of GMB 60 starts at location (x,y) 50 in light field image 14. Although the GMB 60 is a square block, various other types of prediction light field image sections are possible.

For each prediction light field image GMB, the compression unit determines (act 2050) a corresponding GMB predictor in one or more designated reference light field images. A corresponding GMB predictor is an area of a reference light field image or its processed version that approximates a prediction light field image GMB. In FIG. 6, GMB predictor 70 approximates GMB 60.

After the compression unit determines (act 2050) a corresponding GMB predictor in a reference light field image, the compression unit determines (act 2060) a displacement vector ["DV"] based upon the corresponding GMB predictor. A DV indicates a spatial transformation from an initial position in the reference light field image to the corresponding GMB predictor. The initial position in the reference light field image corresponds to the position of the prediction GMB within the prediction light field image. In FIG. 6, the reference light field image position is (x,y) 50. DV 80 indicates a two-dimensional spatial translation from point (x,y) 50 to corresponding GMB predictor 70 in the reference light field image 12. Although FIG. 6 shows a simple two-dimensional spatial translation, various other types of transformations and DVs are possible. For a typical prediction light field image GMB, a DV takes less. space to represent than the original GMB.

Prediction Light Field Image Groups of Macroblocks

The compression unit identifies plural GMBs by segmenting a prediction light field image. FIG. 4 shows an expanded view of a GMB.

While FIG. 4 shows MBs and GMBs, other types of prediction light field image sections can be used with the described techniques for reducing inter-image spatial redundancy. In FIG. 4, each GMB 160 is a non-overlapping, uniformly shaped, square block that follows a geometric grid imposed on the light field image. In alternative embodiments, prediction light field image sections overlap, have different shapes, or have different dimensions. In another alternative embodiment, a prediction light field image is segmented using techniques known in the art for discerning objects within the prediction light field image. FIG. 4 shows GMBs 160 that include multiple MBs. In alternative embodiments, a prediction light field image section is not sub-divided or includes other types of sub-sections.

Number of Reference Light Field Images for a Prediction Light Field Image

In general, a compression unit estimates spatial displacement from locations in the one or more designated reference light field images for a prediction light field image GMB. In FIG. 6, DV 80 represents displacement from a location 50 in reference light field image 12 for prediction light field image GMB 60. When a compression unit works with a single reference light field image, the compression unit represents each prediction light field image GMB in terms of displacement from that single reference light field image.

Figure 18:
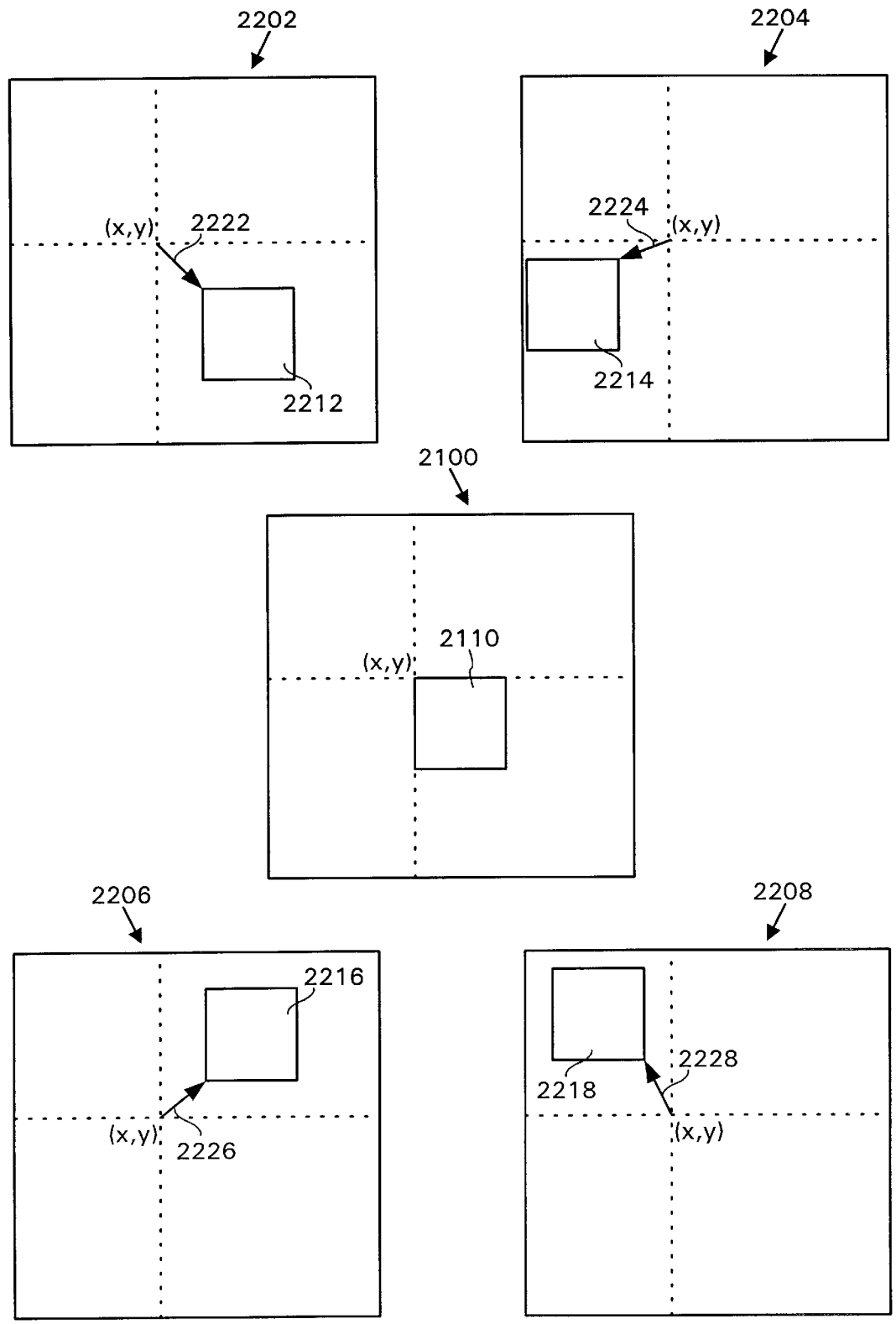
FIG. 18 is a block diagram showing spatial displacement estimation from multiple reference light field images for a prediction light field image section.

On the other hand, when a compression unit works with multiple reference light field images, the compression unit represents each prediction light field image GMB in terms of displacement from one or more of the multiple reference light field images. FIG. 18 shows a prediction light field image 2100 and multiple reference light field images 2202, 2204, 2206, and 2208. Prediction light field image 2100 includes a GMB 2110 at position (x,y). The compression unit determines GMB predictors 2212, 2214, 2216, 2218 that correspond to GMB 2110. DVs 2222, 2224, 2226, 2228 are based upon the corresponding GMB predictors 2212, 2214, 2216, 2218, respectively. One or more of the DVs 2222, 2224, 2226, 2228 are used to estimate spatial displacement for GMB 2110. In single predictor mode, the compression unit determines which corresponding GMB predictor 2212, 2214, 2216, 2218 most closely approximates GMB 2110. The DV for that corresponding GMB predictor is used to represent the prediction light field image GMB 2110. In multi-predictor mode, in contrast, DVs from multiple reference light field images are used to estimate spatial displacement for GMB 2110. Thus, in multi-predictor mode, different GMB DVs can estimate spatial displacement for different MBs within a GMB 2110.

Operation with Intra-Image Coded Reference Light Field Images

In addition to compressing a prediction light field image by reducing inter-image spatial redundancy, a compression unit typically compresses the one or more reference light field images by intra-image coding. Intra-image coding techniques can include lossy compression, which compresses a light field image at some cost to quality. During compression of a prediction light field image, a decompression unit typically reconstructs reference light field images and estimates spatial displacement for the prediction light field image based on the reconstructed reference light field images.

The compression unit can estimate spatial displacement from a previously compressed version of a reference light field image. For a subband coded light field image, the compression unit can estimate spatial displacement from a LL subband. If so, DVs and DDVs indicate displacements within the LL subband. Alternatively, a compression unit uses other reconstructed versions of the reference light field images to estimate spatial displacement for a prediction light field image. In still another alternative embodiment, the compression unit estimates spatial displacement for a prediction light field image from original reference light field images.

Determining a Corresponding GMB Predictor in a Reference Light Field Image

To find a corresponding GMB predictor for a prediction light field image GMB, the compression unit finds within the reference light field image an area that approximates the prediction light field image GMB. The compression unit checks various candidate GMB predictor areas within the reference light field image. The candidate GMB predictor area that varies least from the prediction light field image GMB according to some measure of deviation is designated the "corresponding GMB predictor." The default deviation measure is mean square error. For a GMB B and candidate GMB predictor area P, the mean square error is:

$$MSE(B, P) = \frac{\sum_{i=0}^{n-1}\sum_{j=0}^{m-1}(B(i,j) - P(i,j))^2}{n \times m}$$

where the GMB and candidate GMB predictor areas are n x m pixels. Instead of mean square error, the compression unit can use mean absolute difference or some other measure of deviation.

Figure 19:
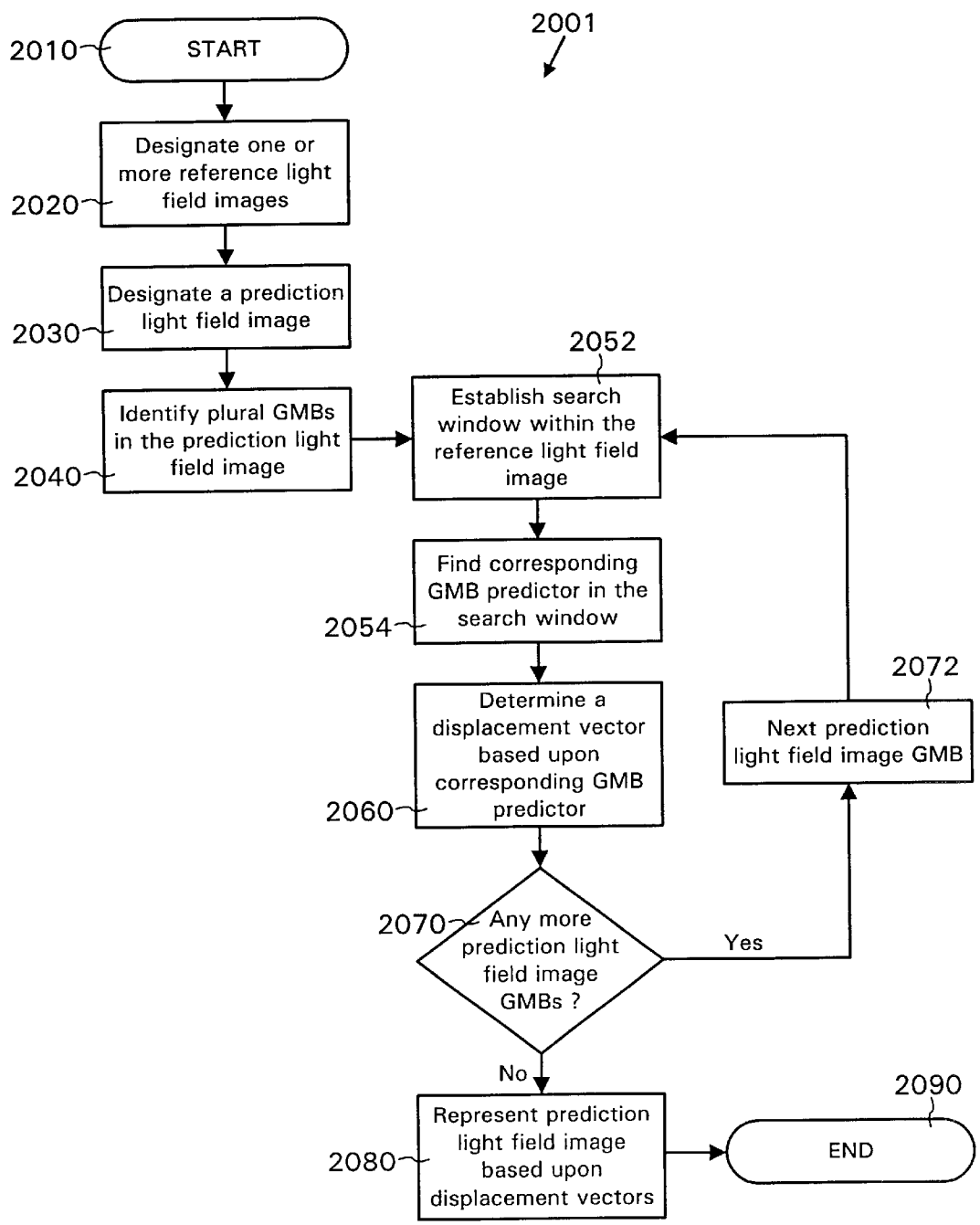
FIG. 19 is a flowchart showing a technique for estimation of spatial displacement that uses a search window of a reference light field image.
Figure 20:
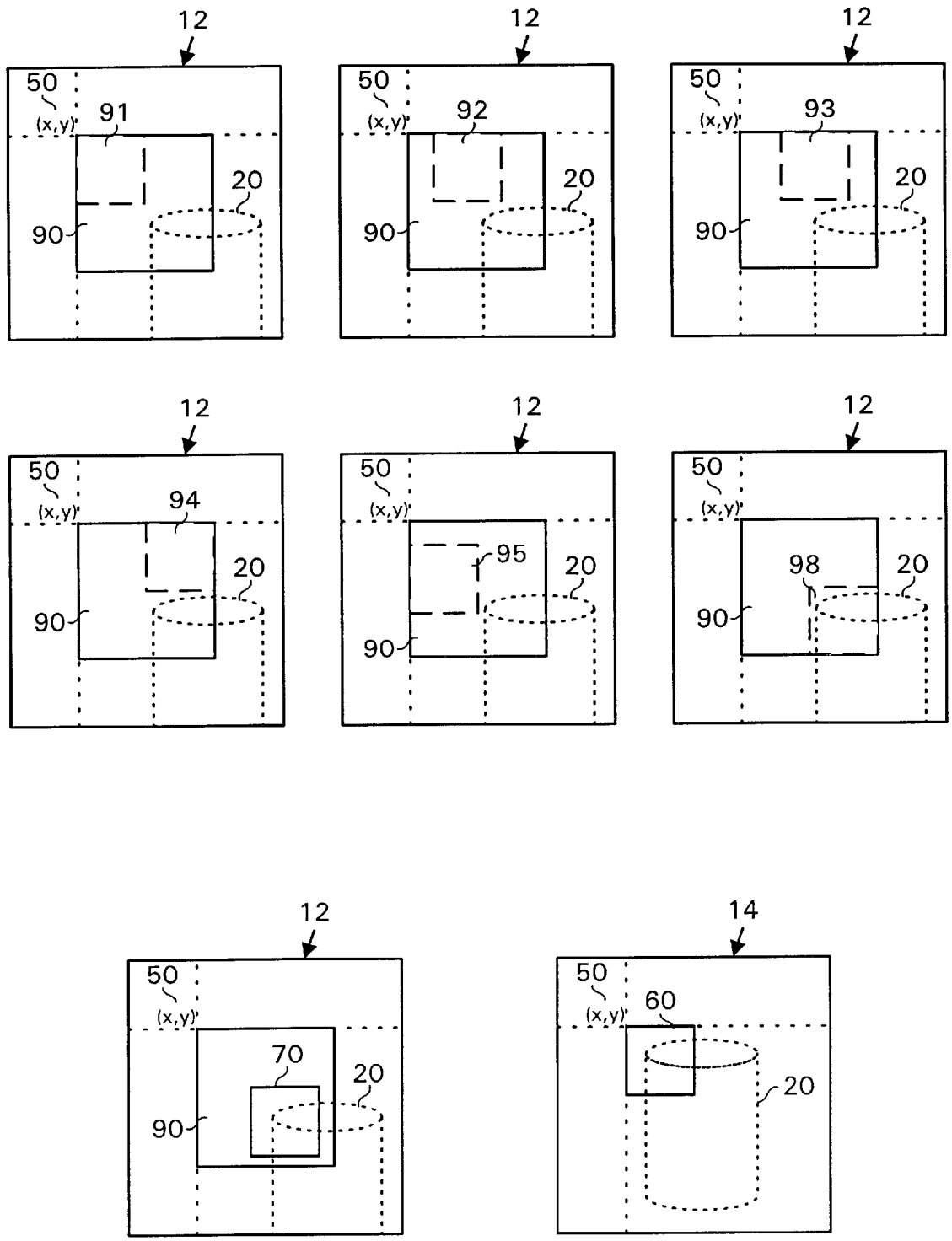
FIG. 20 is a block diagram showing candidate predictors within a search window of a reference light field image.

In technique 2001 of FIG. 19, the compression unit limits the area searched within a reference light field image. Instead of checking candidate GMB predictor areas for an entire reference light field image, the compression unit searches only within a search window. After identifying a prediction light field image GMB, the compression unit establishes (act 2052) a search window within the reference light field image. Within the search window, the compression unit finds (act 2054) a corresponding GMB predictor for the prediction light field image GMB by iteratively checking candidate GMB predictor areas and determining which candidate GMB predictor area minimizes a deviation measure. FIG. 20 shows a search window 90 in reference light field image 12. The compression unit iteratively checks candidate GMB predictor areas at fixed intervals within the search window. By default, the compression unit checks candidate GMB predictor areas at single pixel intervals. Alternatively, the compression unit checks at other intervals, such as half-pixel. FIG. 20 shows selected candidate GMB predictor areas 91, 92, 93, 94, 95, and 98. The candidate GMB predictor area that best approximates GMB 60 is designated the corresponding GMB predictor 70.

As shown in FIGS. 1, 6, and 20, light field images 12 and 14 are geometrically-related. Due to this geometric relationship, some areas of reference light field image 12 are more likely than other areas to contain a GMB predictor that corresponds to prediction light field image GMB 60. Therefore, according to the coordinate system of FIG. 21 and the accompanying table, the compression unit constrains placement of the search window within the reference light field image 12 to optimize the search for a corresponding GMB predictor 70.

Figure 21:
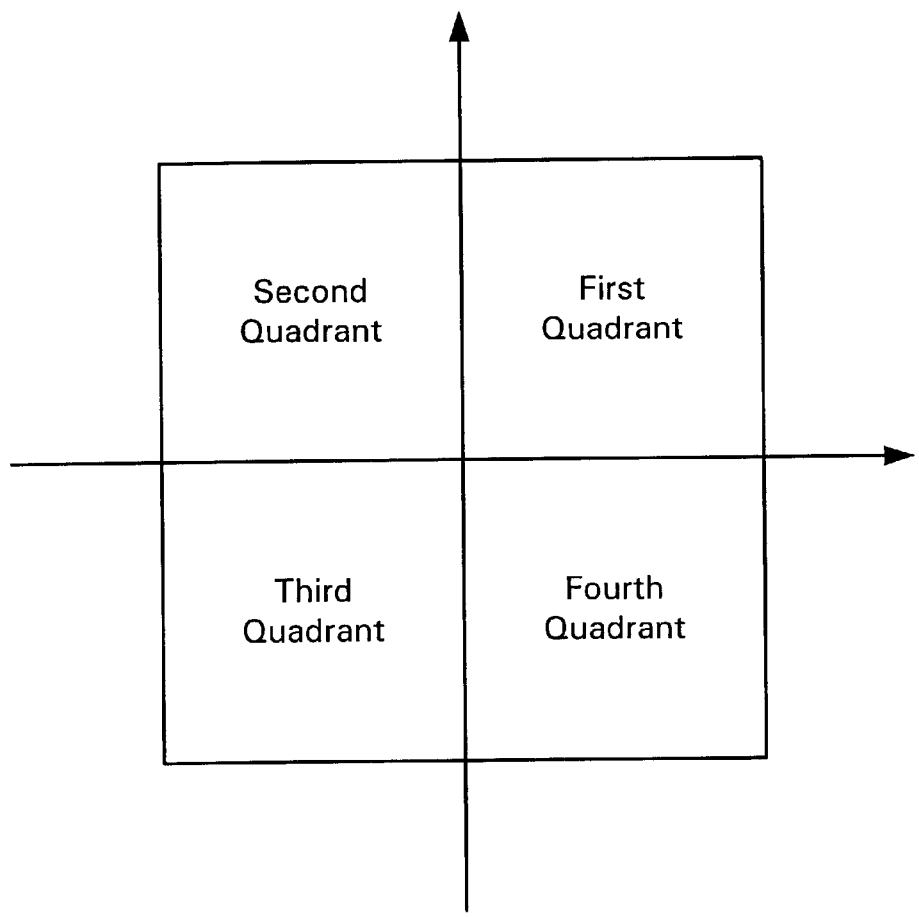
FIG. 21 is a block diagram showing a coordinate system for constraining placement of a search window within a reference light field image.

The compression unit determines a geometric relationship between light field images based upon known camera positions for the light field images, focal point positions, analysis of the light field images themselves, or some other mechanism. With reference to FIG. 21, after determining the geometric relationship between a prediction light field image and a reference light field image, the compression unit establishes a search window according to the following table.

| Geometric Relationship | Placement of Search Window |
| --- | --- |
| Reference light field image is in first quadrant relative to prediction light field image | Place search window in third quadrant of reference light field image relative to point (x, y) |
| Reference light field image is in second quadrant relative to prediction light field image | Place search window in fourth quadrant of reference light field image relative to point (x, y) |
| Reference light field image is in third quadrant relative to prediction light field image | Place search window in first quadrant of reference light field image relative to point (x, y) |
| Reference light field image is in fourth quadrant relative to prediction light field image | Place search window in second quadrant of reference light field image relative to point (x, y) |

FIG. 1 shows reference light field image 12 to be in the second quadrant (left of and above) prediction light field image 14. Therefore, within reference light field image 12, the compression unit establishes the search window 90 in the fourth quadrant relative to point (x,y) 50. In FIG. 20, the search window extends horizontally and vertically from the origin (x,y) of the quadrant coordinate system into the selected quadrant, but other search window placements are possible.

The compression unit is able to constrain the size of the search window to focus on checking candidate GMB predictor areas in the parts of the reference light field image 12 most likely to contain an accurate approximation of GMB 60. In this way, the compression unit avoids checking areas unlikely to approximate GMB 60. In addition to speeding up the process of checking candidate GMB predictor areas, using a smaller search window reduces the number of bits needed to represent a DV. The default search window is 32 pixels in the horizontal direction and 32 pixels in the vertical direction, but other search window dimensions are possible. With a 32×32search window, spatial translation DVs, before entropy coding, are 10 bits long (5 bits for the horizontal component and 5 bits for the vertical component).

In the above-described examples, the corresponding GMB predictor lies entirely within the edges of the reference light field image. In other cases, however, the area that best approximates a prediction light field image GMB lies at least partially outside the edges of a reference light field image.

Figure 22:
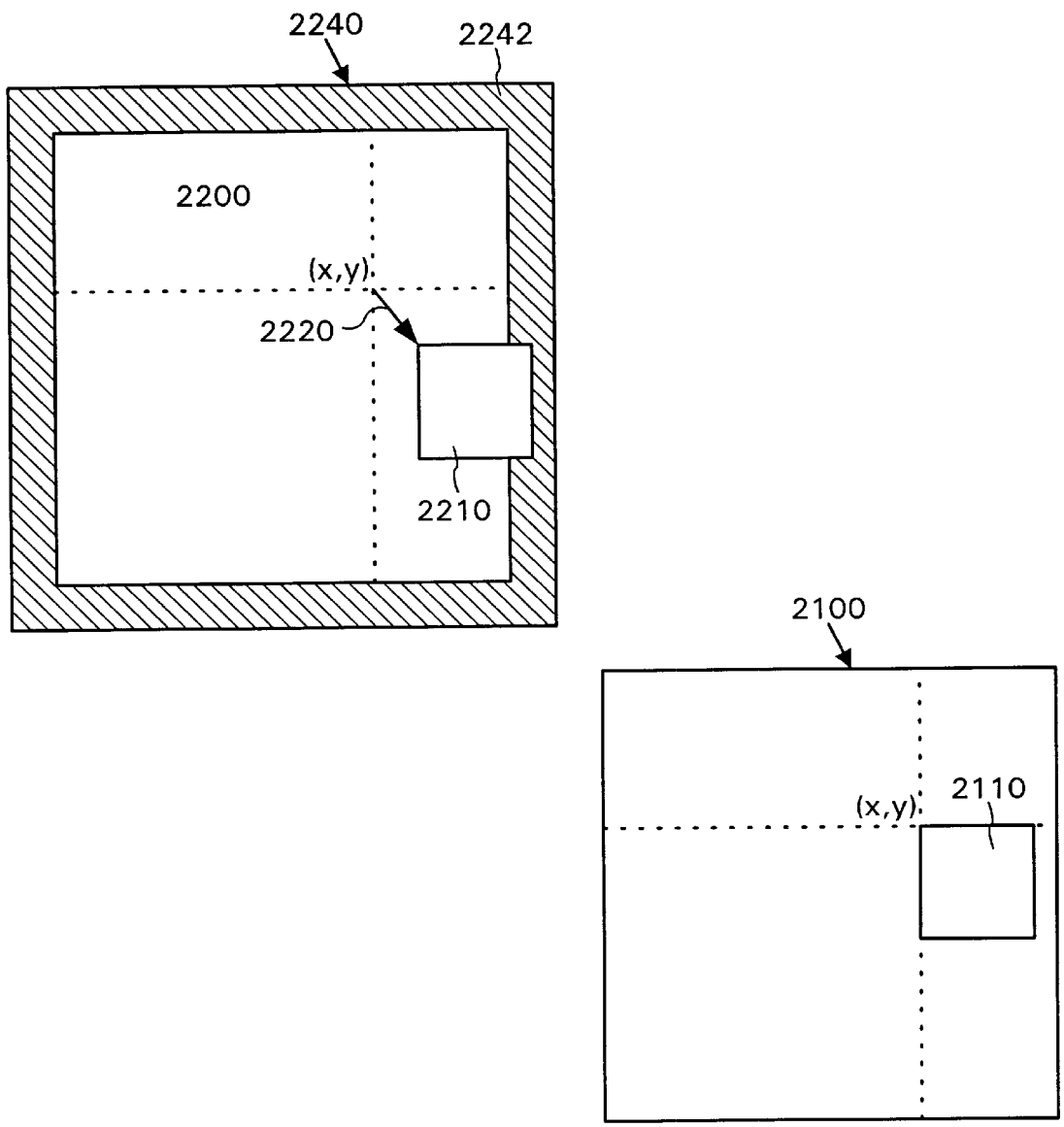
FIG. 22 is a block diagram showing spatial displacement estimation from an edge-extended reference light field image for a prediction light field image section.

In addition to checking areas entirely within a reference light field image, the compression unit is able to check candidate GMB predictor areas that lie at least partially outside the reference light field image by extending the edges of the reference light field image. FIG. 22 shows an edge-extended reference light field image 2240. A border 2242 of edge-extended values surrounds a reference light field image 2200. One technique for extending edges is to replicate edge values away from the reference light field image to some distance in one or more directions. Other edge-extension techniques, such as those using more complex weighting schemes, are known in the art.

FIG. 22 shows spatial displacement estimation from edge-extended reference light field image 2240 for a prediction light field image GMB 2110. Corresponding GMB predictor 2210 partially lies within the edge extension 2242. Based upon the corresponding GMB predictor 2210, a DV 2220 indicates a spatial displacement estimate for GMB 2110.

Displacement Vectors

After determining a corresponding GMB predictor in a reference light field image, the compression unit determines a DV based upon the corresponding GMB predictor. Thus, $\overline{DV}$ is given by the equation:

$$\overline{DV} = \arg\min D\{B, P(DV)\}$$

for prediction light field image GMB B and candidate GMB predictor area P(DV). As described above, D{ } is a function that measures deviation between B and P(DV), e.g., mean square error, and min D{ } is the candidate GMB predictor area that minimizes the deviation measure, i.e., the corresponding GMB predictor.

A DV indicates a spatial transformation from a point within the reference light field image. By default, the compression unit calculates DVs that are two-dimensional spatial translations $(d_0, d_1)$. In FIG. 6, DV 80 is a two-dimensional spatial translation from point (x,y) 50 to the upper left-most corner of corresponding GMB predictor 70. Other Figures also show DVs that are spatial translations from a reference light field image position to the closest corner of a corresponding GMB predictor. Alternatively, a DV includes one or more affine transformations (translation, rotation, scaling, and/or shear), or more sophisticated image flow techniques determine a DV.

Figure 23:
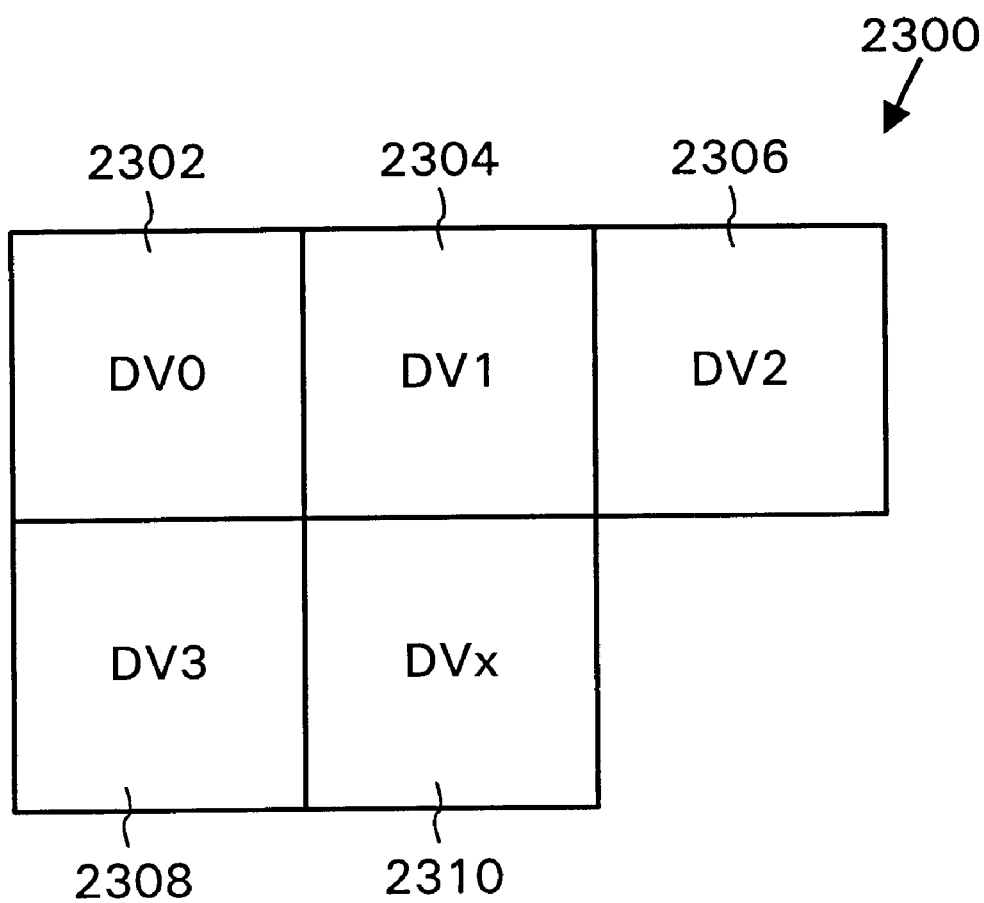
FIG. 23 is a block diagram showing differential coding of displacement vectors.

Adjacent GMBs of a prediction light field image can exhibit spatial redundancy which creates redundancy between DVs for adjacent GMBs. To further compress a prediction light field image, DVs can be differentially coded. For differential coding of DVs, the compression unit codes a GMB DV based upon one or more preceding GMB DVs. FIG. 23 illustrates a differential coding technique 2300 for a DVx 2310 based on preceding DVs. In differential coding technique 2300, the compression unit codes GMBs in a left to right, top to bottom sequence. In doing so, the compression unit codes a $DV_x$ 2310 for a $GMB_x$ as a difference $DV_x'$ from a DV predictor. The DV predictor is an average of previous GMB DVs, which are $DV_0$ 2302, $DV_1$ 2304, $DV_2$ 2306, and $DV_3$ 2308 in FIG. 23.

$$DV_x' = DV_x - \left(\frac{DV_0 + DV_1 + DV_2 + DV_3}{4}\right)$$

If one of the preceding GMBs would lie outside of a light field image boundary, the DV for that preceding GMB is not accounted for. Other weightings of surrounding DVs to differentially code a current DV are known in the art. For example, instead of averaging the preceding GMB DVs, the compression unit can take the median of a group of preceding GMB DVs.

Hierarchical Spatial Displacement Estimation

For a prediction light field image GMB, the compression unit finds a corresponding GMB predictor in a reference light field image and determines a DV based upon the corresponding GMB predictor. The DV indicates a spatial transformation for an entire GMB. As a result, for any one MB of the GMB, actual displacement relative to the reference light field image may deviate from the displacement estimated for the GMB as a whole. On the other hand, MBs within a GMB typically exhibit some degree of spatial displacement correlation.

For these reasons, the compression unit is able to perform displacement estimation in a hierarchical manner. Performing spatial displacement estimation at the GMB level provides reliable DVs that are good predictors for spatial displacement of individual MBs. Subsequent spatial displacement estimation at the MB level refines spatial displacement estimation, which improves the accuracy of estimation and reduces prediction error. Hierarchical spatial displacement estimation also facilitates encoding, decoding, and rendering operations at selective levels of quality.

Figure 24:
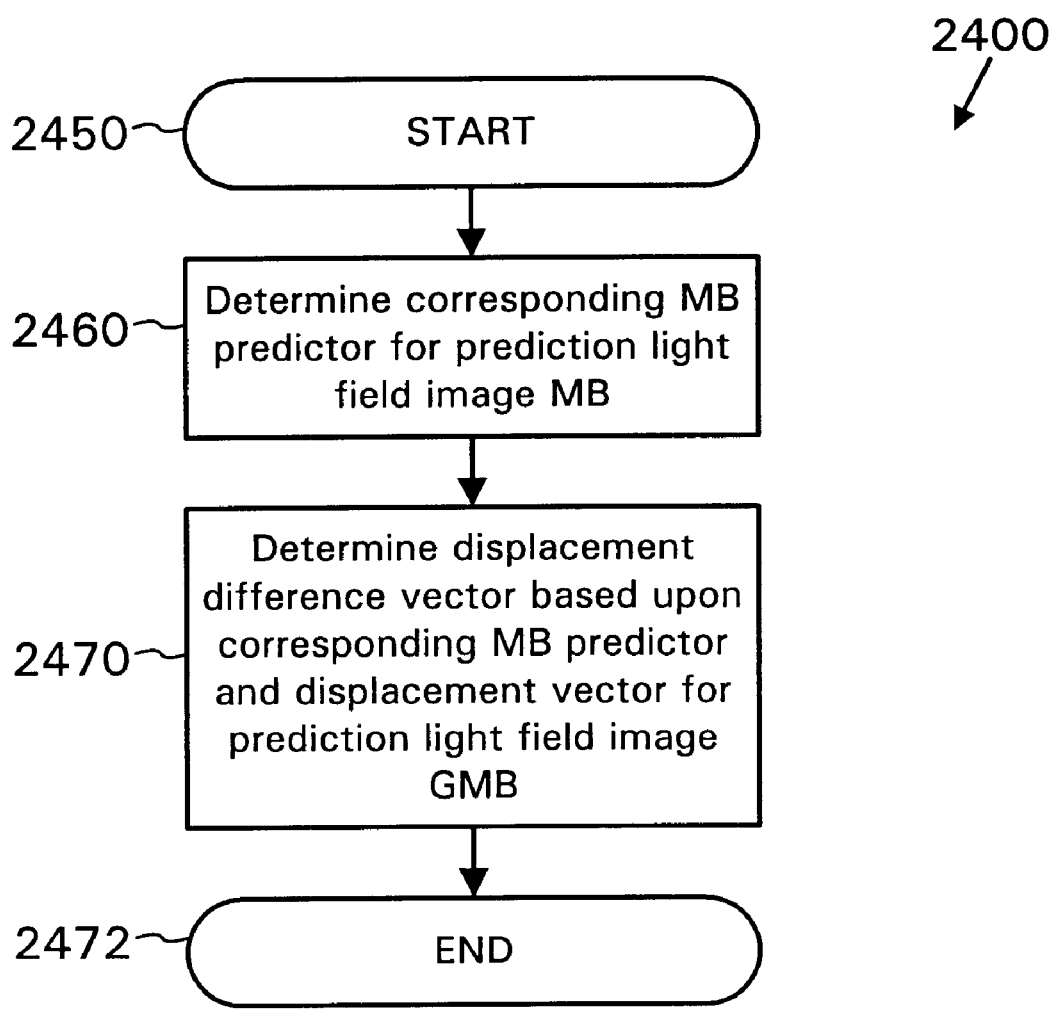
FIG. 24 is a flowchart showing a technique for determining a displacement difference vector for hierarchical spatial displacement estimation.

After determining a GMB DV, the compression unit determines displacement difference vectors ["DDVs"] for individual constituent MBs of the GMB. FIG. 24 shows a technique 2400 for determining a DDV for a MB. FIG. 25 shows a DDV 2440 for a MB 2414 of a GMB 2412 of a prediction light field image 2410.

The compression unit determines in a reference light field image 2420 a GMB DV 2426 based upon a corresponding GMB predictor 2422. For a MB 2414 of a GMB 2412, the compression unit determines (act 2460) a MB predictor 2430 in the reference light field image 2420. The compression unit then determines (act 2470) a DDV 2440 based upon the corresponding MB predictor 2430 and the GMB DV 2426. A DDV indicates a spatial transformation from the reference light field image position initially indicated for the MB by the GMB DV. For a particular MBj within a GMB, the resultant $\overline{DV}_{MBj}$ is:

$$\overline{DV}_{MBj} = DV_{GMB} + DDV_{MBj}$$

where $DV_{GMB}$ is the DV for the GMB of which MBj is a constituent, and $DDV_{MBj}$ is the DDV for MBj. $\overline{DV}_{MBj}$ can consider the relative position of MBj within the GMB.

When a compression unit estimates spatial displacement from multiple reference light field images for a prediction light field image (multi-predictor mode), different MBs of a GMB can estimate spatial displacement from different reference light field images. A MB therefore specifies a reference light field image. For example, if a prediction light field image estimates spatial displacement from up to four reference light field images, one MB can specify a GMB DV from reference light field image 1 while another MB specifies a GMB DV from reference light field image 3. In these cases, the resultant $\overline{DV}_{MBj}$ for a particular MBj within a GMB is given by the equation:

$$\overline{DV}_{MBj} = DV_{GMB}{}^{Rli} + DDV_{MBj}$$

where $DV_{GMB}{}^{Rli}$ is the GMB DV from selected reference light field image i for the GMB of which MBj is a constituent. Additionally, the term $DDV_{MBj}$ can specify the reference light field image i.

Figure 26:
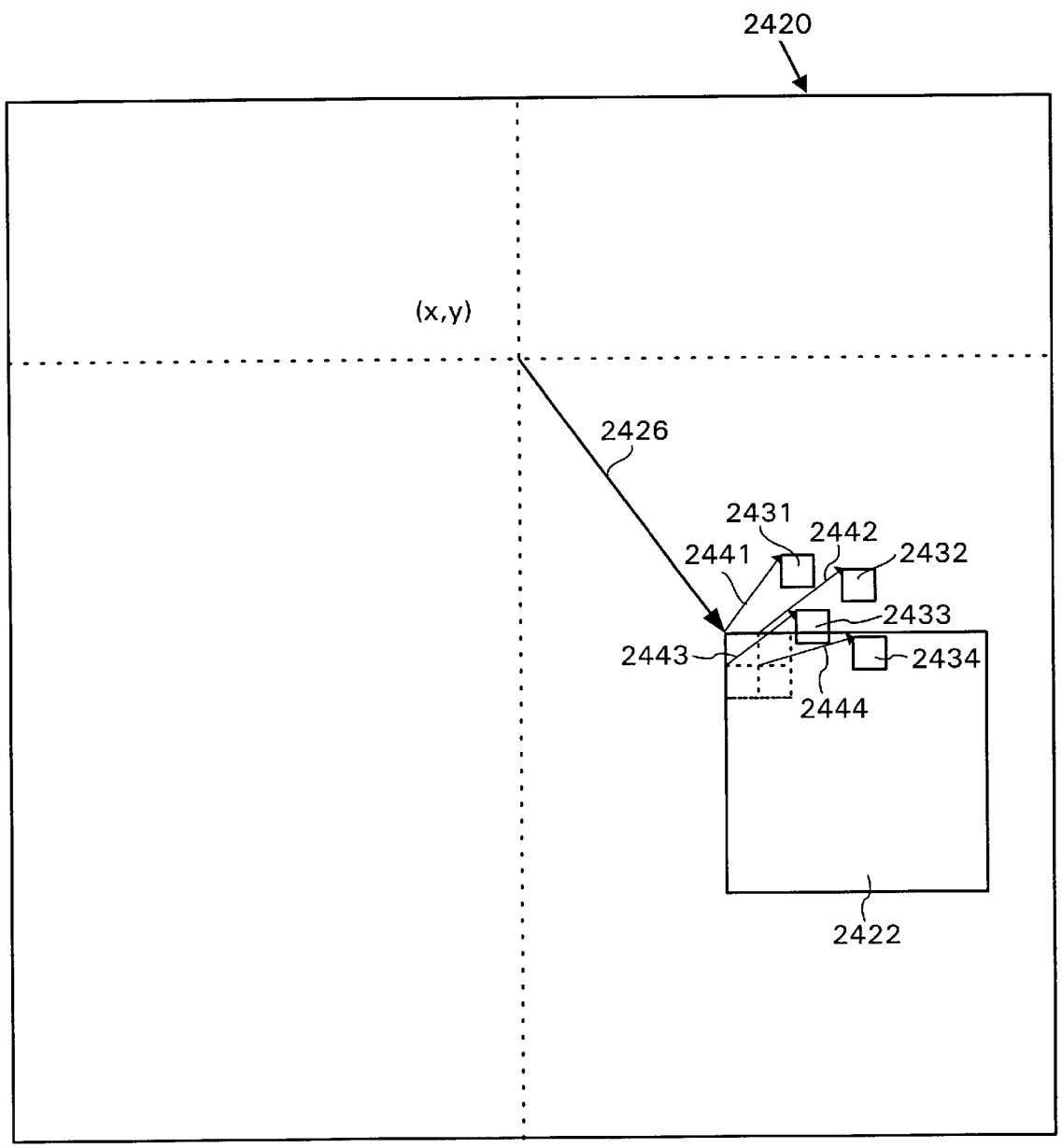
FIG. 26 is a block diagram showing displacement difference vectors for luminance blocks of a macroblock of a group of macroblocks.

By default, the compression unit determines one DDV per MB. In block-DDV mode, however, the compression unit determines DDVs for one or more luminance blocks of a MB. Thus, the compression unit can determine a DDV for each of the four luminance blocks 171–174 of MB 170 in FIG. 4. FIG. 26 shows DDVs for the luminance blocks of MB 2414 of FIG. 25. Estimating spatial displacement at the block level improves the accuracy of estimation and reduces residual sizes at the cost of additional computational complexity.

GMB predictor 2422 in reference light field image 2420 corresponds to GMB 2412. DV 2426 indicates a spatial displacement estimate for GMB 2412. Block predictors 2431–2434 correspond to luminance blocks of MB 2414. DDVs 2441–2444 are based upon GMB DV 2426 and corresponding block predictors 2431–2434, respectively. For example, DDV 2441 is based upon DV 2426 and block predictor 12431. A resultant $\overline{DV}_{MBj,Bk}$ for a block k within a MBj is given by the equation:

$$\overline{DV}_{MBJ,Bk} = DV_{GMB} + DDV_{MBj,Bk}$$

where $\overline{DDV}_{MBj,Bk}$ is the DDV for block k of MBj. $\overline{DV}_{MBj,Bk}$ can consider the relative position of MBj within the GMB and/or the relative position of block k within MBj.

In multi-predictor mode, different blocks within a MB can estimate spatial displacement using different GMB DVs. The resultant $\overline{DV}_{MBj,Bk}$ for a block k within a MBj is given by the equation:

$$\overline{DV}_{MBj,Bk} = DV_{GMB}{}^{Rli} + DDV_{MBj,Bk}$$

where $DVG_{GMB}{}^{Rli}$ is the GMB DV from selected reference light field image i for the GMB of which block k of MBj is a constituent. Additionally, the term $DDV_{MBj,Bk}$ can specify the reference light field image i.

Figure 27:
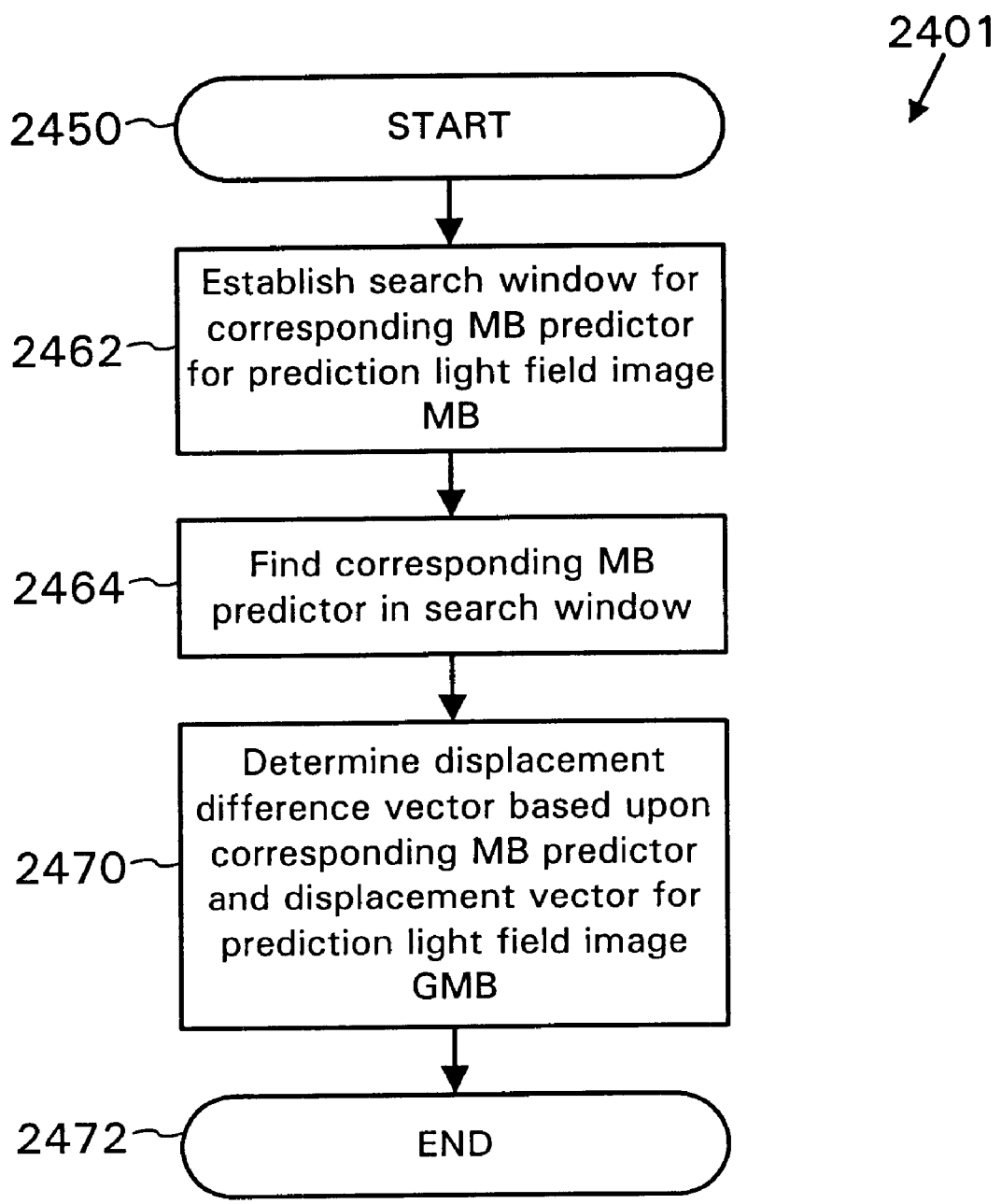
FIG. 27 is a flowchart showing a technique for finding a displacement difference vector within a search window in a reference light field image.
Figure 28:
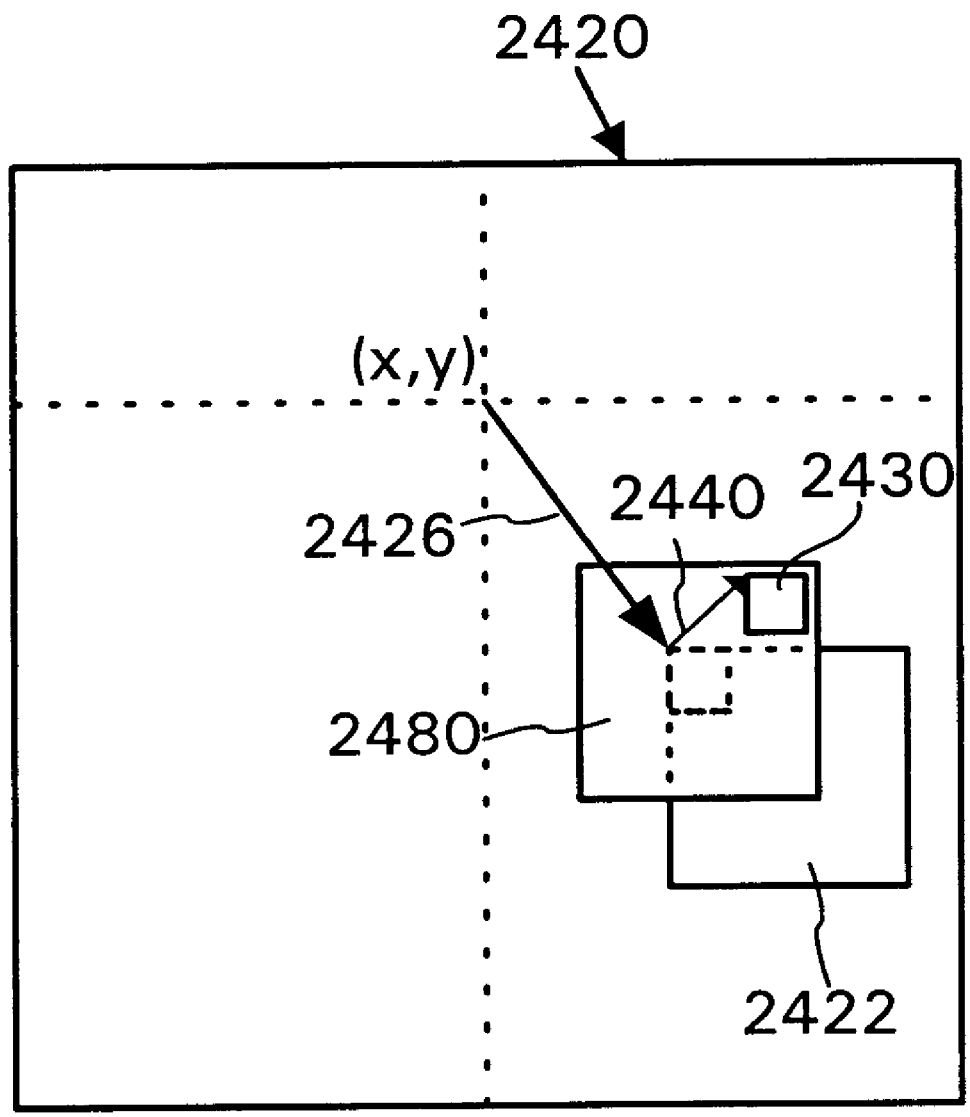
FIG. 28 is a block diagram showing a search window for finding a displacement difference vector in a reference light field image.

As described above, a compression unit can limit the area searched within a reference light field image for a GMB predictor. Using a search window to find a GMB DV decreases search time and reduces DV size. Similarly, the compression unit can use a search window to find a DDV. FIG. 27 shows a technique 2401 for finding a DDV within a search window in a reference light field image. FIG. 28 shows a DDV search window and DDV.

The compression unit establishes (act 2462) a search window 2480 within the reference light field image 2420. The search window 2480 surrounds the position estimated by the DV 2426 for the GMB 2412. The compression unit is able to recognize the relative positions of MBs within a GMB (e.g., the relative position of $MB_0$ 2414 within GMB 2412). Using this information, the compression unit constrains the placement of the search window to surround a corresponding relative MB position in the reference light field image. The default search window is (–16,+15) pixels in both the horizontal and vertical directions, but other search window shapes and dimensions are possible.

In the search window, the compression unit finds (act 2464) a MB predictor 2430 that corresponds to the prediction light field image MB. The compression unit compares various candidate MB predictor areas to the prediction light field image MB. The candidate MB predictor area that best approximates the prediction light field image MB by minimizing some measure of deviation is determined to be the corresponding MB predictor. The compression unit then determines (act 2470) a DDV 2440 based upon the corresponding MB predictor 2430 and the GMB DV 2426. In block-DDV mode, the compression unit searches search window 2480 for corresponding block predictors and calculates DDVs based on the corresponding block predictors.

The search window 2480 can be searched at pixel, half-pixel, or other intervals. Half-pixel searching yields more accurate spatial displacement estimation, but increases search time and DV size. To use half-pixel values, the compression unit interpolates values as necessary between known pixel values in both encoding and decoding. The default search window size for a half-pixel search is (–16,+15.5) in both the horizontal and vertical directions, but other search window shapes and dimensions are possible. To speed up processing, the compression unit searches by full pixel intervals. Like the search window for GMB DVs, the search window for DDVs can work with edge-extended reference light field images. DDVs that indicate only tiny spatial displacements are ignored in one embodiment.

Residual Values

Frequently, spatial displacement estimation imperfectly approximates a prediction light field image. FIGS. 29 and 30 show techniques 2500 and 2501 for calculating residuals to ameliorate these imperfections. By default, the compression unit calculates residuals for MBs of a prediction light field image. In alternative embodiments, such as those in which the compression unit estimates displacement for luminance blocks or other types of prediction light field image sections, the compression unit calculates residuals for sections of corresponding size.

FIG. 29 shows a technique 2500 for calculating a residual based on a GMB predictor for a prediction light field image GMB. A compression unit identifies (act 2520) a prediction light field image GMB. The compression unit determines (act 2530) a corresponding GMB predictor in a reference light field image. The compression unit then calculates (act 2540) a residual. For a particular MB within the GMB, the compression unit finds the difference between the actual MB and a predictor for the MB based upon the GMB predictor. After calculation of the residual, the pixels inside a MB m(i,j) are given by the equation:

$$m(i,j) = p^{(\overline{DV})}(i,j) + r(i,j),\ 0 \leq i \leq N_0-1;\ 0 \leq j \leq N_1-1,$$

where $p^{(\overline{DV})}(i,j)$ is the (i,j)-th pixel inside the predictor indicated for MB m by GMB DV, where r(i,j) is the residual value for the (i,j)-th pixel of MB m, and where $N_0$ and $N_1$ are the dimensions of MB m and its corresponding predictor.

FIG. 30 shows a technique 2501 for calculating a MB residual based upon a MB predictor determined using hierarchical spatial displacement estimation. A compression unit identifies (act 2522) a GMB in a prediction light field image. The compression unit then determines (act 2532) a corresponding GMB predictor. The compression unit next identifies (act 2534) a MB within the prediction light field image GMB. For the identified MB, the compression unit determines (act 2536) a corresponding MB predictor. The compression unit then calculates (act 2540) a MB residual value by finding the difference between the actual MB and the corresponding MB predictor. After calculation of the residual, the pixels inside a MB m(i,j) are given by the equation:

$$M(i,j) = p^{(\overline{DV}+\overline{DDV})}(i,j) + r(i,j),\ 0 \leq i \leq N_0-1;\ 0 \leq j \leq N_1-1,$$

where $p^{(DV+DDV)}(i,j)$ is the (i,j)-th pixel inside the predictor indicated for MB m by the resultant $\overline{DV+DDV}$.

If spatial displacement estimation poorly approximates a prediction light field image MB, the residual for that MB carries relatively significant, low detail information. On the other hand, if spatial displacement estimation accurately approximates a prediction light field image MB, the residual value carries relatively insignificant, high detail information. Either way, representation of residuals can consume significant amounts of storage or transmission resources. A 16×16 MB such as the one shown in FIG. 4 includes 4 8×8 blocks of luminance values and 2 8×8 blocks of chrominance values. If each value in the residual blocks is an 8-bit value, the size of the residual for a single MB is:

6×8×8×1 byte=384 bytes.

Figure 31:
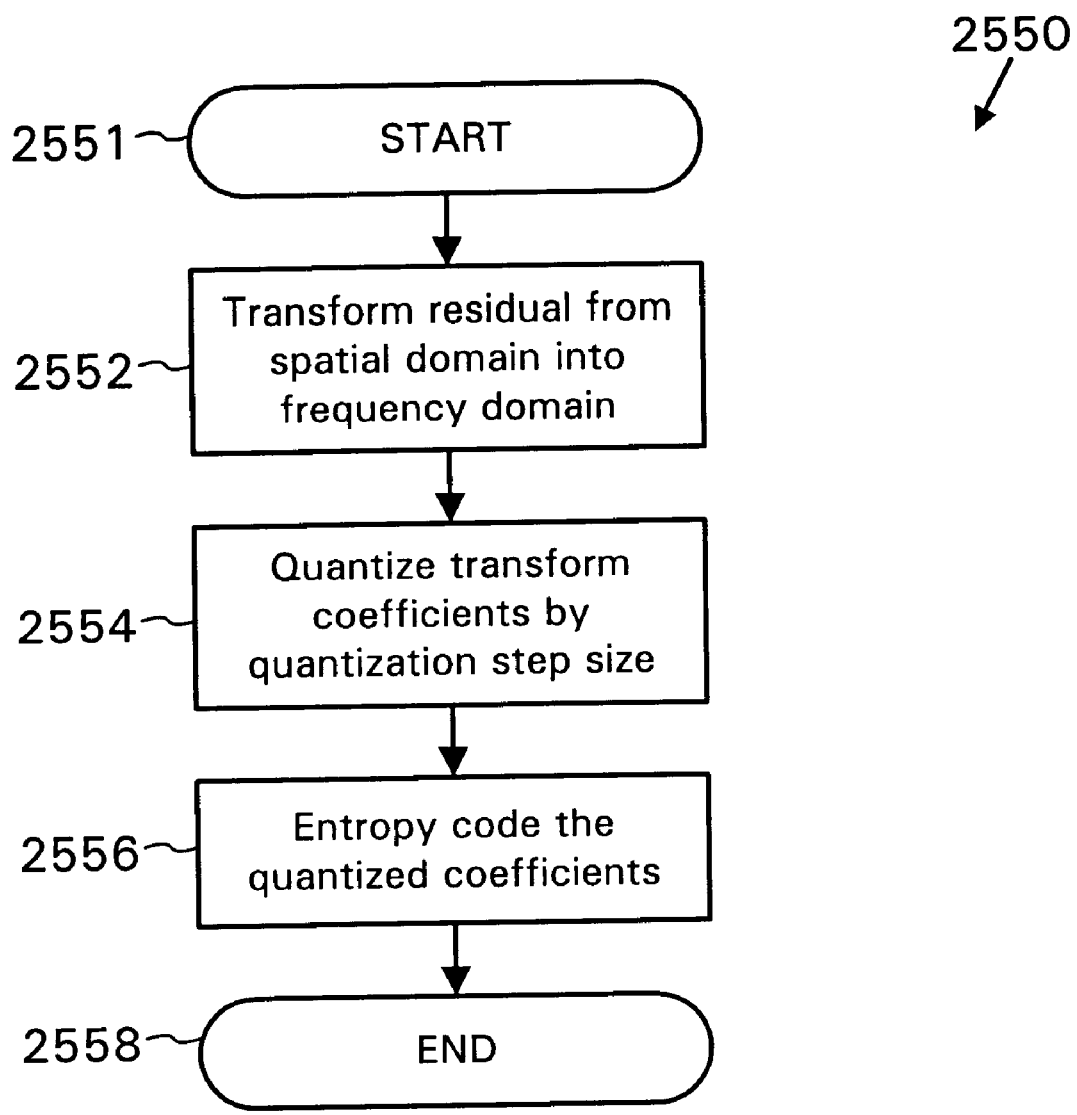
FIG. 31 is a flowchart showing a technique for compressing a residual value.

FIG. 31 shows a default technique for compressing a residual. In alternative embodiments, other techniques are used to compress a residual.

First, the compression unit transforms (act 2552) the residual from the spatial domain into the frequency domain. By default, the compression unit uses a block-based two-dimensional discrete cosine transform ["DCT"] on 8×8 blocks of residual values for a MB.

The compression reduces the amount of digital information to represent the residual by quantizing (act 2554) the transform coefficients. Quantization of a transform coefficient entails dividing the transform coefficient by a quantization value. When the compression unit uses block-based DCT, the compression unit quantizes a block of transform coefficients using a block of quantization values of a desired step size. By default, the compression unit quantizes low frequency transform coefficients with low values or not at all to generally preserve high-significance components of the residual. The compression unit quantizes high frequency transform coefficients more dramatically. In general, quantization step-sizes can be selected to balance image resolution against cost to computer system resources. Alternatively, the compression unit directly quantizes the residual, bypassing the frequency transform, to reduce computational complexity of decompression.

The compression unit next losslessly codes (act 2556) the quantized coefficients by an entropy coding technique. By default, the compression unit uses Huffman coding.

After compression of the residual for a MB m(i,j), values for the pixels within the subsequently decompressed MB are given by the equation:

$$\tilde{m}(i,j)=p^{(DV)}(i,j)+\tilde{r}(i,j) \approx m(i,j),\ 0\leq i \leq N_0-1;\ 0\leq j\leq N_1-1,$$

where $\tilde{r}(i,j)$ is the value of residual $r(i,j)$ after compression/decompression (which depends on the compression ratio and algorithm used), and where $\tilde{r}(i,j)$ is added to a predictor to form an approximation $\tilde{m}(i,j)$ of MB m.

The compression unit can measure the significance of a residual by measuring the deviation (e.g., mean square error, mean absolute difference) of the residual from a null residual. If the significance value for the residual is below a minimum threshold value, the compression unit discards the residual. If the compression unit discards the residual, the compression unit can specially note the areas of a prediction light field image that lack a residual to increase the speed of decoding and rendering operations, as described below.

Selective Intra-Image Coding of a Prediction Light Field Image

Figure 32:
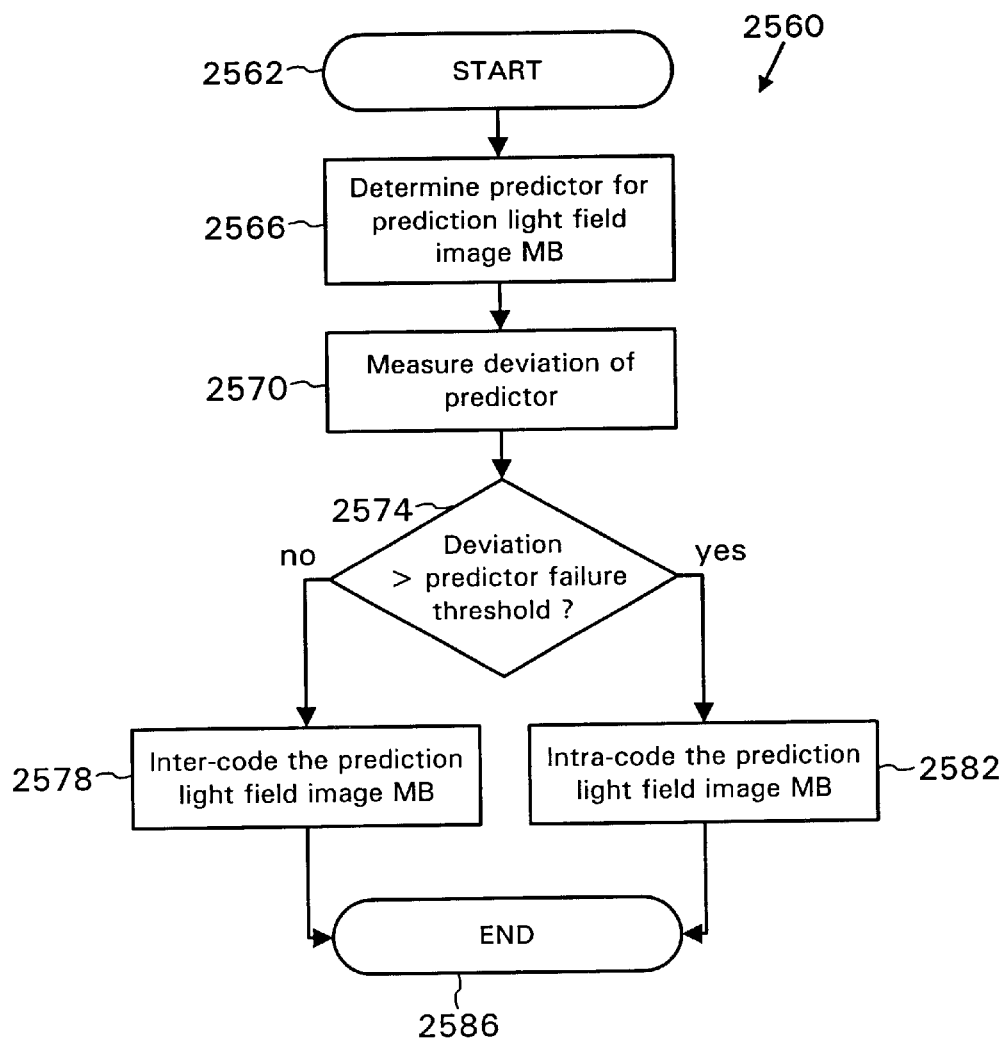
FIG. 32 is a flowchart showing a technique for selectively intra-image coding a prediction light field image macroblock.

When spatial displacement estimation gives an especially poor approximation of a prediction light field image MB, the MB residual carries very significant information. In such a case, rather than ineffectually inter-image code the MB, the compression unit can intra-image code the MB. FIG. 32 shows a technique 2560 for selectively intra-image coding a prediction light field image MB.

A compression unit determines (act 2566) a corresponding predictor for a particular prediction light field image MB. To measure the quality of the spatial displacement estimation, the compression unit measures (act 2570) deviation (e.g., mean square error or mean absolute difference) of the predictor from the actual MB.

The compression unit next compares (act 2574) this deviation measure to a predefined predictor failure threshold value. If the deviation measure is less than the predictor failure threshold value, the predictor acceptably estimates spatial displacement for the MB and the compression unit inter-image codes (act 2578) the MB. If the deviation measure is greater than the predictor failure threshold value, the predictor unacceptably estimates spatial displacement for the MB and the compression unit intra-image codes (act 2582) the MB. By default, the compression unit intra-image codes MBs, as necessary, block-based DCT, quantization, and Huffman coding. Alternatively, the compression unit uses other compression techniques, such as direct quantization of MBs plus entropy coding.

Configurations of Reference and Prediction Light Field Images

Figure 33:
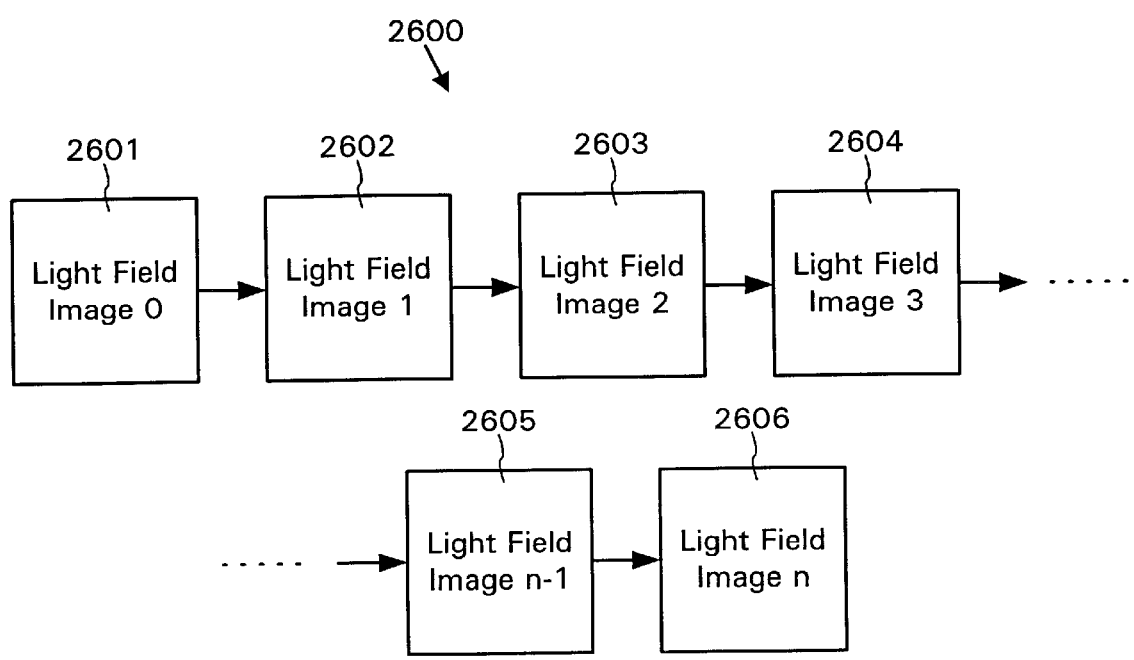
FIG. 33 is a block diagram showing a group of sequentially-coded prediction light field images.

FIG. 33 shows a group 2600 of n sequentially-coded light field images. The sequential ordering of the light field images is followed in both encoding and decoding. The sequence begins with light field image 0 2601, which is coded as a reference light field image. The rest of the light field images are coded as prediction light field images. Light field image 1 2602 estimates spatial displacement from light field image 0 2601, and so on, until light field image n 2606. Each prediction light field image estimates spatial displacement from the immediately preceding light field image.

While this configuration of light field images enables compression of prediction light field images by reducing inter-image spatial redundancy, it suffers several drawbacks. Access is linear. To decode a prediction light field image towards the end of the sequence, each preceding light field image must be decoded, which is time-consuming. This generally makes linear sequential coding of light field images unsuitable for real-time rendering. Also, errors can accumulate as the sequence progresses.

To some extent, these drawbacks can be overcome by designating more light field images within the sequence (e.g., every $10^{th}$ light field image) to be reference light field images. In addition, each prediction light field image can estimate spatial displacement from a reference light field image, rather than from the nearest light field image (which may be a prediction light field image). In this way, decoding and rendering operations avoid unnecessary decoding of intermediate prediction light field images. A one-dimensional sequence of light field images suitably captures geometric relationships if light field images are spatially related along a single dimension. For light fields such as light field 10 of FIG. 1, however, a one-dimensional sequence of light field images fails to effectively utilize geometric relationships between light field images.

Figure 34:
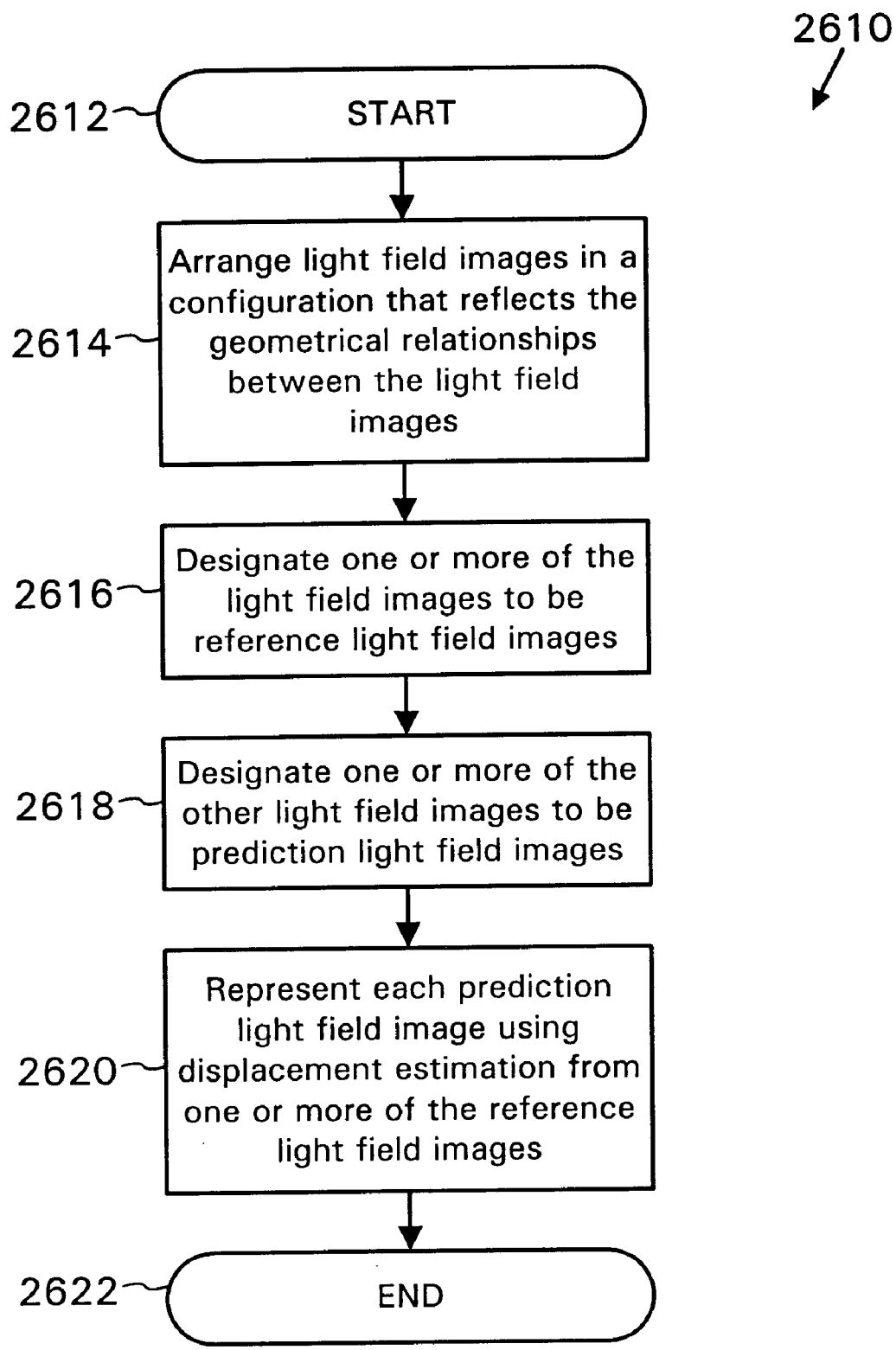
FIG. 34 is a flowchart showing a technique for arranging a light field into a configuration of reference and prediction light field images.
Figure 36:
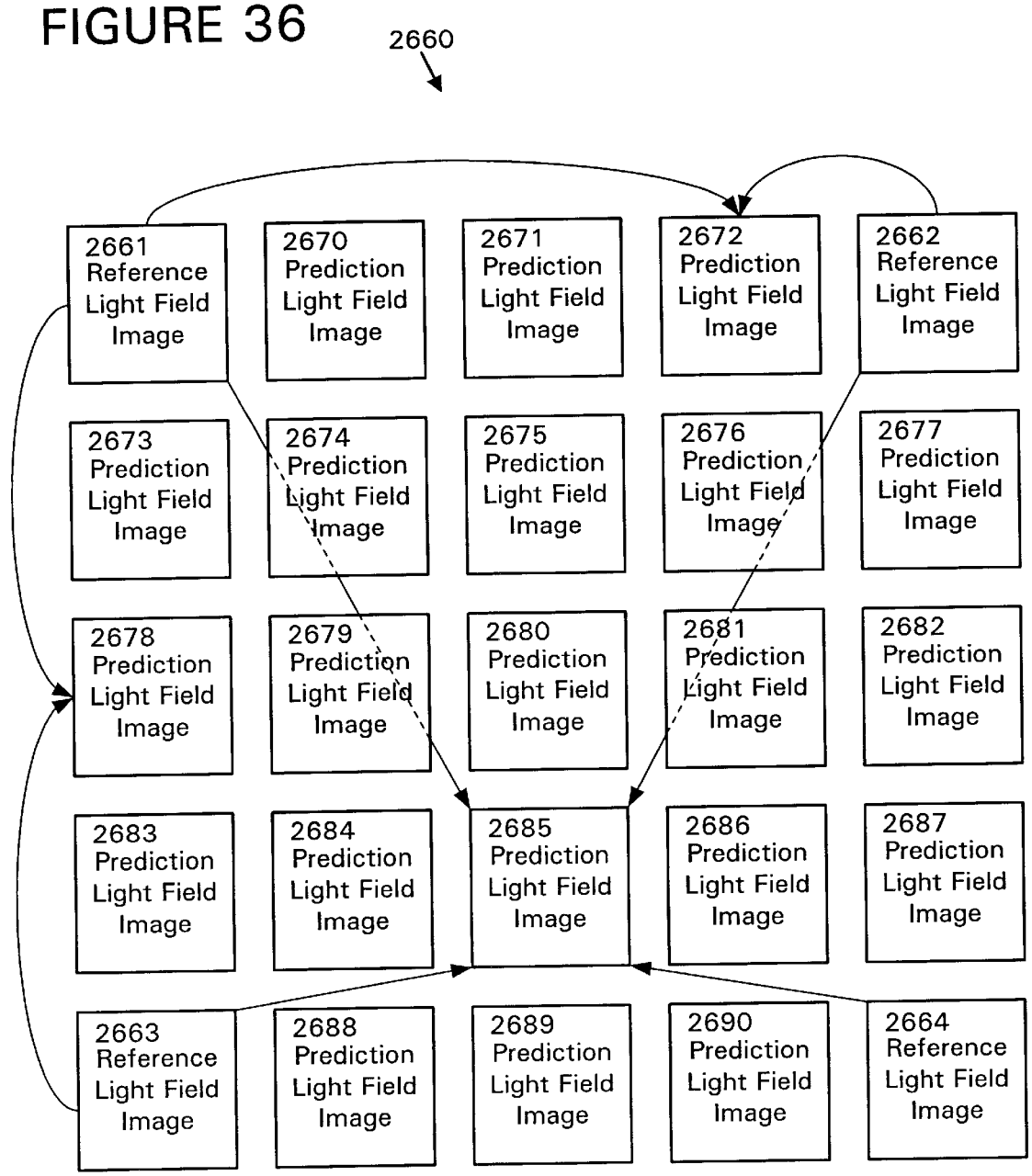

FIG. 34 shows a technique 2610 for configuring a light field based upon the geometrical relationships between light field images. Consideration of geometrical relationships between light field images leads to better designation of reference and prediction light field images within the light field and enables more efficient compression. FIGS. 35 and 36 show various configurations of light field images.

To simplify presentation, various aspects of the illustrative embodiment are described with reference to a "configuration" of light field images. A configuration of light field images can be represented by a data structure that organizes the light field images in a way that tracks the geometrical relationships between light field images. A rectangular configuration of light field images can be represented as a two-dimensional array, where adjacent elements in the array correspond to adjacent positions in the rectangular configuration of light field images.

With reference to FIG. 34, a compression unit arranges (act 2614) a light field in a configuration that reflects the geometrical relationships. between the light field images. The configuration corresponds to, for example, the relative positions around the object or static scene from which the light field images were taken. By arranging the light field images in this way, the compression unit facilitates reduction of inter-image spatial redundancy through spatial displacement estimation. FIG. 35 shows light field images arranged in a rectangular configuration 2630. FIG. 36 shows a default 5×5 configuration 2660 of light field images. In alternative embodiments, the configuration of light field images reflects the geometrical relationships between light field images on a loop or a surface surrounding an object or static scene.

FIGS. 35 and 36 depict light field images that are regularly spaced. In an alternative embodiment, light field images are irregularly spaced, and a configuration of these light field images tracks the irregular spacing.

After arranging the light field images, the compression unit designates (act 2616) one or more of the light field images to be reference light field images. By default, the compression unit designates light field images at regular intervals in the configuration to be reference light field images. In FIG. 36, every fourth light field image horizontally and vertically is a reference light field image. Thus, the light field images 2661–2664 at the corners of the 5×5 configuration 2660 are reference light field images. In an alternative embodiment, the compression unit designates light field images at irregular intervals in a configuration to be reference light field images. In FIG. 35, configuration 2630 includes four reference light field images 2631–2634 that are separated vertically by one light field image and horizontally by four light field images.

The compression unit next designates (act 2618) one or more of the other light field images to be prediction light field images. Using a technique for reducing inter-image spatial redundancy, as described above, the compression unit represents (act 2620) each prediction light field image in terms of spatial displacement estimates from one or more of the reference light field images. If the compression unit designated a single reference light field image, the compression unit estimates spatial displacement from that single reference light field image. If the compression unit designated multiple reference light field images, the compression unit estimates spatial displacement from one or more of those multiple reference light field images. Within a prediction light field image, different MBs can specify which reference light field image gives a GMB DV for that MB (multi-predictor mode). Alternatively, MBs can use some combination of GMB DVs from multiple reference light field images.

In FIG. 36, a prediction light field image estimates spatial displacement from different reference light field images depending on the location of the prediction light field image within the configuration. A prediction light field image located along the outside of the configuration (e.g., 2672, 2678) estimates spatial displacement from two reference light field images. Prediction light field image 2685 lies in the interior of the configuration 2660. Each of the corner reference light field images 2661–2664 gives displacement estimates for prediction light field image 2685. In multi-predictor mode, within a prediction light field image, an MB specifies which reference light field image gives a GMB DV for that MB. Alternatively, an MB uses some combination of GMB DVs from multiple reference light field images.

By default, light field images that are not reference light field images are prediction light field images. In an alternative embodiment, the compression unit designates one or more bi-directional light field images that estimate spatial displacement from reference or prediction light field images.

Storing a Prediction Light Field Image

Figure 37:
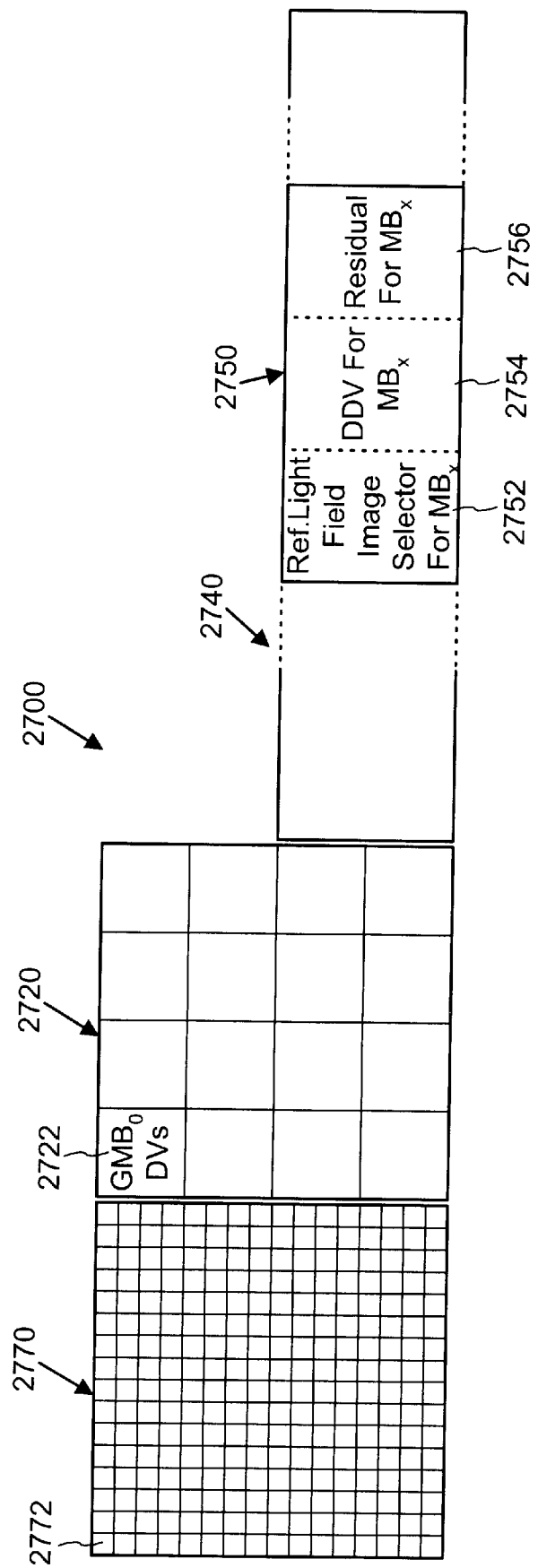
FIG. 37 is a block diagram of a data structure with a base field and an enhancement field, the data structure storing information for a prediction light field image.

The compression unit can store prediction light field image components (DVs, DDVs, residuals, etc.) and related information in fields and sub-fields of a data structure 2700 such as that shown in FIG. 37. Data structure 2700 includes a base field 2720 and an enhancement field 2740. The enhancement field 2740 is implemented with a data structure with VSDOs, such as one of those described in the above-referenced Chan et al. application. Data structure 2700 stores information in a way that facilitates spatial displacement estimation at selective quality levels.

The base field 2720 stores data representing DVs from reference light field images for prediction light field image GMBs. For an operation that involves the prediction light field image stored in data structure 2700, a decompression unit accesses the GMB DV information stored in base field 2720 according to a regular pattern. For example, the decompression unit decodes the entire base field 2720 before decoding any information in the enhancement field 2740. The data structure then includes the decoded GMB DVs in the base field and other information for the prediction light field image in the enhancement field.

In FIG. 37, the base field 2720 includes 16 sub-fields, corresponding to 16 GMBs of a prediction light field image. Alternatively, the base field 2720 includes a different number of sub-fields to correspond to a different number or type of prediction light field image sections. Each sub-field stores one or more DVs for a GMB of the prediction light field image. The GMB DVs can be uncompressed or compressed by a technique such as differential coding.

The enhancement field 2740 stores in VSDOs information for selecting a GMB DV or refining the prediction light field image as approximated using the base field 2720 information. The information stored in the enhancement field 2740 is less significant than the information stored in the base field 2720. Therefore, information in the enhancement field 2740 is selectively accessed as needed during light field operations, reducing the number of unnecessary decoding operations.

In FIG. 37, the enhancement field 2740 includes sub-fields for storing data about individual parts of the prediction light field image. Sub-field 2750 contiguously stores data pertaining to a prediction light field image $MB_x$. This data includes one or more multi-predictor mode reference light field image/GMB DV selectors 2752, one or more DDVs 2754, and/or a residual 2756. This sub-field/MB organization facilitates selective access and decoding of information for particular MBs of a prediction light field image.

Alternatively, a sub-field 2750 stores data pertaining to another part (e.g., GMB, section) of a prediction light field image. This data can include components such as a DV selection or residuals.

Depending on the compression scheme used and the contents of a prediction light field image, sub-fields for some prediction light field image MBs can be omitted entirely from the enhancement field 2740. Compression of data in sub-fields can further contribute to the variable length of the enhancement field 2740. Using a data structure with VSDOs as described above, however, facilitates efficient selective access to sub-fields of the enhancement field 2740.

In FIG. 37, the data structure 2700 stores a prediction light field image that has been compressed under multi-predictor mode. For a particular prediction light field image MB, multiple reference light field images can provide GMB DVs. Sub-field 2722 stores a GMB DV from each of the reference light field images. A sub-field 2752 stores a selector for a particular $MB_x$ (or for each block k of $MB_x$) that indicates which reference light field image/GMB DV to use for spatial displacement estimation for $MB_x$.

In FIG. 37, the data structure 2700 stores a prediction light field image that has been compressed using hierarchical spatial displacement estimation. For a MB within a GMB, a DDV refines spatial displacement estimation. A sub-field 2754 stores a DDV for a particular $MB_x$ (or for each block k of $MB_x$) of the GMB.

In FIG. 37, the data structure 2700 stores a prediction light field image for which a compression unit has calculated residuals. A sub-field 2756 stores a residual that corrects estimation errors for a particular $MB_x$. If a prediction light field image includes MBs that are intra-coded (e.g., due to inadequate spatial displacement estimation), the sub-field 2756 can store information for those intra-coded MBs.

When a decompression unit needs information for a particular MB, the decompression unit selectively accesses and decodes information in the sub-field corresponding to the particular MB. The speed of this operation can be further improved when the enhancement field lacks information for some MBs. FIG. 37 shows an index 2770 of flag values. The index 2770 of flag values indicates the presence or absence of refinement information within the enhancement field 2740 for individual MBs. In FIG. 37, the index 2770 is 16×16, reflecting the organization of a 256×256 prediction light field image into 16×16 macroblocks. A sub-field 2772 stores a flag value indicating the presence or absence of refinement information in the enhancement field 2740 for a $MB_0$ within $GMB_0$. By checking the flag values before attempting to access information, the decompression unit avoids unnecessary traversal of the enhancement field 2740.

Alternatively, instead of indicating the complete presence or absence of information for a particular MB, a flag value indicates the presence or absence of a particular kind of information such as a MB residual, intra-coded MB, or DDV. The data structure 2700 can lack an array of flag values or have a different size array of flag values.

FIG. 37 shows a data structure 2700 storing a prediction light field image compressed in multi-predictor mode with hierarchical spatial displacement estimation, residual calculation, and flag array utilization. The above-described features of data structure 2700, however, can appear alone or in different combinations. The above-described features can be altered for differently configured prediction light field images or to accommodate particular compression techniques. Moreover, although FIG. 37 depicts a data structure for storing a single prediction light field image, such a data structure can be combined with other data structures of the same or different types to store multiple prediction light field images, a mix of prediction and other light field images, or a mix of prediction light field images and other information.

VI. Accessing and Decompressing Light Field Information

Several aspects of the illustrative embodiment pertain to accessing and decompressing light field information. During rendering and other light field operations, light field information is accessed. To improve the efficiency of these light field operations, light field information is selectively accessed to enable rapid access to some subset of the light field information. Selectively accessing and decoding light field information reduces computational complexity and saves memory. This section describes techniques for decompression of compressed reference and prediction light field images, techniques for selective decompression of enhancement information for reference and/or prediction light field images, techniques for selective access to enhancement light field information in a data structure with VSDOs, and techniques for selective transmission of enhancement light field information.

An uncompressed light field consumes a large amount of information. Compressing a light field using spatial displacement estimation significantly reduces this amount of information. According to one aspect of the illustrative embodiment, a decompression unit decompresses prediction light field images that have been compressed by spatial displacement estimation.

During rendering, known light field images provide information for pixels of a novel perspective light field image. Depending on the perspective of the novel perspective light field image being rendered, different light field images and different parts of the different light field images are retrieved. So, when rendering an entire novel perspective image, much light field information is typically not considered. Furthermore, although random access to parts of light field images facilitates rendering, loading entire decompressed light fields into random access memory wastes memory and processor resources. When the light field is compressed, decompression of the light field information that is not used wastes resources. Thus, selective access and decompression of light field information facilitate efficient rendering.

The complexity of certain decompression and rendering operations can be reduced when quality loss is acceptable or necessary. In such situations, accessing and decompressing non-considered light field information wastes resources. As described above, light field information can be compressed to multi-resolution representations of some intra-image and/or inter-image granularity. Efficient access to multi-resolution enhancement information for a light field improves the speed of light field operations. Selective decompression of multi-resolution enhancement information for a light field reduces memory and processor requirements for light field operations. According to one aspect of the illustrative embodiment, a data structure with VSDOs stores a multi-resolution representation of a light field image and allows efficient access to information of varying quality levels. A decompression unit first decompresses low frequency component layer information for reference light field images and/or rough displacement estimation information for prediction light field images. The decompression unit then selectively decompresses enhancement information. Enhancement information for reference light field images includes higher frequency component layer information. Enhancement information for prediction light field images includes spatial displacement estimation refinement information. More generally, selective enhancement decompression techniques can be applied to a light field compressed using other multi-resolution intra-image or inter-image compression techniques, such as those that compress a light field according to some other granularity.

Decompression of Reference and Prediction Light Field Images

Figure 38:
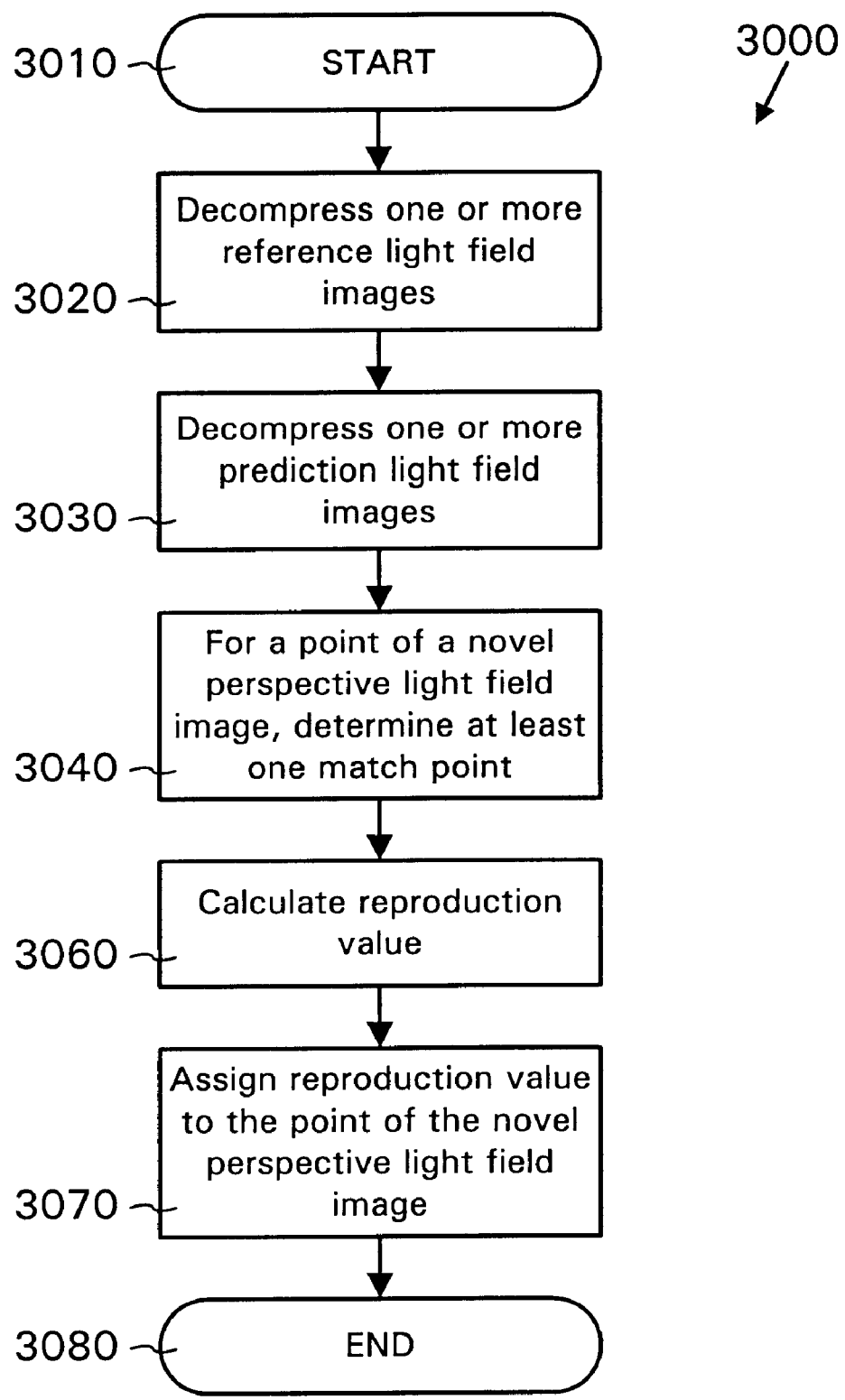
FIG. 38 is a flowchart showing a technique for calculating a novel perspective image pixel from a light field that was compressed using spatial displacement estimation.
Figure 39:
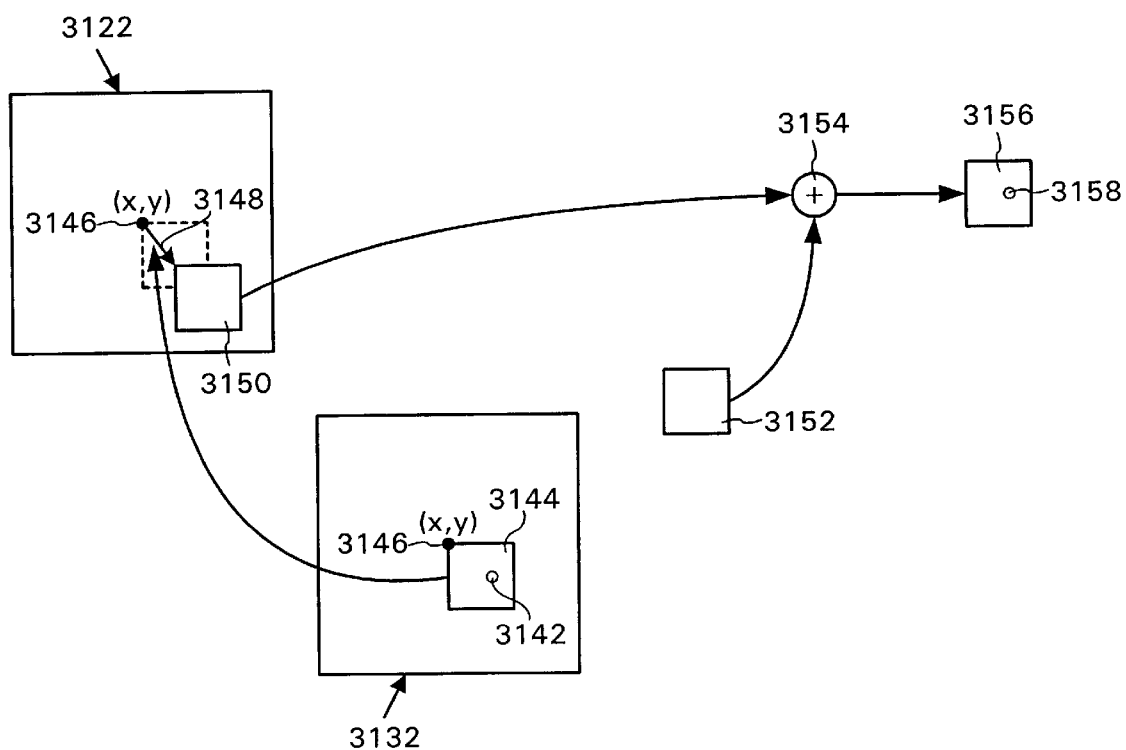
FIG. 39 is a diagram showing decompression of information for a match point in a prediction light field image.

FIG. 38 shows a technique 3000 for calculating a value for a novel perspective light field image pixel from a light field that was compressed using spatial displacement estimation. FIG. 39 is a diagram showing decompression of information for a match point in a light field image.

The decompression unit decompresses (act 3020) one or more reference light field images. The decompression unit also decompresses (act 3030) for one or more prediction light field images information such as DVs, DDVs, residuals, and other DV selectors. Thus, the decompression unit can selectively access and decompress information for some prediction light field images without accessing or decompressing unnecessary information for other prediction light field images. During a rendering operation, a traced light ray for a pixel of a novel perspective light field image intersects the light field. For the novel perspective image pixel, a match point is determined (act 3040) in a prediction light field image. If the rendering operation uses a constant basis function, the match point is the light field grid point (i,j,p,q) closest to the intersection of the traced light ray. The decompression unit calculates (3060) a reproduction value and assigns (act 3070) the reproduction value to the novel perspective light field image pixel.

FIG. 39 is a diagram showing decompression of information for a match point in a prediction light field image. A match point 3142 in prediction light field image 3132 is close to the intersection point for a traced light ray for a novel perspective image pixel. A match area 3144 includes the match point 3142. The corner of the match area 3144 is at coordinates (x,y) 3146 in the prediction light field image 3132. A DV 3148 is associated with the match area 3144.

In the decompressed reference light field image 3122, the DV 3148 is applied at the coordinates (x,y) 3146 to provide an area predictor 3150. The area predictor 3150 is combined (act 3154) with a residual 3152 associated with the match area 3144 to reproduce the refined match area 3156. The refined match area 3156 includes a match point pixel value 3158 used when calculating a reproduction value.

Alternatively, the decompression unit determines multiple match points and calculates a reproduction value based upon values for the multiple match points, for example, according to a quadrilinear basis function.

Figure 41:
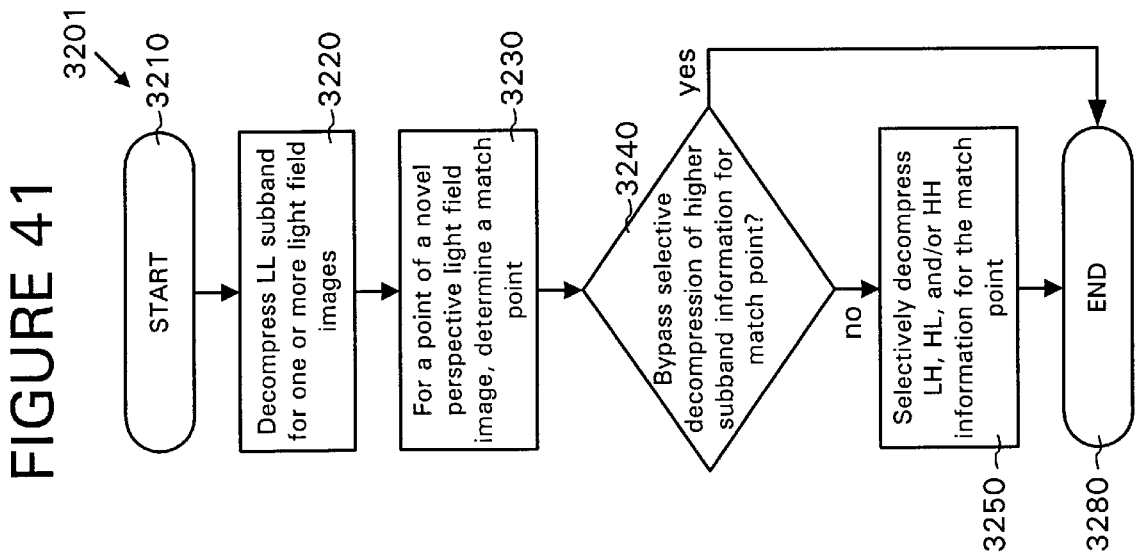
FIGS. 40, 41, and 42 are flowcharts showing techniques for selective decompression of enhancement information for a match point of an intra-image coded light field image.
Figure 40:
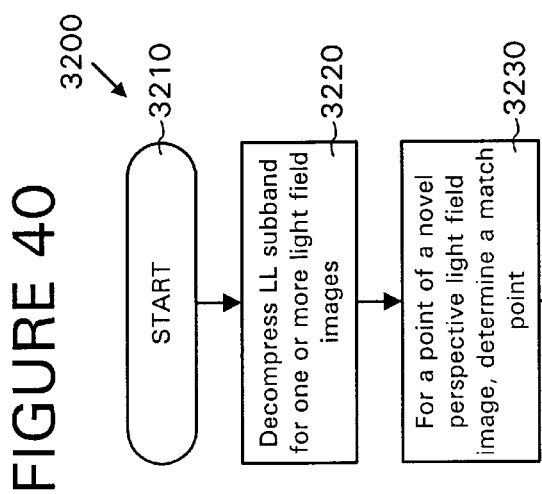
Figure 42:
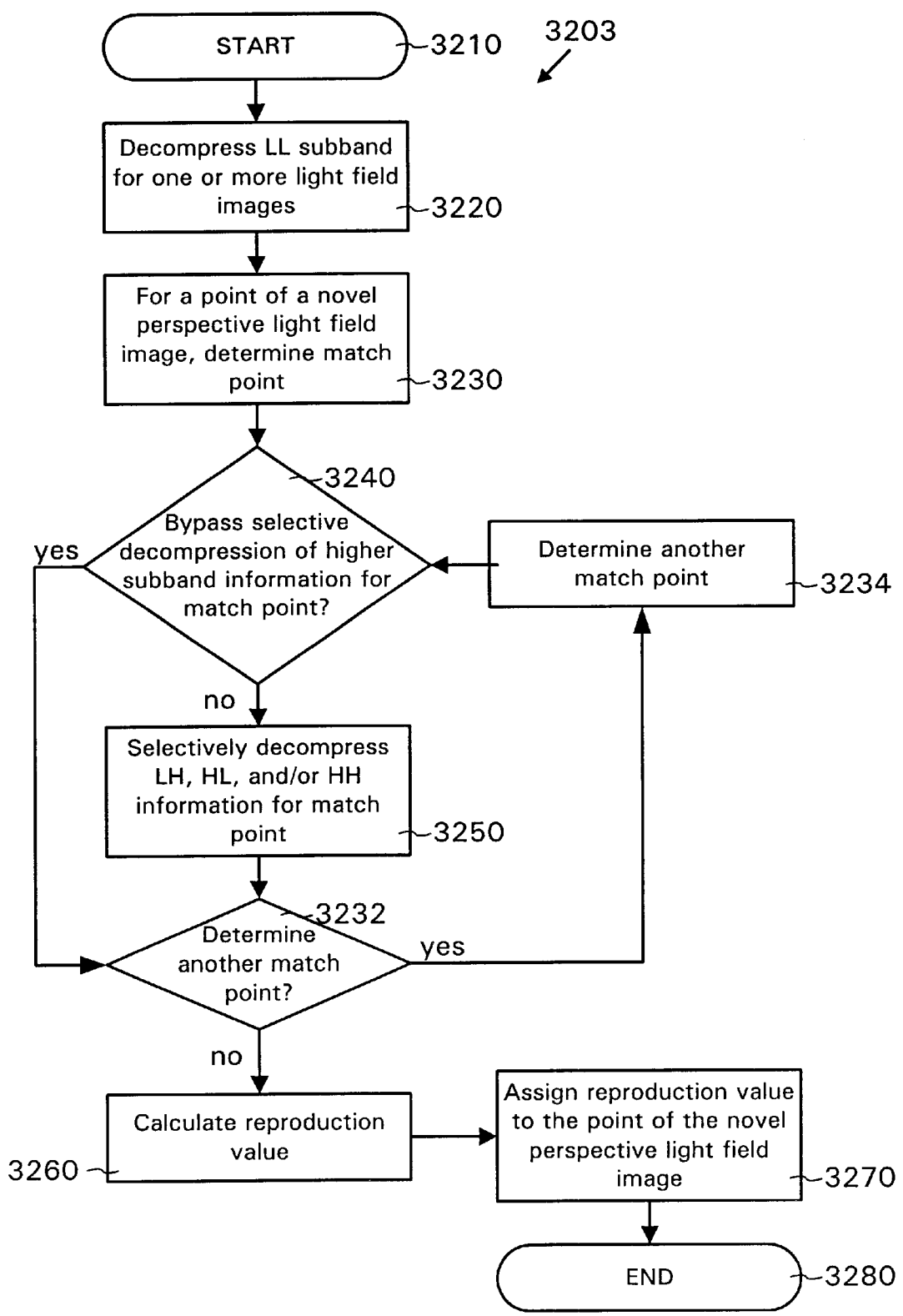

Selective Enhancement Decompression of Intra-Coded Light Field Image Information FIGS. 40–42 show various techniques for selective decompression of enhancement information for an intra-image coded light field image.

FIG. 40 shows a general technique 3200 for selective decompression of enhancement information for an intra-coded light field image. For each of one or more intra-coded light field images, a decompression unit decompresses (act 3220) LL subband information for the light field image. During a rendering operation, a traced light ray for a pixel of a novel perspective light field image intersects the light field. From the intersection point, a match point is determined (act 3230) in an intra-coded light field image. For the match point, the decompression unit selectively decompresses (act 3250) LH, HL, and/or HH subband information for the intra-coded light field image that includes the match point.

In an alternative embodiment, for a novel perspective image pixel, multiple match points are determined. The decompression unit subsequently selectively decompresses higher frequency component layer information for the multiple match points. In another alternative embodiment, selective enhancement decompression of intra-coded light field information for a match point occurs at some other level of frequency granularity across a light field image or light field.

FIG. 41 shows a technique 3201 for conditionally bypassing selective decompression of enhancement information. After determining (act 3230) a match point, the decompression unit considers (act 3240) whether to bypass selective decompression of higher subband information for the match point. The decompression unit can check a flag value that indicates the presence or absence of LH, HL, and/or HH subband information for the match point. The flag value can indicate some other properties of the LH, HL, and/or HH subband information.

Alternatively, a decompression unit considers a processor, memory, or other system constraint to determine whether to bypass selective decompression of enhancement information. If a processor is unable to decompress enhancement information fast enough to support real time rendering, the decompression unit bypasses selective decompression. If a memory shortage system causes an excess of memory page faults, the decompression unit bypasses selective decompression. Such processor or memory constraints might be found in a notebook or handheld computer rendering a light field image from compressed light field information from storage or a received broadband transmission. By conditionally bypassing decompression of higher subband information, the decompression unit skips unnecessary or inefficient attempts to selectively decompress higher subband information, making selective decompression of enhancement information more efficient.

In an alternative embodiment, a transmitter bypasses transmission of enhancement information based upon a constraint imposed by transmission capability or cue received from a receiver. The transmitter transmits low granularity light field information such as LL subband information then selectively transmits enhancement information based upon transmission capacity. The transmitter then determines whether transmission of enhancement information will be effective, for example, by testing the latency and bandwidth characteristics of a packet-switched network such as the Internet by measuring round trip times. The transmitter can receive some indicator of network state from a recipient or an intermediate network node. The transmitter then selectively transmits enhancement information such as LH, HL, and HH subband information. In general, the transmitter can transmit and selectively transmit light field information at other levels of granularity. Moreover, instead of selective transmission, the transmitter can prioritize transmitted data, transmitting LL subband information with a higher priority than HH subband information.

To calculate a reproduction value for a novel perspective image pixel, after selectively decompressing (act 3250) information for a match point, the decompression unit calculates a reproduction value based on the information for the match point. The decompression unit synthesis filters LL, LH, HL, and HH subband information for the match point. If the decompression unit selectively decompresses information for multiple match points, the decompression unit can calculate a reproduction value based upon the information for those multiple match points. If the decompression unit bypasses selective decompression, the decompression unit calculates a reproduction value based on information from the LL subband. After calculating a reproduction value, the decompression unit assigns the reproduction value to the novel perspective image pixel.

Although the above techniques refer to selective decompression of enhancement information for a match point, by default, the decompression unit selectively decompresses enhancement information for a match area that includes the match point. Instead of decompressing LH, HL, and HH information for a single match pixel, the decompression unit decompresses LH, HL, and HH information for the MB that includes the match pixel. Thus, the task of indexing enhancement information for selective decompression is simplified.

FIG. 42 shows a technique 3203 that combines elements from techniques 3200–3201. Moreover, FIG. 42 shows selective decompression of enhancement information for multiple match points. After selectively decompressing (act 3250) information for a first match point, the decompression unit considers (act 3232) whether to determine (act 3234) another match point. If the decompression unit does so, the decompression unit considers (act 3240) whether to bypass selective decompression of higher subband information for that match point and selectively decompresses (act 3250) information as appropriate. The decompression unit calculates (act 3260) a reproduction value based on information for the one or more match points and assigns (act 3270) the reproduction value to the novel perspective light field image pixel.

Figures 43, 44:
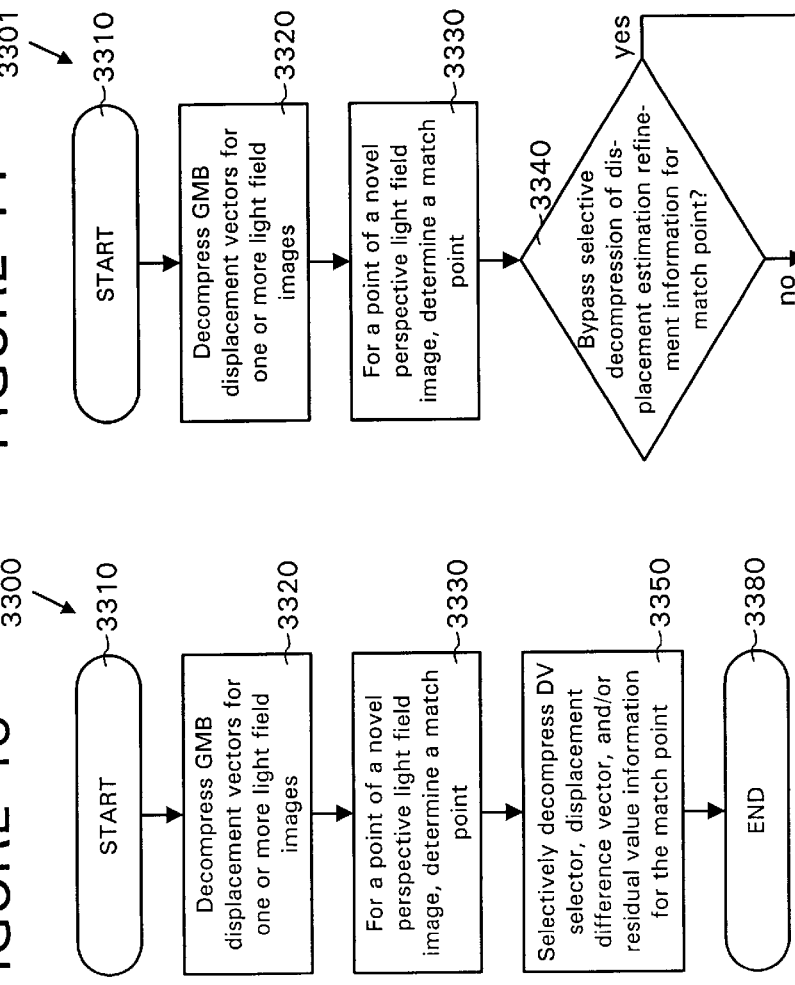
FIGS. 43, 44, and 45 are flowcharts showing techniques for selective decompression of enhancement information for a match point of an inter-image coded light field image.
Figure 45:
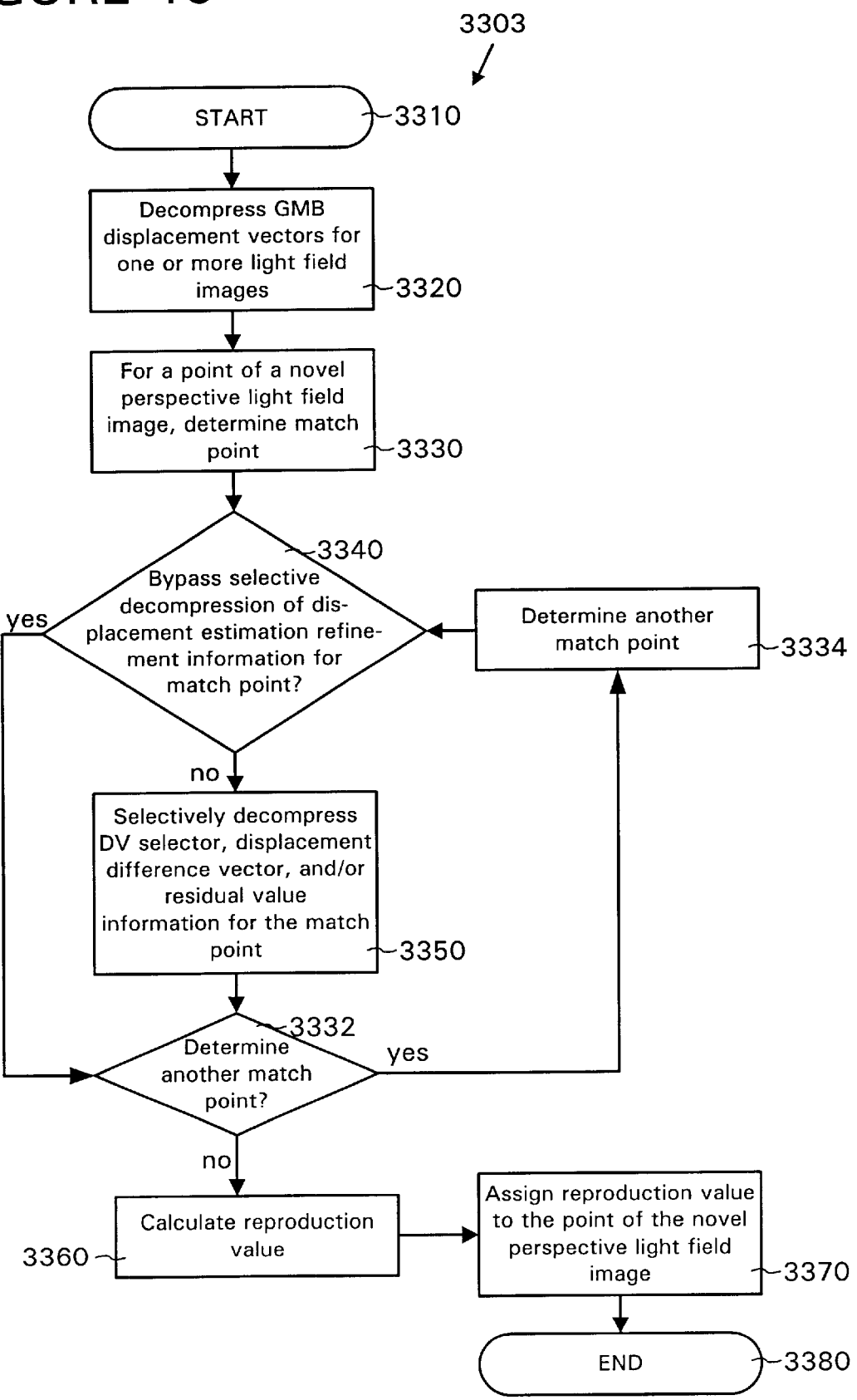

Selective Enhancement Decompression of Inter-Coded Light Field Image Information FIGS. 43–45 show various techniques for selective decompression of enhancement information for an inter-image coded light field image.

FIG. 43 shows a general technique 3300 for selective decompression of enhancement information for an inter-coded light field image. For each of one or more inter-coded light field images, a decompression unit decompresses (act 3320) DVs for GMBs. During a rendering operation, a traced light ray for a pixel of a novel perspective light field image intersects the light field. From the intersection point, a match point is determined (act 3330) in an inter-coded light field image. For the match point, the decompression unit selectively decompresses (act 3350) a DV selector, one or more DDVs, and/or a residual.

As described above, the decompression unit can selectively decompress enhancement information for a match area that includes the match point. Instead of decompressing spatial displacement estimation refinement information for a single match pixel, the decompression unit can decompress refinement information for the MB that includes the match pixel. When multi-predictor mode is used, refinement information includes a DV selector for a MB. When hierarchical spatial displacement estimation is used, refinement information includes a DDV for a MB, or multiple DDVs for blocks of a MB. Refinement information can also include a MB residual. Thus, the task of indexing enhancement information for selective decompression is simplified.

In an alternative embodiment, for a novel perspective image pixel, multiple match points are determined. The decompression unit subsequently selectively decompresses spatial displacement estimation refinement information for the multiple match points.

FIG. 44 shows a technique 3301 for conditionally bypassing selective decompression of enhancement information. After determining (act 3330) a match point, the decompression unit considers (act 3340) whether to bypass selective decompression of spatial displacement estimation refinement information for the match point. The decompression unit can check a flag value that indicates the presence or absence of spatial displacement estimation refinement information for the match point. The flag values can indicate some other properties of the spatial displacement estimation refinement information. Alternatively, a decompression unit considers a processor, memory, or other system constraint to determine whether to bypass selective decompression of enhancement information, as described above. By conditionally bypassing decompression of spatial displacement estimation refinement information, the decompression unit skips unnecessary or inefficient attempts to process spatial displacement estimation refinement information.

In another alternative embodiment, a transmitter bypasses transmission of spatial displacement estimation refinement information based upon a constraint imposed by transmission capability, as described above. The transmitter transmits low granularity GMB DVs then selectively transmits spatial displacement refinement information based on transmission capacity.

To calculate a reproduction value for a novel perspective image pixel, after selectively decompressing (act 3350) information for a match point, the decompression unit calculates a reproduction value based on the information for the match point. If the decompression unit selectively decompresses information for multiple match points, the decompression unit can calculate a reproduction value based upon the information for those multiple match points. After calculating a reproduction value, the decompression unit assigns the reproduction value to the novel perspective image pixel.

To illustrate, the decompression unit can calculate a reproduction value by calculating a predictor then adjusting the predictor with a residual to reconstruct a MB that includes a match point. The decompression unit decompresses a GMB selector and a DDV for a MB that includes a match point. The decompression unit calculates a MB predictor from a reference light field image based upon a decompressed DV for the selected GMB and the DDV. The decompression unit applies a decompressed residual for the MB to the MB predictor to reconstruct the MB that includes the match point. If the decompression unit has conditionally bypassed selective decompression of enhancement information, the decompression unit calculates a reproduction value based on information from a reference light field image and a decompressed GMB DV.

FIG. 45 shows a technique 3303 that combines elements from techniques 3300–3301. Moreover, FIG. 45 shows selective decompression of enhancement information for multiple match points. After selectively decompressing (act 3350) information for a first match point, the decompression unit considers (act 3332) whether to determine (act 3334) another match point. If the decompression unit does so, the decompression unit considers (act 3340) whether to bypass selective decompression of spatial displacement estimation refinement information for that match point and selectively decompresses (act 3350) information as appropriate. The decompression unit calculates (act 3360) a reproduction value based on information for the one or more match points and assigns (act 3370) the reproduction value to the novel perspective light field image pixel.

Figure 50:
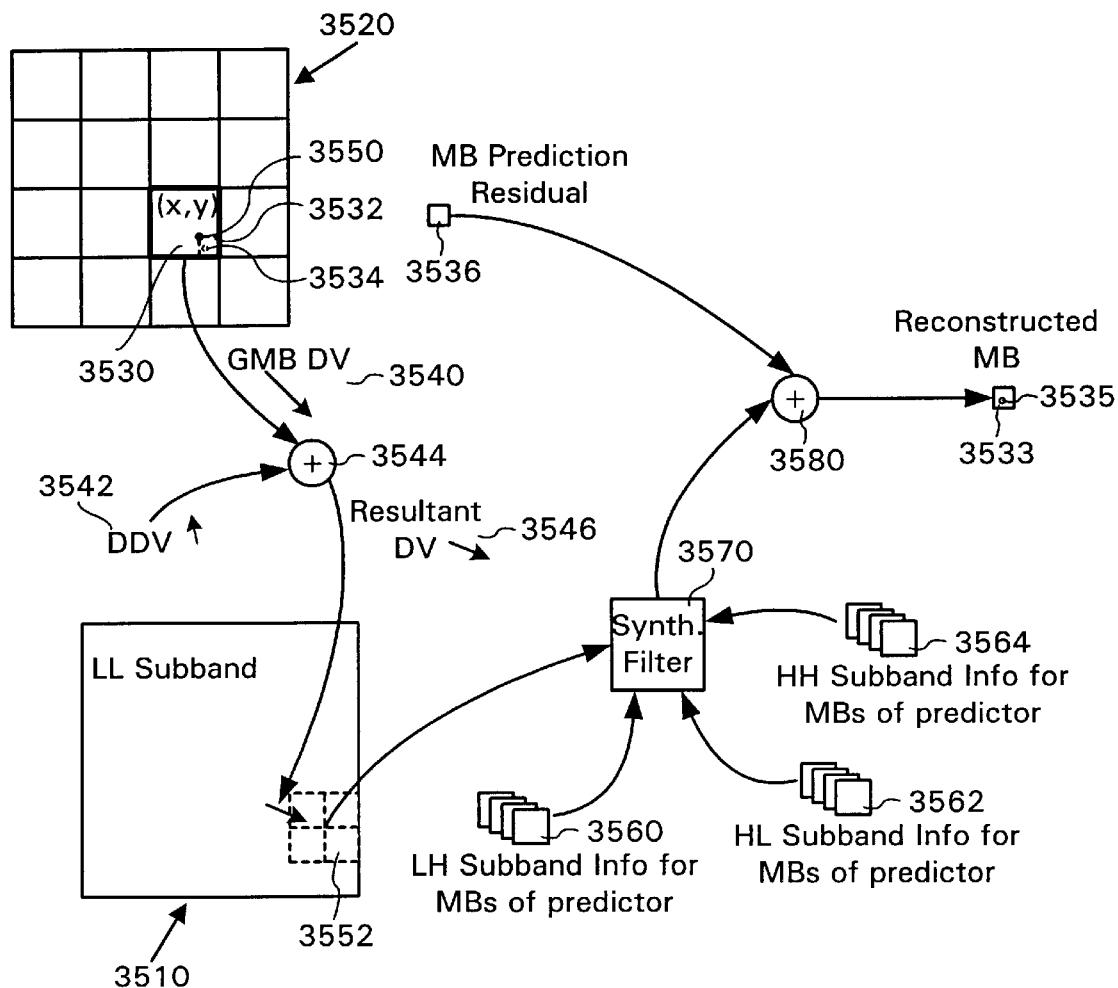
FIG. 50 is a diagram showing reconstruction of a match point from a light field that was compressed using hierarchical displacement estimation.

Selective Enhancement Decompression of Intra-coded or Inter-Coded Light Field Image Information FIGS. 46–49 show various techniques for selective decompression of enhancement information for a match point in either an intra-image coded or inter-image coded light field image. FIG. 50 shows selective decompression of enhancement information to reconstruct a match pixel of a light field compressed using hierarchical spatial displacement estimation and residual calculation.

Figure 46:
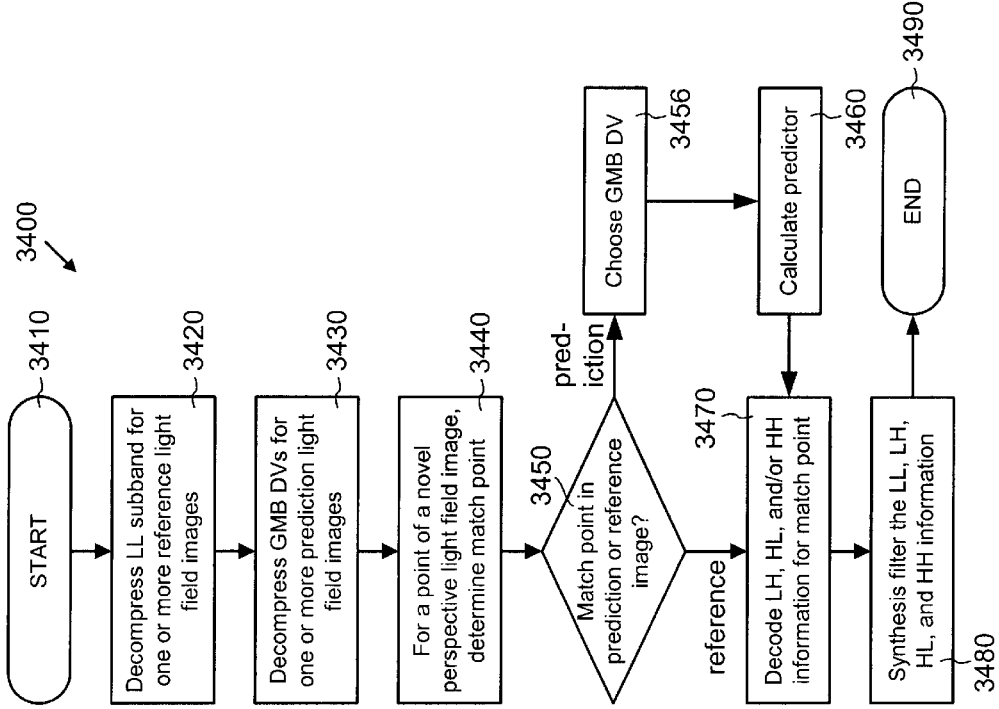
FIG. 46 is a flowchart showing a technique for selective decompression of enhancement information for a match point of an intra-coded or inter-coded light field image.

With reference to FIG. 46, a decompression unit decompresses (act 3420) LL subband information for one or more reference light field images. The decompression unit also decompresses (act 3430) GMB DVs for one or more prediction light field images.

During a rendering operation, a traced light ray for a pixel of a novel perspective light field image intersects the light field. From the intersection point, a match point is determined (act 3440) in one of the light field images. The decompression unit considers (act 3450) whether a prediction light field image or reference light field image includes the match point.

If a reference light field image includes the match point, the decompression unit decompresses (act 3470) LH, HL, and HH subband information for the match point. The decompression unit synthesis filters (act 3480) the LL, LH, HL, and HH information to reconstruct a value for the match point.

If a prediction light field image includes the match point, the decompression unit chooses (act 3456) a GMB DV for the match point. The compression unit calculates (act 3460) a predictor based upon the decompressed LL subband information for a reference light field image and the GMB DV. The decompression unit then decompresses (act 3470) LH, HL, and HH subband information for the predictor and synthesis filters (act 3480) the LL, LH, HL, and HH information to reconstruct a value for the match point. Alternatively, the decompression unit calculates a predictor from a reference light field image that includes higher subband information at the time of predictor calculation.

As described above, the decompression unit can selectively decompress enhancement information for a match area that includes the match point. Moreover, as described above, a decompression unit can determine, selectively decompress information for, and reconstruct values for multiple match points.

As described above, the decompression unit can conditionally bypass selective decompression of enhancement information for a match point based upon a flag value indicating the absence of enhancement information, or based upon a processor, memory, or other system constraint. Similarly, as described above, a transmitter transmitting intra-image coded and inter-image coded light field information can selectively bypass transmission of enhancement information based upon a constraint imposed by transmission capability.

Figure 47:
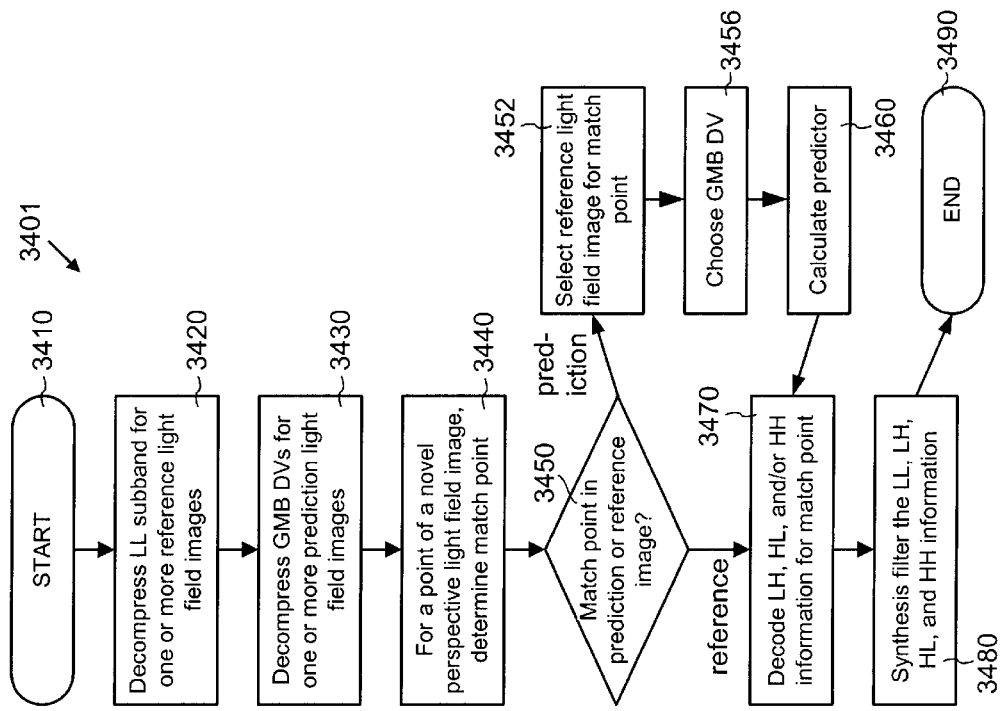
FIG. 47 is a flowchart showing a technique for selective decompression of enhancement information for a match point of an intra-coded or inter-coded light field image compressed in multi-predictor mode.

FIG. 47 shows a technique 3401 for selective decompression of enhancement information for a match point in a prediction light field image compressed in multi-predictor mode. The decompression unit selects (act 3452) a reference light field image based on a selector for the match point. When a decompression unit works with match areas such as MBs, the decompression unit chooses a reference light field image based on a selector for a match area that includes the match point.

FIG. 48 shows a technique 3402 for selective decompression of enhancement information for a match point in a prediction light field image compressed using hierarchical spatial displacement estimation. The decompression unit decodes (act 3458) one or more DDVs for the match point. Based upon the GMB DVs and the one or more DDVs, the decompression unit calculates (act 3460) a predictor. When a match area such as a MB includes the match point, the decompression unit can decode one or more DDVs for the match area.

FIG. 49 shows a technique 3403 for selective decompression of enhancement information for a match point when a prediction light field image has residuals. The decompression unit decodes (act 3482) a residual for the match point.

The decompression unit combines (act 3484) the decoded residual with the information derived from spatial displacement estimation for the match point. When a decompression unit works with a match area such as an MB, the decompression unit can decode a residual for the match area. Alternatively, when a prediction light field MB is coded in intra mode, for example, due to poor spatial displacement estimation, the residual for the MB includes intra-image coded MB information. When a prediction light field image MB is intra-image coded, the accessing of GMB DV for the MB can be skipped.

The above-described variations of selective decompression of enhancement light field information can be used individually or in combination. FIG. 50 shows selective enhancement decompression and reconstruction of a match point value from a light field compressed using hierarchical spatial displacement estimation with residuals. In FIG. 50, information for a MB that includes the match point is selectively decompressed. The GMB DVs 3520 correspond to a 256×256 prediction light field image that includes 16×16 macroblocks. The 128×128 LL subband 3510 corresponds to a 256×256 reference light field image. The 128×128 LL subband 3510 includes 16×16 macroblocks.

LL subband 3510 and GMB DVs 3520 provide low granularity information for the 256×256 reference light field image and for the 256×256 prediction light field image, respectively. The 16×16 MB 3532 of GMB 3530 includes a match point 3534. A residual 3536 for the MB includes information not estimated by spatial displacement estimation. If the MB 3532 is intra-image coded, the residual includes intra-coded information.

GMB DV 3540 indicates a spatial displacement estimate for GMB 3530 as a whole. DDV 3542 refines spatial displacement estimation for MB 3532. Alternatively, DDVs associated with a subset of the blocks of the MB 3532, e.g., the luminance blocks, can be used. GMB DV 3540 and DDV 3542 combine (3544) to produce a resultant DV 3546.

A location (x,y) 3550 indicates a pre-determined corner of the MB 3532 in the prediction light field image. Applying the resultant DV 3546 to the location 3550 yields the position of the predictor in the reference light field image. To obtain the predictor, the corresponding information in the LL, LH, HL, and HH subbands are decoded. In FIG. 50, the initial predictor 3552 in the LL subband consists of 4 16×16 MBs. The actual number of MBs in the initial predictor 3552 and their positions can be determined from the resultant DV 3546, the length of the subband filters, and the size of the MBs, for example, by scaling the DVs and taking into account the length of. the subband filters.

LH, HL, and HH subband information 3560, 3562, 3564 corresponds to the MBs of the initial predictor 3552. Synthesis filter 3570 combines the LL, LH, HL, and HH subband information. The result of the synthesis filtering includes a 16×16 final predictor for the MB 3532 of the prediction light field image. The final predictor is combined (3580) with the MB residual 3536 to produce a 16×16 reconstructed version 3533 of the MB 3532. The reconstructed MB 3533 includes a reconstructed value 3535 for the match point 3534 that can be used to calculate reproduction values for novel perspective image pixels.

According to the illustrative embodiment, due to the overlapping of the subband filters, the number of pixels that can be computed is less than 16 (16×16) MBs. For example, if a single pixel is needed, some of these computations can be saved by computing only the required pixel. (As with filtering, one output is computed from several input samples.)

Selective Access to Enhancement Information Using a Data Structure with VSDOs.

Figure 51:
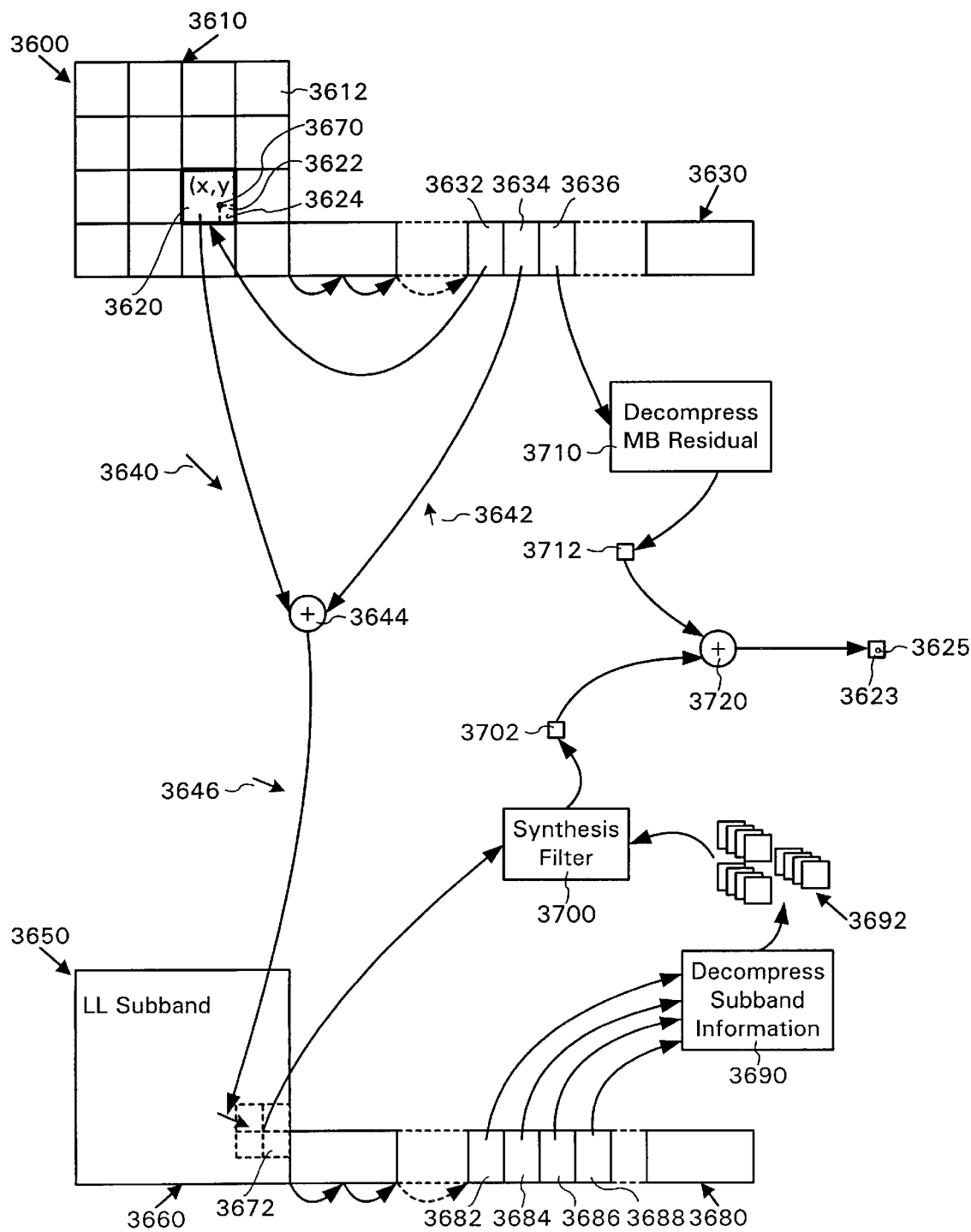
FIG. 51 is a diagram showing selective enhancement decompression of light field information stored in data structures with variable-size data objects.

A data structure with VSDOs can provide efficient, selective access to enhancement layer information. The enhancement layer information can be compressed, in which case, it is decompressed following access. FIGS. 16 and 37 show exemplary data structures with VSDOs storing information for a reference light field image and a prediction light field image, respectively. FIG. 51 shows data structures with VSDOs facilitating selective enhancement access and decompression.

FIG. 51 shows a data structure 3600 with VSDOs that stores a 256×256 prediction light field image that includes 16×16 macroblocks. Data structure 3600 includes a base field 3610 and an enhancement field 3630. The base field 3610 stores GMB DVs. In FIG. 51, the base field is decompressed. A sub-field 3612 stores one or more DVs for $GMB_3$. The enhancement field 3630 stores in VSDOs spatial displacement estimation refinement information for MBs. A sub-field 3632 stores a GMB DV selector for $MB_x$, a sub-field 3634 stores one or more DDVs for $MB_x$, and a sub-field 3636 stores a residual for $MB_x$. The residual for $MB_x$ can be compressed. A light field can include one or more data structures 3600, each storing a prediction light field image.

FIG. 51 also shows a data structure 3650 with VSDOs that stores a 256×256 reference light field image. Data structure 3650 includes a base field 3660 and an enhancement field 3680. The base field 3660 stores LL subband information for a 128×128 LL subband that includes 16×16 macroblocks. In FIG. 51, the base field is decompressed. The enhancement field 3680 stores in VSDOs LH, HL, and HH subband information for MBs. In FIG. 51, the information in enhancement field 3680 is compressed. Sub-fields 3682, 3684, 3686, and 3688 store compressed LH, HL, and HH subband information for the each of four MBs of the initial predictor 3672, respectively. A light field can include one or more data structures 3650, each storing a reference light field image.

FIG. 51 shows selective decompression of enhancement information stored in data structures with VSDOs and reconstruction of a value for a match point 3624. The prediction light field image stored in data structure 3600 includes the match point 3624. The prediction light field image was compressed using hierarchical, multi-predictor spatial displacement estimation and has residuals. Information for match points is organized by 16×16 MB and 64×64 GMB.

A $MB_x$ 3622 of GMB 3620 includes the match point 3624. Due to the multi-predictor mode compression, a sub-field 3632 for $MB_x$ 3622 holds a GMB DV selector. The GMB DV selector for $MB_x$ 3622 is selectively accessed in the enhancement field 3630. From the base field 3610, a decompressed GMB DV 3640 for the selected reference light field image is used to estimate spatial displacement for $MB_x$ 3622. Alternatively, sub-field 3632 holds a GMB DV selector for each of one or more blocks of $MB_x$ 3622.

Due to the hierarchical spatial displacement estimation, a sub-field 3634 stores one or more DDVs for $MB_x$ 3622. Any DDVs for the $MB_x$ 3622 are selectively accessed in the enhancement field 3630. In FIG. 51, a single DDV 3642 refines spatial displacement estimation for $MB_x$ 3622. Alternatively, multiple DDVs refine spatial displacement estimation for blocks of a $MB_x$ 3622. The GMB DV 3640 and DDV 3642 form (3644) a resultant DV 3646 for $MB_x$ 3622.

In the base field 3610, a location 3670 indicates a predetermined corner of the MB 3622 in the prediction light field image. Applying the resultant DV 3646 to the location 3610 yields the predictor in the reference light field image. To obtain the predictor, the corresponding information in the LL, LH, HL, and HH subbands are decoded. In FIG. 51, the initial predictor 3672 in the LL subband consists of 4 16×16 MBs. The actual number of MBs in the initial predictor 3672 and their positions can be determined from the resultant DV 3646, the length of the subband filters, and the size of the MBs, for example, by scaling the DVs and taking into account the length of the subband filters.

LH, HL, and HH subband information for the initial predictor 3672 supplements the LL subband information. LH, HL, and HH subband information for the initial predictor 3672 is selectively accessed in the sub-fields 3682, 3684, 3686, and 3688 of the enhancement field 3680. Each of the sub-fields 3682, 3684, 3686, and 3688 stores compressed LH, HL, and HH subband information for one of the MBs of the initial predictor 3672 for MB 3622. When the selectively accessed subband information is compressed, a decompression unit 3690 decompresses it.

A synthesis filter 3700 combines the LL subband information for the initial predictor 3672 with any corresponding LH, HL, and HH subband information. The output of synthesis filtering includes a 16×16 final predictor 3702 for the MB 3622 of the prediction light field image.

A sub-field 3636 stores a residual 3712 for $MB_x$ 3622. As shown in FIG. 51, when the residual is compressed, a decompression unit 3710 decompresses the residual 3712 for $MB_x$ 3622. Combining the residual 3712 and the final predictor 3702 forms (3720) a 16×16 reconstructed version 3623 of $MB_x$ 3622. The reconstructed $MB_x$ 3623 includes a reconstructed value 3625 for the match point 3624.

According to the illustrative embodiment, due to the overlapping of the subband filters, the number of pixels that can be computed is less than 16 (16×16) MBs. For example, if a single pixel is needed, some of these computations can be saved by computing only the required pixel. (As with filtering, one output is computed from several input samples.)

When a reference light field image includes the match point, a reconstructed version of the MB that includes the match point is created. The base field 3660 includes decompressed LL subband information for the MB. LL, LH, and HH subband information in sub-fields of the enhancement field 3680 supplements the LL subband information for the MB. This LH, HL, and HH subband information is selectively accessed. When the selectively accessed subband information is compressed, a decompression unit 3690 decompresses it. Synthesis filter 3700 combines the LL, LH, HL, and HH subband information to produce a reconstructed version of the MB that includes the match point.

In alternative embodiments, a match point value is reconstructed from a prediction light field image compressed in single-predictor mode, without hierarchical spatial displacement estimation, and/or without residuals. Enhancement information for an area that includes a match point can be selectively accessed and/or decompressed at some level of organization besides GMB/MB. Moreover, values can be reconstructed for multiple match points for a novel perspective light field image pixel. In general, enhancement information can be compressed to some other frequency divisions and/or spatial displacement estimation levels. As described above, selective access and/or decompression of enhancement information can be conditionally bypassed based upon a flag value for a match point, a flag value for a match area, or a processor, memory, transmission, or other system constraint.

While the above techniques and data structures have been described with reference to light field information, they are applicable to other types of graphical and non-graphical information, including information for spatially-related views of an object or static scene. For a Lumigraph, a decompression can decompress low granularity surface geometry information, then selectively decompress enhancement information.

Having described and illustrated the principles of our invention with reference to an illustrative embodiment, it will be recognized that the illustrative embodiment can be modified in arrangement and detail without departing from such principles. The ordering of acts in the above-described techniques can be reordered when doing so will not adversely affect the results of the technique. Moreover, it should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrative embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method for performing a selective granularity operation involving a multi-resolution representation of one Or more light field images of a light field, the method comprising:

providing one or more light field images of a light field; and performing a selective granularity operation involving a multi-resolution representation of the one or more light field images, wherein the multi-Tesolution representation of the one or more light field images comprises a set of plural layers, wherein the set of plural layers includes a low granularity component layer and one or more higher granularity component layers, and wherein each of the one or more higher granularity component layers represents less significant information about the one or more light field images than the low granularity component layer.

2. The method of claim 1 wherein granularity corresponds to spatial frequency, and wherein the performing comprises:

separating a low frequency component layer from a light field image;

separating one or more higher frequency component layers from the light field image; and sub-sampling one or more of the frequency component layers to reduce representation.

3. A computer-readable medium having computer-executable instructions for performing the method of claim 2.

4. The method of claim 2 wherein one or more integer filter banks that use integer wavelet transforms separate the frequency component layers of the light field image.

5. The method of claim 2 wherein the separating limits the spatial frequency range of a frequency component layer by a factor of n, and wherein sub-sampling reduces representation of a frequency component layer by a factor of n.

6. The method of claim 2 wherein the separating a low frequency component layer comprises bandpass filtering the light field image to remove a high frequency component.

7. The method of claim 6 wherein the bandpass filtering occurs in the horizontal and vertical directions.

8. The method of claim 2 wherein the separating one or more higher frequency component layers comprises, for a frequency component layer, bandpass filtering the light field image to remove at least a low frequency component in at least one direction.

9. The method of claim 8 wherein the bandpass filtering occurs in the horizontal direction and/or vertical direction.

10. The method of claim 2 further comprising:

frequency decomposing the low frequency component layer into a multi-resolution representation of the low frequency component layer;

forming plural wavelet blocks from the multi-resolution representation of the low frequency component layer; and compressing the wavelet blocks by zero-tree coding using successive approximation quantization and arithmetic coding.

11. The method of claim 2 further comprising:

for a section of spatial domain coefficients of a frequency component layer, transform coding the section into transform coefficients;

quantizing the transform coefficients; and entropy coding the quantized transform coefficients.

12. The method of claim 1 wherein granularity corresponds to degree of spatial displacement estimation refinement for compressing representation of a light field by reducing spatial redundancy between light field images, and wherein the performing comprises:

for a prediction light field image, for each of plural groups of pieces of the prediction light field image, determining a corresponding group of pieces predictor of a reference light field image;

determining a displacement vector based upon the corresponding group of pieces predictor, wherein the displacement vector indicates a spatial transformation; and representing the prediction light field image based upon displacement vectors determined for the plural groups of pieces of the prediction light field image.

13. A computer-readable medium having computer-executable instructions for performing the method of claim 12.

14. The method of claim 12 wherein the determining a corresponding group of pieces predictor of a reference light field image comprises:

establishing a search window within the reference light field image; and within the search window, finding a corresponding group of pieces predictor that minimizes a deviation measure for the group of pieces of the prediction light field image.

15. The method of claim 12 further comprising:

for each piece of a group of pieces of the prediction light field image, determining a corresponding piece predictor in the reference light field image; and determining a displacement difference vector based upon the corresponding piece predictor and the displacement vector for the group of pieces.

16. The method of claim 15 wherein the determining a corresponding piece predictor comprises:
establishing a piece-level search window within the reference light field image; and
within the piecelevel search window, finding a corresponding piece predictor that minimizes a deviation measure for the piece of the prediction light field image.

17. The method of claim 16 wherein the position of the piece within the group of pieces constrains placement of the piece-level search window around a corresponding position within the reference light field image.

18. The method of claim 15 wherein pieces of the prediction light field image are macroblocks.

19. The method of claim 15 wherein pieces of the prediction light field image are constituent blocks of macroblocks.

20. The method of claim 12 further comprising:
for each piece of a group of pieces of the prediction light field image,
determining a corresponding piece predictor in the reference light field image;
determining a residual based upon the difference between the piece of the prediction light field image and the corresponding piece predictor.

21. The method of claim 20 further comprising:
comparing a deviation measure for the residual to a failure threshold; and
if the deviation measure exceeds the failure threshold, intra-coding the piece of the prediction light field image.

22. The method of claim 20 further comprising:
comparing a deviation measure for the residual to a minimum residual threshold;
if the deviation measure is equal to or below the minimum residual threshold,
discarding the residual; and
designating the piece of the prediction light field image as lacking a residual.

23. The method of claim 12 further comprising:
for each of the plural groups of pieces of the prediction light field image,
determining a corresponding group of pieces predictor in each of plural reference light field images; and
for each corresponding group of pieces predictor, determining a displacement vector based upon the corresponding group of pieces predictor, wherein a first piece of a group of pieces estimates spatial displacement based upon a first selective displacement vector for the group of pieces, and wherein a second piece of the group of pieces estimates spatial displacement based upon a second selective displacement vector for the group of pieces.

24. The method of claim 1 wherein granularity corresponds to spatial frequency, and wherein the performing comprises:
for each of one or more light field images, decompressing a low frequency component layer;
for a point of a novel perspective light field image,
determining at least one match point in the one or more light field images; and
for a match point, selectively decompressing higher frequency component layer information in the light field image that includes the match point.

25. A computer-readable medium having computer-executable instructions for performing the method of claim 24.

26. The method of claim 24 wherein a match area includes the match point, and wherein higher frequency component layer information for the match area is selectively decompressed.

27. The method of claim 24 further comprising:
conditionally bypassing the selectively decompressing higher frequency component layer information for a match point.

28. The method of claim 27 wherein the conditionally bypassing comprises:
checking a flag value that indicates availability of the higher frequency component layer information for the match point; and
if the higher frequency component layer information for the match point is unavailable, bypassing the selectively decompressing.

29. The method of claim 27 wherein the conditionally bypassing depends upon a processor, in memory, or other system constraint.

30. The method of claim 24 further comprising:
after the selectively decompressing, calculating a reproduction value based upon decompressed low frequency component layer information for the match point and decompressed higher frequency component layer information for the match point; and
assigning the reproduction value to the point of the novel perspective view.

31. The method of claim 1 wherein granularity corresponds to degree of spatial displacement estimation refinement for compressing representation of a light field by reducing spatial redundancy between light field images, and wherein the performing comprises:
for each of one or more light field images, decompressing rough spatial displacement estimation information;
for a point of a novel perspective light field image,
determining at least one match point in the one or more light field images; and
for a match point, selectively decompressing spatial displacement estimation refinement information.

32. A computer-readable medium having computer-executable instructions for performing the method of claim 31.

33. The method of claim 31 wherein the rough spatial displacement estimation information comprises one or more displacement vectors for each of one or more sections of a light field image.

34. The method of claim 33 wherein the spatial displacement estimation refinement information comprises one or more displacement difference vectors for each of one or more sub-sections of a section.

35. The method of claim 33 wherein the spatial displacement estimation refinement information comprises a residual for each of one or more sub-sections of a section.

36. The method of claim 33 wherein the spatial displacement estimation refinement information comprises a displacement vector selector for a sub-section of a season with plural displacement vectors.

37. The method of claim 31 wherein a match area includes the match point, and wherein spatial displacement estimation refinement information for the match area is selectively decompressed.

38. The method of claim 31 further comprising:
conditionally bypassing the selectively decompressing spatial displacement estimation refinement information for a match point.

39. The method of claim 38 wherein the conditionally bypassing comprises:

checking a flag value that indicates availability of the spatial displacement estimation refinement information for the match point; and if the spatial displacement estimation refinement information for the match point is unavailable, bypassing the selectively decompressing.

40. The method of claim 38 wherein the conditionally bypassing depends upon a processor, memory, or other system constraint.

41. The method of claim 1 wherein granularity for a prediction light field image corresponds to degree of spatial displacement estimation refinement for compressing representation of a light field by reducing spatial redundancy between light field images, wherein granularity for a reference light field image corresponds to spatial frequency, and wherein the performing comprises:

for each of one or more reference light field images of the one or more light field images, decompressing a low frequency component layer;

for one or more prediction light field images of the one or more light field images, decompressing rough spatial displacement estimation information; and selectively decompressing enhancement information.

42. A computer-readable medium having computer-executable instructions for performing the method of claim 41.

43. The method of claim 41 wherein the enhancement information includes information for one or more higher frequency component layers.

44. The method of claim 41 wherein the rough spatial displacement estimation information comprises one or more displacement vectors for each of one or more sections of a prediction light field image, and wherein the enhancement information includes residuals, one or more displacement difference vectors, and/or selectors of displacement vectors.

45. The method of claim 41 further comprising:

conditionally bypassing the selectively decompressing enhancement information based upon a flag value.

46. The method of claim 41 further comprising:

conditionally bypassing the selectively decompressing enhancement information based upon processor capacity, availability of computer memory, or available transmission capacity.

47. The method of claim 41 further comprising:

for a point of a novel perspective light field image,
determining at least one match point in the light field; and
for a match point, performing the act of selectively decompressing enhancement information.

48. The method of claim 47 wherein a match area includes the match point, and wherein enhancement information for the match area is selectively decompressed.

49. The method of claim 47 further comprising:

conditionally bypassing the selectively decompressing enhancement information for the match point;

if a reference light field image includes the match point, calculating a reproduction value based upon decompressed low frequency component layer information for the match point, otherwise, calculating the reproduction value based upon decompressed low frequency component layer information and decompressed rough spatial displacement estimation information for the match point; and assigning the reproduction value to the point of the novel perspective light field image.

50. A method for selectively accessing enhancement information for a set of plural spatially-related views of an object or static scene, wherein a data structure stores a spatially-related view, the data structure comprising a base field and an enhancement field, the method comprising:

for a point of a novel perspective view, determining at least one match point in the view stored in the data structure;

for a match point of the at least one match point in the view,
accessing information in the base field; and
selectively accessing information in the enhancement field.

51. A computer-readable medium having computer-executable instructions for performing the method of claim 50.

52. The method of claim 50 wherein the information in the base field is compressed and the information in the enhancement field is compressed, the method further comprising:

before the determining the at least one match point, decompressing the information in the base field; and after the selectively accessing information, decompressing the enhancement information.

53. The method of claim 50 wherein the view stored in the data structure is a reference view, wherein the base field information includes a low frequency component layer information, and wherein the enhancement field information includes information for higher frequency component layers.

54. The method of claim 50 wherein the view stored in the data structure is a prediction view, wherein the base field information includes rough spatial displacement estimation information, and wherein the enhancement field information includes spatial displacement estimation refinement information.

55. The method of claim 50 wherein a match area includes the match point, wherein the enhancement field is organized by match area, and wherein enhancement field information for the match area that includes the match point is selectively accessed.

56. The method of claim 50 wherein the data structure further comprises an array of flag values, the method further comprising:

conditionally bypassing the selectively accessing information in the enhancement field for a match point based upon a flag value in the array of flag values.

57. A computer-readable medium having stored thereon computer-executable instructions for selective transmission of enhancement information for a set of plural spatially-related views of an object or static scene over a network, the computer-executable instructions for performing the acts of:

for each of one or more reference views from a set of plural spatially-related views of an object or static scene, transmitting low frequency component layer information;

for each of one or more prediction views from the set of spatially-related views, transmitting rough spatial displacement estimation information;

selectively transmitting enhancement information based upon a network condition.

58. A computer-readable medium having stored thereon computer-executable instructions for causing a computer system programmed thereby to perform a method of processing data in a data structure for storing a multi-resolution representation of a light field image, the data structure comprising a base field and an enhancement field, the method comprising:

processing base field data representing low granularity information for a light field image; and processing enhancement field data representing higher granularity information for the light field image, wherein the higher granularity information represents less significant detail of the light field image On the low granularity information.

59. The computer-readable medium of claim 58 wherein the method further comprises:

processing an array of plural flag values that indicate the presence or absence of information in the enhancement field.

60. The computer-readable medium of claim 58 wherein the base field data is decompressed.

61. A method for compressing a representation of a set of plural spatially-related views by reducing spatial redundancy between the spatially-related views, the method comprising:

for a prediction view from a set of plural spatially-related views,
for each of plural sections of the prediction view,
determining a corresponding section predictor in a reference view; and
determining a displacement vector based upon the corresponding section predictor, wherein the displacement vector indicates a spatial transformation; and representing the prediction view based upon displacement vectors determined for the plural sections of the prediction view.

62. A computer-readable medium having computer-executable instructions for performing the method of claim 61.

63. The method of claim 61 wherein a section of the prediction view comprises a group of plural pieces.

64. The method of claim 61 wherein the determining a corresponding section predictor in a reference view comprises:

establishing a search window within the reference view; and within the search window, finding a corresponding section predictor that minimizes a deviation measure for the section of the prediction view.

65. The method of claim 64 further comprising:

constraining placement of the search window based upon a geometrical relationship between the reference view and the prediction view.

66. The method of claim 64 further comprising:

reducing the size of the search window based upon a geometrical relationship between the reference view and the prediction view.

67. The method of claim 64 further comprising:

extending an edge of the reference view, whereby a corresponding section predictor at least partially lies outside the reference view.

68. The method of claim 61 further comprising:

after the determining a displacement vector, determining a residual based upon the difference between the section of the prediction view and the corresponding section predictor;

comparing a deviation measure for the residual to a failure threshold; and if the deviation measure exceeds the failure threshold, intra-coding the section of the prediction view.

69. The method of claim 61 further comprising:

after the determining a displacement vector, determining a residual based upon the difference between the section of the prediction view and the corresponding section predictor;

comparing a deviation measure for the residual to a minimum residual threshold;

if the deviation measure is equal to or below the minimum residual threshold,
discarding the residual; and
designating the section of the prediction view as lacking a residual.

70. The method of claim 61 further comprising:

differentially coding the displacement vectors.

71. The method of claim 61 wherein the set of plural spatially-related views includes plural reference views, the method further comprising:

for each of the plural sections of the prediction view,
determining a corresponding section predictor in each of the plural reference views; and
for each corresponding section predictor, determining a displacement vector based upon the corresponding section predictor;

wherein a prediction view section estimates spatial displacement based upon a selective one of the displacement vectors.

72. A method for rendering a novel perspective view from a set of plural compressed spatially-related views of an object or static scene, the method comprising:

decompressing information for one or more reference views of the set of spatially-related views;

decompressing information for a prediction view of the set of spatially-related views, wherein the prediction view estimates spatial displacement from at least one reference view;

for a point of a novel perspective view,
determining at least one match point in the decompressed views;
calculating a reproduction value based upon decompressed information for the at least one match points; and
assigning the reproduction value to the point of the novel perspective view.

73. A computer-readable medium having computer-executable instructions for performing the method of claim 72.

74. The method of claim 72 wherein the decompressed information for the one or more reference views comprises low frequency component layers, wherein the decompressed information for the prediction view comprises rough spatial displacement estimation, the method further comprising;

for the point of the novel perspective view, selectively decompressing enhancement information to improve the quality of the reproduction value.

75. A method for configuring a set of spatially-related views, the method comprising:

arranging a set of spatially-related views in a configuration that reflects the geometrical relationships between the spatially-related views;

designating as reference views one or more views from the set of spatially-related views;

designating as prediction views one or more views from the set of spatially-related views that are not designated as reference views;

representing each prediction view in terms of plural displacement vectors from one or more of the reference views.

76. A computer-readable medium having computer-executable instructions for performing the method of claim 75.

77. The method of claim 75 wherein plural spatially-related views are designated as reference views, and wherein a prediction view is represented in terms of displacement from multiple reference views.

78. The method of claim 75 wherein the configuration is two-dimensional.

79. The method of claim 78 wherein the configuration is rectangular, and wherein the views at the corners of the rectangular configuration are reference views.

80. The method of claim 79 wherein a prediction view in the same row or column of the rectangular configuration as two reference views is represented in terms of displacement from up to both of the two reference views.

81. The method of claim 79 wherein a prediction view in the interior of the rectangular configuration is represented in terms of displacement from up to four of the corner reference views.

82. The method of claim 75 wherein reference views appear at regular intervals in the configuration of spatially-related views.

83. The computer-readable medium of claim 58 wherein the processing the base field data comprises compressing the base field data, and wherein the processing the enhancement field data comprises compressing the enhancement field data.

84. The computer-readable medium of claim 58 wherein the processing the base field data comprises decompressing the base field data, and wherein the processing the enhancement field data comprises decompressing the enhancement field data.

85. The computer-readable medium of claim 58 wherein the processing the base field data comprises accessing the base field data, and wherein the processing the enhancement field data comprises accessing the enhancement field data.

86. The computer-readable medium of claim 58 wherein the processing the base field data comprises transmitting the base field data, and wherein the processing the enhancement field data comprises transmitting the enhancement field data.

87. The computer-readable medium of claim 58 wherein the processing the base field data comprises storing the base field data, and wherein the processing the enhancement field data comprises storing the enhancement field data.

88. A computer system for performing a selective granularity operation involving a multi-resolution representation of one or more light field images of a light field, the computer system comprising:
  memory storing computer-executable instructions for causing the computer system to perform a selective granularity operation involving a multi-resolution representation of the one or more light field images, wherein the multi-resolution representation of the one or more light field images comprises a set of plural layers, wherein the set of plural layers includes a low granularity component layer and one or more higher granularity component layers, and wherein each of the one or more higher granularity component layers represents less significant information about the one or more light field images than the low granularity component layer; and
  one or more processors for performing the selective granularity operation.

89. The computer system of claim 88 wherein the selective granularity operation includes decompressing the low granularity component layer and selectively decompressing the one or more higher granularity component layers.

90. The computer system of claim 88 wherein the selective granularity operation includes compressing the one or more light field images into the multi-resolution representation.

91. The computer system of claim 88 wherein the selective granularity operation includes directing transmission of the low granularity component layer and directing selective transmission of the one or more higher granularity component layers.

92. The computer system of claim 88 wherein the selective granularity operation includes accessing the low granularity component layer and selectively accessing the one or more higher.

* * * * *

UNITED STATES PATENT AND TRADEMARK OFFICE
CERTIFICATE OF CORRECTION

PATENT NO. : 6,476,805 B1
DATED : November 5, 2002
INVENTOR(S) : Shum et al.

It is certified that error appears in the above-identified patent and that said Letters Patent is hereby corrected as shown below:

Title page,
Item [57], ASTRACT,
Line 11, "techniques includes" should read -- techniques include --

Column 4,
Line 13, "to third aspect" should read -- to a third aspect --

Column 8,
Line 18, "by those." should read -- by those --.
Line 28, "computer 220 20" should read -- computer 220 --.

Column 12,
Line 45, "Ill. Exemplary" should read -- III. Exemplary --.

Column 15,
Line 29, "filters subband code" should read -- filters to subband code --.

Column 19,
Line 59, "pp. 3320269" should read -- 332-369 --.

Column 21,
Line 51, "for section" should read -- for a section --.

Column 26,
Lines 51, 53 and 56, "$\overline{DV}_{MBj}$" should read -- $\overline{DV_{MBj}}$ --.

Column 27,
Lines 1 and 4, "$\overline{DV}_{MBj}$" should read -- $\overline{DV_{MBj}}$ --.

Lines 4, 6 and 39, "$\overline{DV}_{GMB}{}^{Rli}$" should read -- $\overline{DV_{GMB}^{Rli}}$ --.

Line 26, "12431" should read -- 1 2431 --.

Line 26, 31, 36 and 39 "$\overline{DV}_{MBj,Bk}$" should read -- $\overline{DV_{MBj,Bk}}$ --.

Line 29, "$\overline{DV}_{MBJ,Bk}$" should read -- $\overline{DV_{MBj,Bk}}$ --.

Line 31, "$\overline{DDV}_{MBk,Bk}$" should read -- $\overline{DDV_{MBj,Bk}}$ --.

Line 41, "$DVG_{GMB}{}^{Rli}$" should read -- $\overline{DV_{GMB}^{Rli}}$ --.

UNITED STATES PATENT AND TRADEMARK OFFICE
CERTIFICATE OF CORRECTION

PATENT NO. : 6,476,805 B1
DATED : November 5, 2002
INVENTOR(S) : Shum et al.

It is certified that error appears in the above-identified patent and that said Letters Patent is hereby corrected as shown below:

Column 28,
Lines 47 and 49, "$p^{(\overline{DV})}$" should read -- $p^{(\overline{DV})}$ --.

Line 67, "$p^{(\overline{V+DDV})}$" should read -- $p^{(\overline{DV+DDV})}$ --.

Column 29,
Line 48, "$p^{(\overline{DV})}$" should read -- $p^{(\overline{DV})}$ --.

Column 35,
Line 23, "calculates (3060)" should read -- calculates (act 3060) --.

Column 41,
Line 3, "w i th" should read -- with --.

Column 43,
Line 40, "the multi-Tesolution" should read -- the multi-resolution --.

Column 46,
Line 56, "of a season with" should read -- of a section with --.

Column 49,
Line 6, "image On" should read -- image than --.

Signed and Sealed this

Fourteenth Day of September, 2004

JON W. DUDAS
*Director of the United States Patent and Trademark Office*